US009461848B2

(12) United States Patent
Awano

(10) Patent No.: US 9,461,848 B2
(45) Date of Patent: Oct. 4, 2016

(54) GATEWAY DEVICE, MOBILE COMMUNICATION SYSTEM, MOBILE TERMINAL, PACKET TRANSFER CONTROL METHOD, CONTROL METHOD OF MOBILE TERMINAL, AND NON-TRANSITORY COMPUTER READABLE MEDIUM

(75) Inventor: Jun Awano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 13/501,440

(22) PCT Filed: Aug. 31, 2010

(86) PCT No.: PCT/JP2010/005363
§ 371 (c)(1),
(2), (4) Date: Apr. 11, 2012

(87) PCT Pub. No.: WO2011/045887
PCT Pub. Date: Apr. 21, 2011

(65) Prior Publication Data
US 2012/0201186 A1 Aug. 9, 2012

(30) Foreign Application Priority Data

Oct. 13, 2009 (JP) .................................. 2009-236227

(51) Int. Cl.
*H04H 20/71* (2008.01)
*H04L 12/66* (2006.01)
(Continued)

(52) U.S. Cl.
CPC ........... *H04L 12/66* (2013.01); *H04L 12/1877* (2013.01); *H04L 12/4633* (2013.01);
(Continued)

(58) Field of Classification Search
CPC ............ H04W 4/00; H04L 12/28; H04J 3/16; H04H 20/71; H04B 7/00
USPC ....... 370/338, 277, 312, 390, 468, 392, 252; 455/414, 502, 503, 458, 453, 435.1; 709/206, 230; 714/748; 725/34
See application file for complete search history.

(56) References Cited

U.S. PATENT DOCUMENTS 7,107,066 B2 * 9/2006 Toth et al. .................... 455/458
7,606,228 B2 * 10/2009 Park et al. .................... 370/390
(Continued)

FOREIGN PATENT DOCUMENTS

JP  2004-129159 A  4/2004
JP  2008-017122 A  1/2008
(Continued)

OTHER PUBLICATIONS

International Search Report in PCT/JP2010/005363 dated Dec. 14, 2010(English translation thereof).
(Continued)

*Primary Examiner* — Charles C Jiang
*Assistant Examiner* — Wali Butt
(74) *Attorney, Agent, or Firm* — McGinn IP Law Group, PLLC

(57) ABSTRACT

A pass-through packet determination unit (112) of an anchor GW 100A controls whether or not to transfer a Layer 3 packet arriving from an external network (20) to a downlink channel set up with a mobile terminal (700) based on a transfer policy. Further, a transfer policy control unit (111) changes the transfer policy to enable transfer of a multicast packet or a broadcast packet to the mobile terminal (700) by the downlink channel in response to receiving from the mobile terminal (700) a Layer 3 packet preliminarily specified as a trigger to start transfer of a multicast packet or a broadcast packet to the mobile terminal (700) by the downlink channel.

36 Claims, 37 Drawing Sheets

(51) Int. Cl.

| | | |
|---|---|---|
| H04L 12/18 | (2006.01) | |
| H04L 12/46 | (2006.01) | |
| H04L 29/06 | (2006.01) | |
| H04W 4/06 | (2009.01) | |
| H04W 76/02 | (2009.01) | |
| H04W 76/04 | (2009.01) | |
| H04L 12/725 | (2013.01) | |
| H04L 29/12 | (2006.01) | |
| H04W 36/02 | (2009.01) | |
| H04W 88/16 | (2009.01) | |

(52) U.S. Cl.
CPC ............ *H04L63/0263* (2013.01); *H04W 4/06* (2013.01); *H04W 76/022* (2013.01); *H04W 76/041* (2013.01); *H04L 12/189* (2013.01); *H04L 45/306* (2013.01); *H04L 61/1511* (2013.01); *H04L 63/102* (2013.01); *H04W 36/026* (2013.01); *H04W 88/16* (2013.01)

(56) References Cited

U.S. PATENT DOCUMENTS

| 8,094,644 | B2 * | 1/2012 | Ludwig et al. ............... 370/349 |
|---|---|---|---|
| 8,107,422 | B2 * | 1/2012 | Hsu ............................... 370/328 |
| 2002/0068572 | A1 * | 6/2002 | Chun et al. ................... 455/442 |
| 2006/0056427 | A1 * | 3/2006 | Sato .............................. 370/401 |
| 2007/0133478 | A1 * | 6/2007 | Armbruster et al. ......... 370/335 |
| 2007/0286100 | A1 * | 12/2007 | Saaranen et al. ............. 370/260 |
| 2008/0212509 | A1 * | 9/2008 | Kim et al. .................... 370/312 |
| 2008/0212529 | A1 * | 9/2008 | Kim et al. .................... 370/329 |
| 2008/0219189 | A1 * | 9/2008 | Kitchin et al. ................ 370/277 |
| 2010/0017528 | A1 * | 1/2010 | Awano .......................... 709/230 |
| 2010/0329172 | A1 * | 12/2010 | Wu et al. ...................... 370/312 |
| 2011/0182227 | A1 * | 7/2011 | Rune ............................. 370/312 |

FOREIGN PATENT DOCUMENTS

| JP | 2008017122 A | * | 1/2008 | |
|---|---|---|---|---|
| JP | 2008-067149 A | | 3/2008 | |
| JP | 2009-253443 A | | 10/2009 | |
| WO | WO 2008099802 A1 | * | 8/2008 | |
| WO | WO 2010039084 A1 | * | 4/2010 | ............. H04W 8/08 |

OTHER PUBLICATIONS

3GPP TS 23.401 V9.1.0. (Jun. 2009), General Packet Radio Service (GPRS) enhancements for Evolved Universal Terrestrial Radio Access Network (E-UTRAN) access (Release 9); (Jun. 2009).
3GPP TS 23,401, Jun. 2009, V9.1.0, p. 38-43.118-120, URL http://www.quintillion.co.jp/3GPP/Specs/23401-910.pdf.
Japanese Office Action dated May 20, 2014 with an English translation.

* cited by examiner

| DESTINATION IP ADDRESS | DESTINATION PORT NO. | PROTOCOL TYPE | DOWNLINK PASS-THROUGH PACKET INFORMATION |
|---|---|---|---|
| 239.255.255.250 | 1900 | UDP | LOCAL IP ADDRESS (239.255.255.250), LOCAL PORT (1900), PROTOCOL TYPE (UDP) |
| 224.0.0.251 | 5353 | UDP | LOCAL IP ADDRESS (224.0.0.251), LOCAL PORT (5353), PROTOCOL TYPE (UDP) |
| ... | ... | ... | ... |

Fig. 5

| LOCAL IP ADDRESS | LOCAL PORT NO. | PROTOCOL TYPE | TRANSFER DESTINATION IDENTIFICATION INFORMATION |
|---|---|---|---|
| 239.255.255.250 | 1900 | UDP | (MS_IP1, TEID_1) |
|  |  |  | (MS_IP2, TEID_2) |
| 224.0.0.251 | 5353 | UDP | (MS_IP1, TEID_1) |
| ⋮ | ⋮ | ⋮ | ⋮ |

| LOCAL IP ADDRESS | REMOTE IP ADDRESS | LOCAL PORT NO. | PROTOCOL TYPE | TRANSFER DESTINATION IDENTIFIER | RESPONSE INFORMATION |
|---|---|---|---|---|---|
| 239.255.255.250 | NODE1_IP | 1900 | UDP | (MS_IP1, TEID_1) | RSP_DATA_1 |
| 239.255.255.250 | NODE1_IP | 1900 | UDP | (MS_IP1, TEID_1) | RSP_DATA_2 |
|  |  |  |  | (MS_IP2, TEID_2) | RSP_DATA_2 |
| 224.0.0.251 | ANY | 53 | UDP | (MS_IP1, TEID_1) | RSP_DATA_3 |
| ... | ... | ... | ... | ... | ... |

Fig. 10

| TERMINAL IDENTIFIER | ANCHOR GW IDENTIFIER | RADIO BASE STATION IDENTIFIER | TRANSFER DECISION | TRANSFER TARGET PACKET INFORMATION |
|---|---|---|---|---|
| MN_NAI_1 | APN_1 | CSG_ID_1 | OK | POLICY_1 |
| ANY | APN_1 | CSG_ID_2, CSG_ID_3 | OK | POLICY_2 |
| ⋮ | ⋮ | ⋮ | ⋮ | ⋮ |

GATEWAY DEVICE, MOBILE COMMUNICATION SYSTEM, MOBILE TERMINAL, PACKET TRANSFER CONTROL METHOD, CONTROL METHOD OF MOBILE TERMINAL, AND NON-TRANSITORY COMPUTER READABLE MEDIUM

TECHNICAL FIELD

The present invention relates to a mobile communication system under study by the 3GPP (3rd Generation Partnership Project) and, particularly, to a method for a gateway connected to an external IP network to transfer a packet addressed to a specific multicast address or broadcast address to a mobile terminal accommodated in the gateway.

BACKGROUND ART

FIG. 1 shows a configuration of a mobile communication system in the 3GPP. Illustration of nodes not related to background art and nodes not needed for explanation is omitted.

In FIG. 1, a core network 10 is a network that is mostly administered by an operator which provides a mobile communication service. In this example, EPC (Evolved Packet Core) or UMTS (Universal Mode Telecommunications System) packet switched core network is assumed.

An external network 20 is an IP (Internet Protocol) network that is connected to the core network 10 through an anchor GW 100. Examples of the external network 20 include the Internet, a corporate network and a home network. The external network 20 may be a network that is administered by the same administrator as the core network 10 in some cases.

The anchor GW (gateway) 100 is a gateway that acts as an anchor when a mobile terminal 700 moves between radio base stations or moves to a different radio access network. Further, the anchor GW 100 operates also as a gateway for connecting the core network 10 and the external network 20. Specifically, when the anchor GW 100 receives a packet addressed to the mobile terminal 700 from the external network 20, the anchor GW 100 transfers it to the mobile terminal. Although the anchor GW 100 is located within the core network 10 in FIG. 1, it may be located in the external network 20.

A policy setting node 200 has a function of setting a transfer policy for regulating packet transfer to the mobile terminal 700 to the anchor GW 100.

The authentication server 300 stores information associated with the mobile terminal 700 or its owner (subscriber) and also stores key information required to perform authentication of the mobile terminal 700. The authentication server 300 executes authentication through a mobility management node 500 when the mobile terminal 700 connects to a radio base station 600.

An access GW 400 establishes an IP packet channel between the anchor GW 100 and the access GW 400 and between the access GW 400 and the mobile terminal 700 in response to a request from the mobility management node 500. As a result, a channel through which an IP packet can be transferred is established between the anchor GW 100 and the mobile terminal 700.

The mobility management node 500 mediates authentication of the mobile terminal 700 and downloads the information associated with the mobile terminal 700 from the authentication server 300. Based on the obtained information, the mobility management node 500 requests the access GW 400 to establish a channel through which an IP packet can be transferred.

A radio access network 60 relays user data and control data between the mobile terminal 700 and the core network 10. The radio access network 60 includes the radio base station 600. The radio base station 600 has a function of connecting with the mobile terminal 700 by radio access technology.

The mobile terminal 700 has a radio interface and connects to the radio base station 600 by radio access technology. After connecting to the radio base station 600, the mobile terminal 700 can communicate with a communication node 800 by IP using a channel for IP packet transmission that is built between the anchor GW 100 and the mobile terminal 700.

Correspondences between the elements shown in FIG. 1 and the elements of the EPC of the 3GPP are as follows. The anchor GW 100 corresponds to PDN-GW (Packet Data Network Gateway). The policy setting node 200 corresponds to PCRF (Policy and Charging Rules Function). The authentication server 300 corresponds to HSS (Home Subscriber Server). The access GW 400 corresponds to S-GW (Serving Gateway). The mobility management node 500 corresponds to MME (Mobility Management Entity). The radio base station 600 corresponds to eNB (enhanced NodeB). The mobile terminal 700 corresponds to UE (User Equipment). Further, LTE (Long Term Evolution) is used for radio access technology of EUTRAN (Evolved UMTS Terrestrial Radio Access Network) connected to the EPC.

The communication node 800 is anode having a communication function using IP and is located in the external network 20. Specific examples of the communication node 800 include a PC (Personal Computer), a printer, an application server and the like. Particularly, when the external network 20 is a home network, a digital home appliance having an IP communication function such as a television, a video recorder, an audio recorder and a media server is assumed as the communication node 800.

The sequence chart of FIG. 2 shows the flow of a process when the mobile terminal 700 connects to the radio base station 600 in the 3GPP mobile communication system shown in FIG. 1. For simplification, a part of the procedure is omitted. For the exact procedure of initial connection, see clause 5.3.2 "Attach Procedure" in 3GPP TS 23.401 V9.1.0 (Non Patent Literature 1).

First, in Step S100, the mobile terminal 700 establishes a radio link for transmitting and receiving a control signal with the radio base station 600. After that, the mobile terminal 700 transmits an attach request to the mobility management node 500 (Step S101). The attach request contains identification information of the mobile terminal 700. Further, in the case of selecting the anchor GW 100 desired by the mobile terminal 700 rather than the anchor GW 100 assigned by default by the core network 10, the attach request transmitted from the mobile terminal 700 contains the identifier of the anchor GW 100. In the 3GPP, the identifier of the anchor GW 100 is called APN (Access Point Name). Although the attach request contains various other information, those information are omitted since they are not directly relevant to the explanation here. In the following explanation also, only necessary information is explained among the information contained in signals.

In Step S102, an authentication process and a communication hiding process that involve the mobile terminal 700, the radio base station 600, the mobility management node 500 and the authentication server 300 are performed. As a result, the mobile terminal 700 and the core network 10 authenticate each other, and further a control signal is hidden between the mobile terminal 700 and the mobility management node 500, and a key to ensure integrity is shared. Data and a control signal in the radio interval are hidden also between the mobile terminal 700 and the radio base station 600, and a key to ensure integrity is shared.

In Step S103, the mobility management node 500 transmits a bearer setting request to the access GW 400 in order to establish a channel between the mobile terminal 700 and the access GW 400. The signal contains the address of the anchor GW 100 and a set value for creating an appropriate channel. When the mobile terminal 700 makes an initial connection to the core network 10, the mobility management node 500 adds the address of the anchor GW 100 acquired from the authentication server 300 to the bearer setting request. After that, when the mobile terminal 700 transmits an attach request (connection setting request) that contains the identifier of the anchor GW 100, the mobility management node 500 performs address resolution of the identifier (FQDN (Fully Query Domain Name) format) of the anchor GW by DNS (Domain Name System) and stores the resolved address into the bearer setting request.

In Step S104, the access GW 400 that has received the bearer setting request transmits a path setting request to the anchor GW 100 using the address of the anchor GW 100 stored in the request.

In Step S105, the anchor GW 100 requests the policy setting node 200 to set a transfer policy when transferring an IP packet to the mobile terminal 700 by the anchor GW 100. As a result, the policy setting node 200 sets transfer policy information to the anchor GW 100.

In Step S106, the anchor GW 100 transmits a path setting response to the access GW 400 as a response to the path setting request. As a result, a channel for IP packet transfer is established between the access GW 400 and the anchor GW 100.

In Step S107, the access GW 400 transmits a bearer setting response to the mobility management node 500 as a response to the bearer setting request.

In Step S108, the mobility management node 500 transmits a path setting request for establishing a channel for transferring an IP packet between the access GW 400 and the radio base station 600 to the radio base station 600.

In Step S109, the mobility management node 500 transmits an attach completion notification to the mobile terminal 700.

In Step S110, a radio link for exchanging a data packet is set up between the radio base station 600 and the mobile terminal 700.

Finally, in Step S111, a channel (which is called EPS (Evolved Packet System) bearer in the 3GPP) for transferring an IP packet between the mobile terminal 700 and the anchor GW 100 is established. The mobile terminal 700 can thereby transmit and receive an IP packet to and from the communication node 800 in the external network 20 using the channel. Thus, communication between them becomes possible.

Note that packet filters are configured at the endpoints of the channel set up between the mobile terminal 700 and the anchor GW 100. Specifically, the channel does not let all of IP packets pass through, and packets that can pass through the channel are limited. The conditions for an IP packet to pass through the channel in the direction from the external network 20 to the mobile terminal (which is called a downlink direction) are set to the anchor GW 100 in the above Step S105. The anchor GW 100 discards an IP packet that does not meet the preset conditions for passage without transferring it in the downlink direction.

The case where the radio base station 600 is a typical macro cell base station is described above. Currently, discussions about a small-scale radio base station having a significantly smaller cell size (cover area) than the macro cell base station are actively taking place in several standardization groups related to the mobile communication system, which include the 3GPP. A cell formed by the small-scale radio base station is called a femtocell or a home cell. Further, the small-scale radio base station is called a femtocell base station or a home base station. In the 3GPP, the femtocell base station is defined as HNB (Home Node B) and HeNB (Home evolved Node B). Hereinafter, HNB and HeNB are referred to collectively as H(e)NB. The purpose of introducing the femtocell is not only to complement a dead zone. For example, one of other purposes is to make coordination between an information home appliance having a network connection function and the mobile terminal 700 by installing the femtocell base station in user's home.

FIG. 3 shows one of ideas to realize H(e)NB under study by the 3GPP. In the configuration of FIG. 3, the anchor GW 100 and the radio base station 600 are integrated in a H(e)NB 1100. In this case, although the anchor GW 100 is located not in the core network 10 but in a network of a user (home network), the interfaces between the nodes and functions are substantially the same as those of the configuration in FIG. 1.

Differences between FIG. 1 and FIG. 3 are further described. The H(e)NB 1100 creates an IPsec tunnel with a security GW 1000 located in the core network 10 and transfers communications between the anchor GW 100 or the radio base station 600 and each node located in the core network 10 using the IPsec tunnel. Further, those communications are transferred to the security GW 1000 via a broadband router 900 located in a home network 20 and through an access network 30 of a provider that provides an access service by ADSL (Asymmetric Digital Subscriber Line), FTTH (Fiber To The Home) or the like.

CITATION LIST

Non Patent Literature

NPL 1: 3GPP TS 23.401 V9.1.0 (2009-06). "General Packet Radio Service (GPRS) enhancements for Evolved Universal Terrestrial Radio Access Network (E-UTRAN) access (Release 9)"

SUMMARY OF INVENTION

Technical Problem

As described above using FIGS. 1 and 2, packets that can pass through the anchor GW 100 are limited to IP packets that meet the conditions for passage (transfer policy) set to the anchor GW 100. Further, in the current specifications of the 3GPP, an IP address in the downlink direction that is transferred to the mobile terminal 700 by the anchor GW 100 (which is a destination address when an IP packet is addressed to the mobile terminal 700) is determined as the address assigned to the mobile terminal 700, and it is not allowed to be set flexibly. There is thus a problem that an IP packet addressed to a multicast address (multicast packet) and an IP packet addressed to a broadcast address (broadcast packet) cannot be transferred from the external network 20 to the mobile terminal 700 except for some exceptions.

This does not cause any particular problem when the external network 20 is a network administered by an operator or a corporate network, a problem arises when it is a home network. This is because DLNA (Digital Living Network Alliance), UPnP (Universal Plug and Play), Bonjour and the like are used as techniques to facilitate coordination between equipments such as sharing of contents stored in an information home appliance with another information home appliance. In those techniques, protocols such as SSDP (Simple Service Discovery Protocol) and mDNS (multicast Domain Name System) are used. These protocols use a multicast packet for device search and name resolution. Thus, under existing circumstances, the mobile terminal 700 cannot communicate with the external network 20 such as a home network using an application that employs the techniques such as DLNA, UPnP and Bonjour.

Note that, in the techniques for home networks such as DLNA, UPnP and Bonjour, a multicast packet is used for the purpose of broadcasting an IP packet to each of communication nodes connected to the same segment of LAN. Thus, transfer of the multicast packet beyond a router is not assumed. Accordingly, an application used in a home network equipment does not need to perform processing (join, leave) for controlling transfer of the multicast packet using protocols such as IGMP (Internet Group Management Protocol) and MLD (Multicast Listener Discovery) for controlling a multicast group.

Therefore, to provide a function to receive a multicast packet by the mobile terminal 700, an architecture and a method in which the mobile terminal 700 and equipment located in the external network do not need to support the control process of a multicast group by IGMP, MLD or the like are desirable. This is to suppress the effects on home network equipment (information home appliances etc.) located in the external network 20. From this point of view, it is not appropriate to apply MBMS (Multimedia Broadcast/Multicast Service) that is proposed in the 3GPP.

Further, to realize an architecture and a method in which a multicast packet or a broadcast packet can be transferred to the mobile terminal 700, it is desirable to minimize the amount of packets transferred to the mobile terminal 700. This is because multicast packets based on SSDP are frequently transmitted within the home network. When all of those multicast packets are transferred to the mobile terminal 700, the mobile terminal 700 is inhibited from entering the idle mode. As a result, the power consumption of the mobile terminal 700 cannot be reduced, which can cause the operating time to be significantly shortened due to battery exhaustion. This is a serious problem for terminals for mobile use.

Although the above problem is controversial in the configuration shown in FIG. 1 also, it is particularly significant in the case of using the home base station (H(e)NB 1100) shown in FIG. 3. This is because, in the configuration of FIG. 3, the external network 20 that is connected to the anchor GW 100 is a home network of a user, and smooth coordination with information home appliances is required.

The present invention is accomplished in view of the above problems, and an exemplary object of the present invention is to provide a mobile communication system capable of selectively transferring a multicast packet or a broadcast packet to be transferred to a mobile terminal without requiring support of IGMP or MLD by the mobile terminal and equipment located in an external network, and a device, a method and a program contributing to the same.

Solution to Problem

A first exemplary aspect of the present invention relates to a gateway device. The gateway device is located at a boundary between a radio access network to conduct wireless communication with a mobile terminal or a core network connected to the radio access network and an external network. The gateway device includes a channel management unit, a pass-through packet determination unit, and a transfer policy control unit. The channel management unit terminates a logical downlink channel for transmitting a packet to the mobile terminal and a logical uplink channel for receiving a packet from the mobile terminal. The pass-through packet determination unit controls whether to transfer a packet arriving from the external network to the downlink channel based on a transfer policy. The transfer policy control unit changes the transfer policy based on a signal arriving from the mobile terminal. Specifically, the transfer policy control unit changes the transfer policy to enable transfer of a multicast packet or a broadcast packet to the mobile terminal by the downlink channel in response to receiving from the mobile terminal a signal preliminarily specified as a trigger to start transfer of a multicast packet or a broadcast packet to the mobile terminal by the downlink channel. The gateway device is an anchor GW (P-GW) located at a boundary between the core network and the external network or a home base station having an anchor GW function located at a boundary between the radio access network and the external network.

A second exemplary aspect of the present invention relates to a mobile communication system. The mobile communication system includes a radio access network to conduct wireless communication with a mobile terminal, a core network connected to the radio access network, and a gateway device located at a boundary between the radio access network or the core network and an external network and including an interface connectable to the external network. Further, the gateway device has the same configuration as the gateway device according to the first exemplary aspect described above.

A third exemplary aspect of the present invention relates to a mobile terminal that conducts communication with an upper network including a radio base station. The mobile terminal includes a radio interface, a communication control unit, and a packet transfer request unit. The radio interface is wirelessly connectable to the radio base station. The communication control unit transmits and receives a packet to and from the upper network via the radio interface. The packet transfer request unit transmits a policy setting request to the upper network via the communication control unit and the radio interface. The policy setting request is transmitted to request the upper network to transfer a multicast packet or a broadcast packet arriving at the upper network from an external network from the upper network to the mobile terminal. Further, the policy setting request contains transfer policy information for specifying a multicast packet or a broadcast packet requested to be transferred. Furthermore, the transfer policy information contains protocol information of an upper layer than Layer 3 indicating an attribute of the multicast packet or the broadcast packet requested to be transferred. Note that the upper network includes a core network and a radio access network, for example.

A fourth exemplary aspect of the present invention relates to a packet transfer control method at a boundary between a radio access network to conduct wireless communication with a mobile terminal or a core network connected to the radio access network and an external network. The method includes the following (a) and (b):

(a) determining whether a signal preliminarily specified as a trigger to start transfer of a multicast packet or a broadcast packet to a downlink channel for transmitting a packet to the mobile terminal is received from the mobile terminal via an uplink channel; and (b) changing a packet transfer policy from the external network to the downlink channel to enable transfer of a multicast packet or a broadcast packet arriving from the external network to the mobile terminal in response to receiving the preliminarily specified signal.

A fifth exemplary aspect of the present invention relates to a control method of a mobile terminal that conducts communication with an upper network including a radio base station. The method includes transmitting a policy setting request to the upper network via a radio interface wirelessly connectable to the radio base station. The policy setting request is transmitted to request the upper network to transfer a multicast packet or a broadcast packet arriving at the upper network from an external network from the upper network to the mobile terminal. Further, the policy setting request contains transfer policy information for specifying a multicast packet or a broadcast packet requested to be transferred. Furthermore, the transfer policy information contains protocol information of an upper layer than Layer 3 indicating an attribute of the multicast packet or the broadcast packet requested to be transferred.

A sixth exemplary aspect of the present invention is a program causing a computer to execute the same packet transfer control as the fourth exemplary aspect described above.

A seventh exemplary aspect of the present invention is a program causing a computer to execute the same control related to a mobile terminal as the fifth exemplary aspect described above.

Advantageous Effects of Invention

According to each of the exemplary aspects of the present invention described above, it is possible to provide a mobile communication system capable of selectively transferring a multicast packet or a broadcast packet to be transferred to a mobile terminal without requiring support of IGMP or MLD by the mobile terminal and equipment located in an external network, and a device, a method and a program contributing to the same.

BRIEF DESCRIPTION OF DRAWINGS

FIG. 5 is a diagram showing an example of a detection target table in the first exemplary embodiment of the present invention;

FIG. 10 is a diagram showing an example of a pass-through packet policy table in the second exemplary embodiment of the present invention;

DESCRIPTION OF EMBODIMENTS

Figure 1:
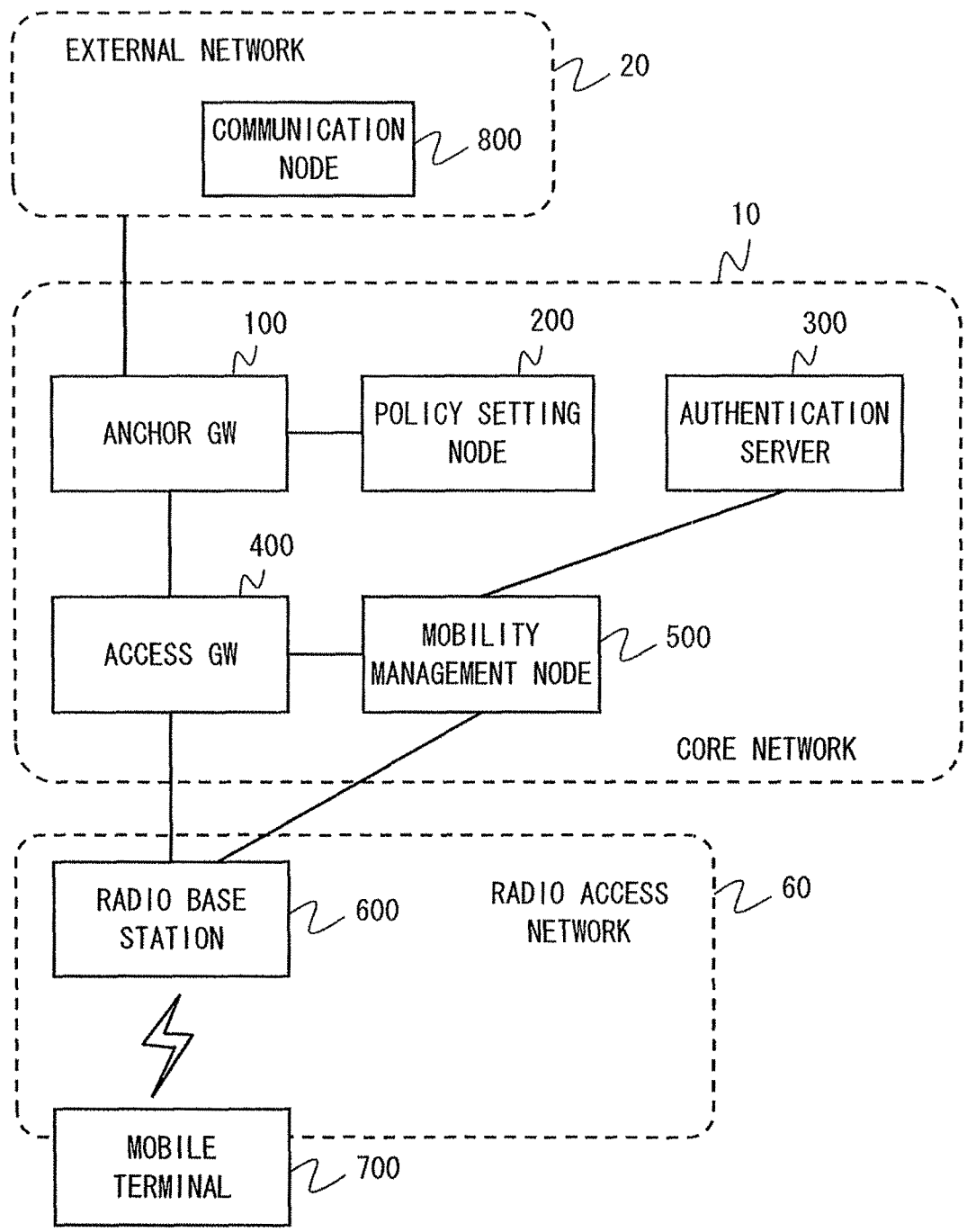
FIG. 1 is a diagram showing a mobile communication system according to background art.

Specific exemplary embodiments of the present invention will be described hereinafter in detail with reference to the drawings. In the drawings, the same elements are denoted by the same reference symbols and redundant explanation will be omitted according to need to clarify the explanation.

First Exemplary Embodiment

Figure 3:
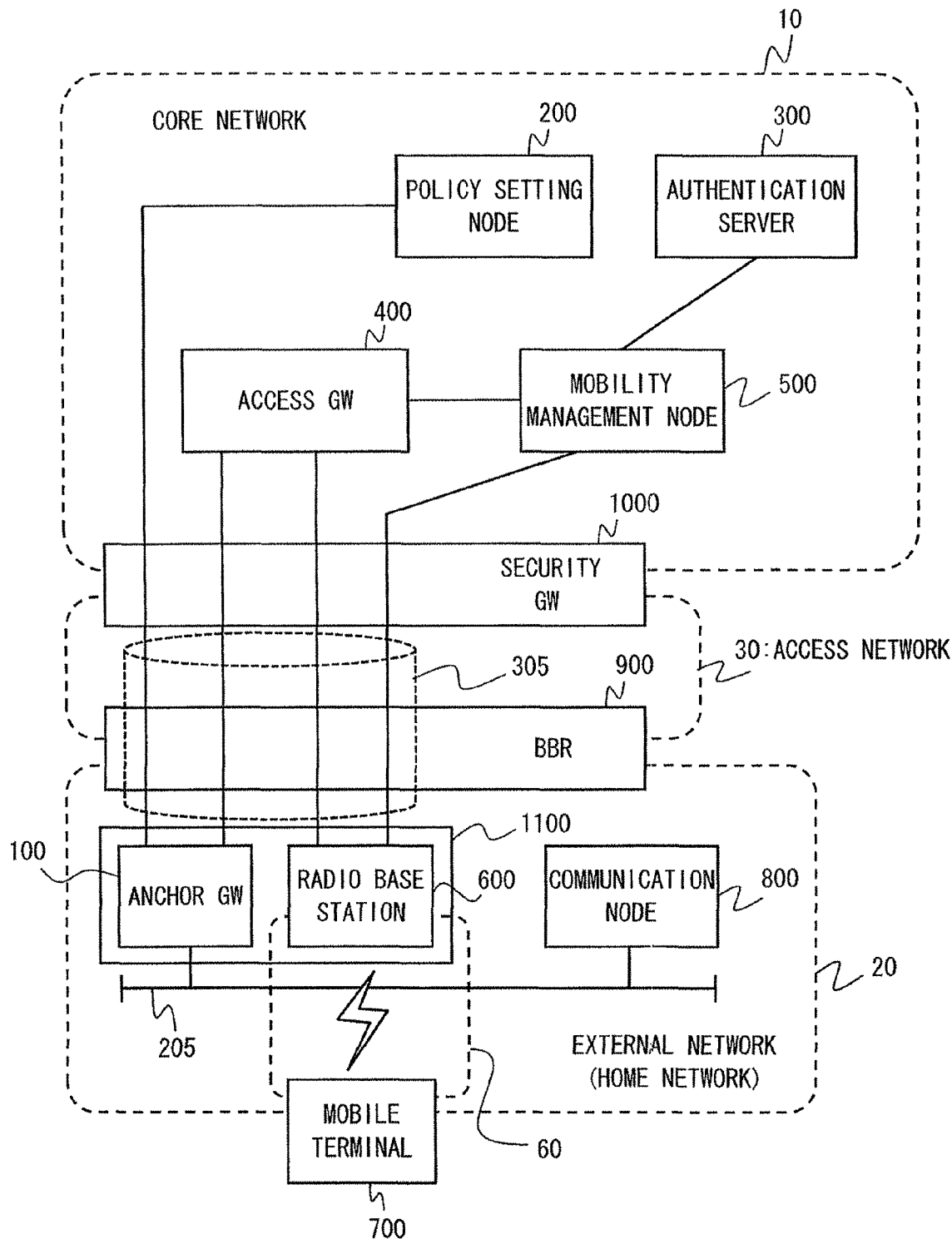
FIG. 3 is a diagram showing a configuration of a mobile communication system including a home base station in which an anchor GW and a radio base station are integrated.

An overall configuration of a mobile communication system according to a first exemplary embodiment of the present invention may be the same as the configuration shown in FIG. 1 or 3. In this exemplary embodiment, improvements of the anchor GW 100 according to background art are described. For distinguishing from the anchor GW according to background art, the anchor GW according to this exemplary embodiment is referred to as an anchor GW 100A.

Description of Configuration

Figure 4:
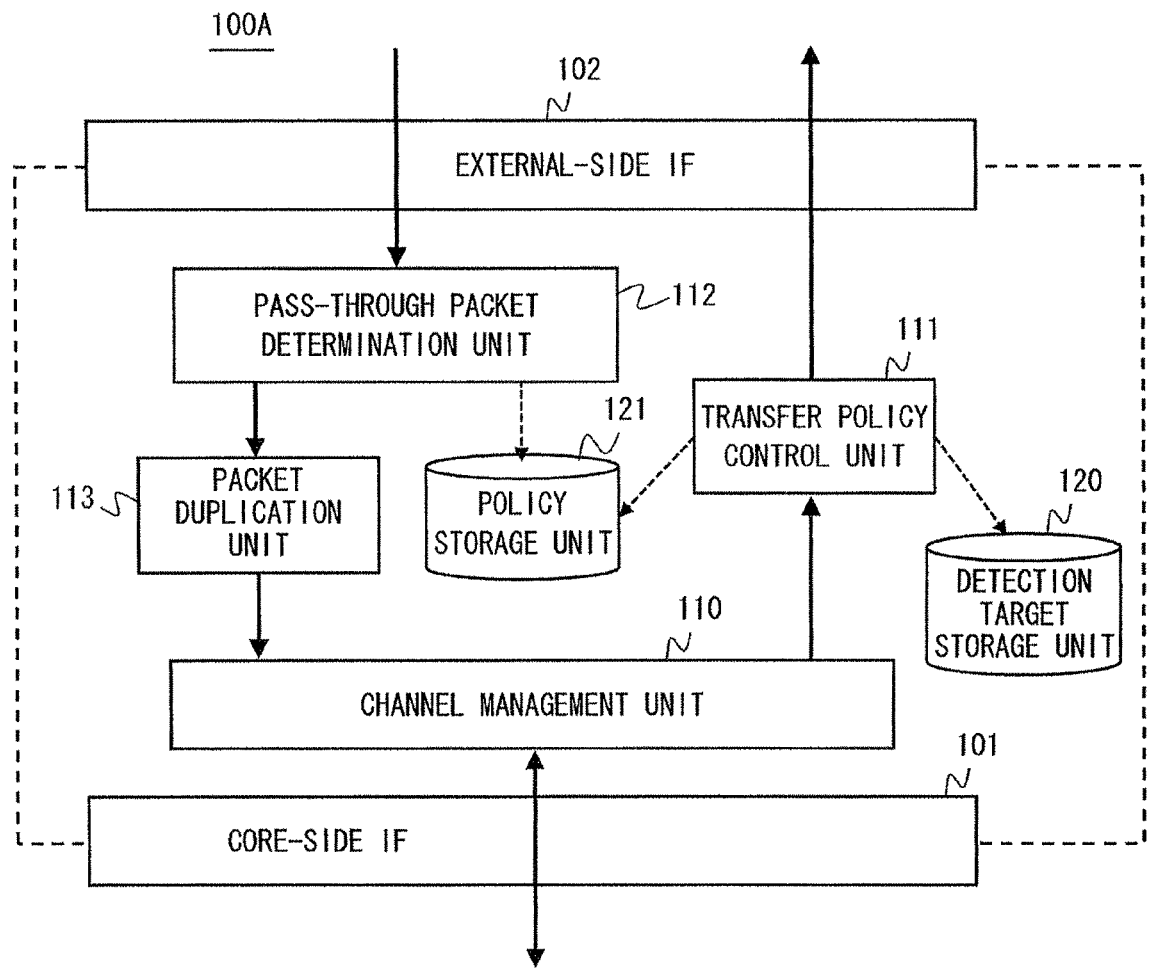
FIG. 4 is a diagram showing an anchor GW in a first exemplary embodiment of the present invention.

FIG. 4 is a block diagram showing a configuration example of the anchor GW 100A according to this exemplary embodiment. As shown in FIG. 4, the anchor GW 100A includes a core-side interface 101, an external-side interface 102, a channel management unit 110, a transfer policy control unit 111, a pass-through packet determination unit 112, a packet duplication unit 113, a detection target storage unit 120, and a policy storage unit 121. Note that FIG. 4 shows the configuration focusing on components necessary for description of this exemplary embodiment, and the details of the anchor GW 100A are not illustrated.

The core-side interface 101 is an interface for transmitting and receiving IP packets to and from the mobile terminal 700 through a channel logically built between the anchor GW 100A and the mobile terminal 700.

The external-side interface 102 is an interface connected to the external network 20, and it is an interface for transmitting and receiving IP packets to and from the communication node 800 located in the external network 20.

The channel management unit 110 terminates a downlink channel and an uplink channel established between the anchor GW 100A and the mobile terminal 700. The downlink channel is a logical channel through which an IP packet can be transmitted to the mobile terminal 700, and the uplink channel is a logical channel through which an IP packet can be received from the mobile terminal 700. When the channel management unit 110 receives an IP packet transmitted from the mobile terminal 700 connected under the radio base station 600 through the uplink channel, the channel management unit 110 supplies it to the transfer policy control unit 111. At this time, the channel management unit 110 outputs transfer destination identification information for identifying the channel through which the IP packet has been transmitted in association with the IP packet to the transfer policy control unit 111.

The channel management unit 110 further receives IP packets duplicated by the packet duplication unit 113, selects an appropriate downlink channel based on "transfer destination identification information" associated with each of the IP packets, and transfers each IP packet to the mobile terminal 700 through the downlink channel. As the transfer destination identification information, the IP address of the mobile terminal 700, a channel identifier for identifying the downlink channel, or both of them may be used. Further, other information may he used as the transfer destination identification information as long as it is information for specifying a channel to which the IP packet should be transferred. In the case of the 3GPP, TEID (Tunnel Endpoint Identifier) may be used, for example.

Further, when the channel is deleted because the mobile terminal 700 leaves the network or the like, the channel management unit 110 gives a notification indicating the deletion of the channel together with the identifier of the channel to the transfer policy control unit 111. At this time, if the IP address of the mobile terminal 700 using the channel can be acquired, it may be also output to the transfer policy control unit 111.

The transfer policy control unit 111 checks the contents of the IP packet in the uplink direction received from the channel management unit 110 and compares a destination IP address, a destination port number and a protocol type of the IP packet with a "detection target table" stored in the detection target storage unit 120. Note that information used for the comparison between the detection target table and the uplink IP packet may be only some of the destination IP address, the destination port and the protocol type described above. Further, the comparison may be made using those three information and other information in addition.

When a matching entry is found by the comparison with the detection target table, the transfer policy control unit 111 reads "pass-through packet information" recorded in the matching entry from the detection target storage unit 120. The "pass-through packet information" is used for determination as to whether or not to let the downlink IP packet pass by a packet filter in the downlink direction (the pass-through packet determination unit 112 described later). Therefore, the transfer policy control unit 111 stores the read "pass-through packet information" in association with "transfer destination identification information" into a pass-through packet policy table in the policy storage unit 121. The pass-through packet policy table is referred to by the pass-through packet determination unit 112 to make determination as to whether to let the IP packet in the downlink direction pass or not.

Further, after performing the above processing, the transfer policy control unit 111 sends out the uplink IP packet to the external network 20 through the external-side interface 102 regardless of the comparison result with the detection target table.

FIG. 5 shows a specific example of the detection target table stored in the detection target storage unit 120. In the example of FIG. 5, the detection target table contains a destination IP address, a destination port number and a protocol type as information for comparison with the uplink IP address. Further, the detection target table of FIG. 5 contains "pass-through packet information". As described above, the pass-through packet information is reflected in the policy storage unit 121 for determination about the passing of the downlink IP packet when the uplink IP packet matches the entry (the destination IP address, the destination port number and the protocol type).

In the example of FIG. 5, the pass-through packet information contains a local IP address, a local port number, and a protocol type. Note that the pass-through packet information may contain only some of those information or may further contain other information. The local IP address and the local port number mean a destination P address and a destination port number that are assigned to the downlink IP packet received from the external network 20 by the anchor GW 100. The destination IP address and the destination port that are stored in the detection target table is information contained in the uplink IP packet and the direction of transfer is different from the pass-through packet information. Therefore, the term "local" is used for the pass-through packet information.

The uplink IP packet assumed as a detection target in the example of FIG. 5 is a packet related to SSDP or mDNS. Thus, information for detecting SSDP (destination IP address=239.255.255.250, destination port number=1900, protocol type=udp) is described in the first entry of the detection target table illustrated in FIG. 5. Further, information for detecting mDNS (destination IP address=224.0.0.251, destination port number=5353, protocol type=udp) is described in the second entry. The pass-through packet information corresponding to those entries also indicate SSDP or mDNS.

Note that default values of the destination address and the destination port number are determined for SSDP and mDNS. Therefore, a protocol name (SSDP, mDNS etc.), for example, may be described in the "pass-through packet information" of the detection target table without clearly indicating the destination address, the destination port number, the protocol type or the like. Further, although an IPv4 address is shown as the IP address, an IPv6 address may be used instead. Furthermore, the information of the detection target table may be set in advance or set as appropriate through an interface with the outside.

Referring back to FIG. 4, the transfer policy control unit 111 may use information other than the IP address, the port number and the protocol type to detect a detection target packet from among the IP packet flow in the uplink direction as is already described above. For example, the transfer policy control unit 111 can use an SSDP message type as other information. Specifically, in the case where an ssdp:byebye message is detected, it can be determined that a transmitter (the mobile terminal 700) of the packet no longer shares the contents. Thus, in this case, the transfer policy control unit 111 may delete the corresponding entry from the policy storage unit 121 using the transfer destination identification information input from the channel management unit 110. Further, a notification indicating channel deletion may be input from the channel management unit 110 to the transfer policy control unit 111. In this case also, the transfer policy control unit 111 may delete the corresponding entry from the policy storage unit 121 using the transfer destination identification information added to the notification. Thus, when the mobile terminal 700 enters the state where it can no longer receive a multicast packet or a broadcast packet such as SSDP and mDNS or no longer needs to receive them, it is possible to immediately cease to perform transfer of such IP packets.

Figures 6, 7:
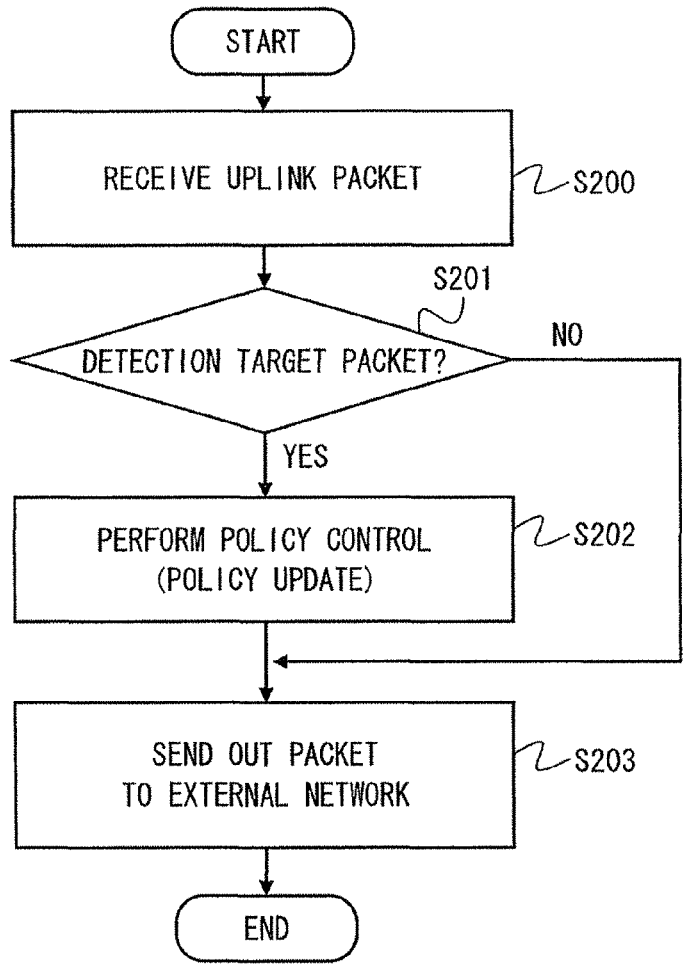
FIG. 6 is a diagram showing an example of a pass-through packet policy table in the first exemplary embodiment of the present invention.
FIG. 7 is a flowchart showing an operation when the anchor GW in the first exemplary embodiment of the present invention receives a packet from a mobile terminal.

Next, a specific example of the pass-through packet policy table stored in the policy storage unit 121 is described. FIG. 6 shows a specific example of the pass-through packet policy table. In the example of FIG. 6, the pass-through packet policy table stores a local IP address, a local port number, a protocol type and transfer destination identification information in association with one another. The local IP address and the local port number indicate a destination IP address and a destination port number contained in the header of the downlink IP packet that is received by the anchor GW 100 from the external network 20 through the external-side interface 102.

As described above, the transfer destination identification information may be information that can specify a channel to which the downlink IP packet should be transferred, and the IP address of the mobile terminal 700, a channel identifier for identifying a downlink channel, or both of them may be used, for example. In the example of FIG. 6, the IP address of the mobile terminal 700 (denoted as MS_IP* where * is a numeral) and the channel identifier (denoted as TEID_*) are used as the transfer destination information. Further, a plurality of transfer destination identification information may be stored in one entry of the pass-through packet policy table. In the example of FIG. 6, the transfer destination identification information for two mobile terminals 700 are stored in the first entry designated by the local IP address 255.255.255.250.

Referring back again to FIG. 4, the pass-through packet determination unit 112 determines whether to transfer the downlink IP packet received through the external-side interface 102 to the mobile terminal 700 by referring to the pass-through packet policy table stored in the policy storage unit 121. Stated more specifically, the pass-through packet determination unit 112 may determine whether the received downlink IP packet meets any of the conditions to allow packets to pass (the local IP address, the local port number, the protocol type) stored in the pass-through packet policy table. When the downlink IP packet meets the conditions to allow packets to pass, the pass-through packet determination unit 112 outputs the downlink IP packet to the packet duplication unit 113 as a target of transfer to the mobile terminal 700. At this time, the transfer destination identification information is also supplied together with the downlink IP packet to the packet duplication unit 113.

As one example, consider the case where the pass-through packet determination unit 112 receives the downlink IP packet in which destination IP address: 239.255.255.250, destination port number: 1900, and protocol type: UDP are indicated in the header and makes determination by reference to the table of FIG. 6. In this case, the pass-through packet determination unit 112 allows the downlink IP packet to pass based on matching with the first entry of FIG. 6. Thus, the pass-through packet determination unit 112 outputs the IP packet together with two transfer destination identification information {IMS_IP1,TEID_1} and {IMS_IP2,TEID_2} to the packet duplication unit 113.

Note that the anchor GW 100A has a function of transferring a unicast IP packet addressed to the IP address of the mobile terminal 700, just like the anchor GW 100 according to background art. Because the function may he the same as that of the anchor GW 100 according to background art, the repeated explanation of the same is omitted.

When the packet duplication unit 113 receives the downlink IP packet and the transfer destination identification information from the pass-through packet determination unit 112, the packet duplication unit 113 duplicates the IP packet to create IP packets of the same number as the number of transfer destinations indicated by the transfer destination identification information. The packet duplication unit 113 outputs the duplicated IP packets together with the transfer destination information indicating the respective transfer destinations to the channel management unit 110. At this time, the destination address of the duplicated IP packet may be rewritten into the IP address of the mobile terminal 700 contained in the transfer destination identification information. In other words, the packet duplication unit 113 may convert a multicast packet or a broadcast packet into a unicast packet addressed to each mobile terminal 700.

The detection target storage unit 120 stores the detection target table as shown in FIG. 5. The stored detection target table is referred to by the transfer policy control unit 111.

The policy storage unit 121 stores the pass-through packet policy table as shown in FIG. 6. As described earlier, addition, update and deletion of an entry in the pass-through packet policy table are performed by the transfer policy control unit 111. Such operation of an entry is performed for each of the transfer destination identification information. The pass-through packet policy table stored in the policy storage unit 121 is referred to by the pass-through packet determination unit 112.

The core-side interface 101 and the external-side interface 102 shown in FIG. 4 can be implemented by NIC (Network Interface Card) and software (driver) causing the NIC to operate, for example. Further, a device that can store information such as a semiconductor memory or a hard disk drive may be used as the detection target storage unit 120 and the policy storage unit 121. The other functional blocks can be implemented by hardware such as ASIC (Application Specific Integrated Circuit) or software. Further, a part of the processing may be implemented by software and the rest may be implemented by hardware. In the implication by software, programs related to the processing of the functional blocks may be executed by a computer system that includes one or a plurality of CPUs (Central Processing Units), such as a microprocessor. Those programs can be stored and provided to a computer using any type of non-transitory computer readable medium. The non-transitory computer readable medium includes any type of tangible storage medium. Examples of the non-transitory computer readable medium include a magnetic storage medium (such as a floppy disk, magnetic tape, hard disk drive, etc.), an optical magnetic storage medium (e.g. a magneto-optical disk), CD-ROM (Read Only Memory), CD-R, CD-R/W, and a semiconductor memory (such as a mask ROM, PROM (Programmable ROM), EPROM (Erasable PROM), flash ROM, RAM (Random Access Memory), etc.). Further, the programs may be provided to a computer using any type of transitory computer readable medium. Examples of the transitory computer readable medium include an electric signal, an optical signal, and an electromagnetic wave. The transitory computer readable medium can provide the program to a computer via a wired communication line such as electric wire or an optical fiber or via a wireless communication line.

Description of Operation

Hereinafter, the operation of the anchor GW 100A according to this exemplary embodiment is described using the flowchart of FIG. 7. FIG. 7 shows a process when the anchor GW 100A receives an uplink IP packet through the core-side interface 101.

First, in Step S200, the channel management unit 110 outputs the received uplink IP packet together with the transfer destination identification information to the transfer policy control unit 111. Next, in Step S201, the transfer policy control unit 111 determines whether it is a packet for which update of the transfer policy applied to the downlink IP packet is necessary or not using the input information of the IP packet and the detection target table in the detection target storage unit 120 or a channel deletion notification from the channel management unit 110. The update of the transfer policy includes allowing or inhibiting transfer of a multicast packet or a broadcast packet in the downlink direction.

When an entry matching the detection target table is found, the transfer policy control unit 111 determines that it is a packet for which update of the transfer policy is necessary (YES in Step S201), and Step S202 is performed. On the other hand, when a matching entry is not found (NO in Step S201), Step S202 is skipped and Step S203 is performed. Further, when a channel deletion notification is received from the channel management unit 110, the transfer policy control unit 111 determines that update of the transfer policy is necessary and performs Step S202.

In Step S202, the transfer policy control unit 111 adds an entry to the pass-through packet policy table stored in the policy storage unit 121 using the pass-through packet information stored in the entry in the detection target table detected in Step S201. The procedure to add the entry is as described above. Further, as described earlier, when the transfer policy control unit 111 receives an ssdp:byebye message or a channel deletion notification, deletion of the entry from the pass-through packet policy table is performed.

Finally, in Step 203, the transfer policy control unit 111 supplies the uplink IP packet to the external-side interface 102. The external-side interface 102 sends out the uplink IP packet to the external network 20.

Hereinafter, an operation when the anchor GW 100A receives the downlink IP packet from the external network 20 is described using the flowchart of FIG. 8. First, in Step S300, the pass-through packet determination unit 112 compares information (for example, a destination IP address, a destination port number and a protocol type) of the received downlink IP packet with information (for example, a local IP address, a local port number, and a protocol type) of each entry in the pass-through packet table of the policy storage unit 121.

Next, in Step S301, the pass-through packet determination unit 112 determines whether to transfer or discard the downlink packet. Stated more specifically, when a matching entry is found in the comparison in Step S301 (YES in Step S301), it proceeds to Step S302 to perform duplication of the packet. On the other hand, when a matching entry is not found (NO in Step S301), the pass-through packet determination unit 112 discards the downlink IP packet without transferring it (Step S304).

In Step S302, the pass-through packet determination unit 112 reads the transfer destination identification information of the matching entry in the pass-through packet table. When a plurality of transfer destination identification information are set, all of the transfer destination identification information are read. Then, the packet duplication unit 113 duplicates the IP packet to create IP packets of the same number as the number of the read transfer destination identification information, associates transfer destination identification information with each of the duplicated downlink IP packets and then outputs the IP packets to the channel management unit 110.

In Step S303, the channel management unit 110 sends out each of the input IP packets to an appropriate channel using the transfer destination identification information associated with the IP packet. As a result, those IP packets are transferred to the mobile terminal 700.

Figure 8:
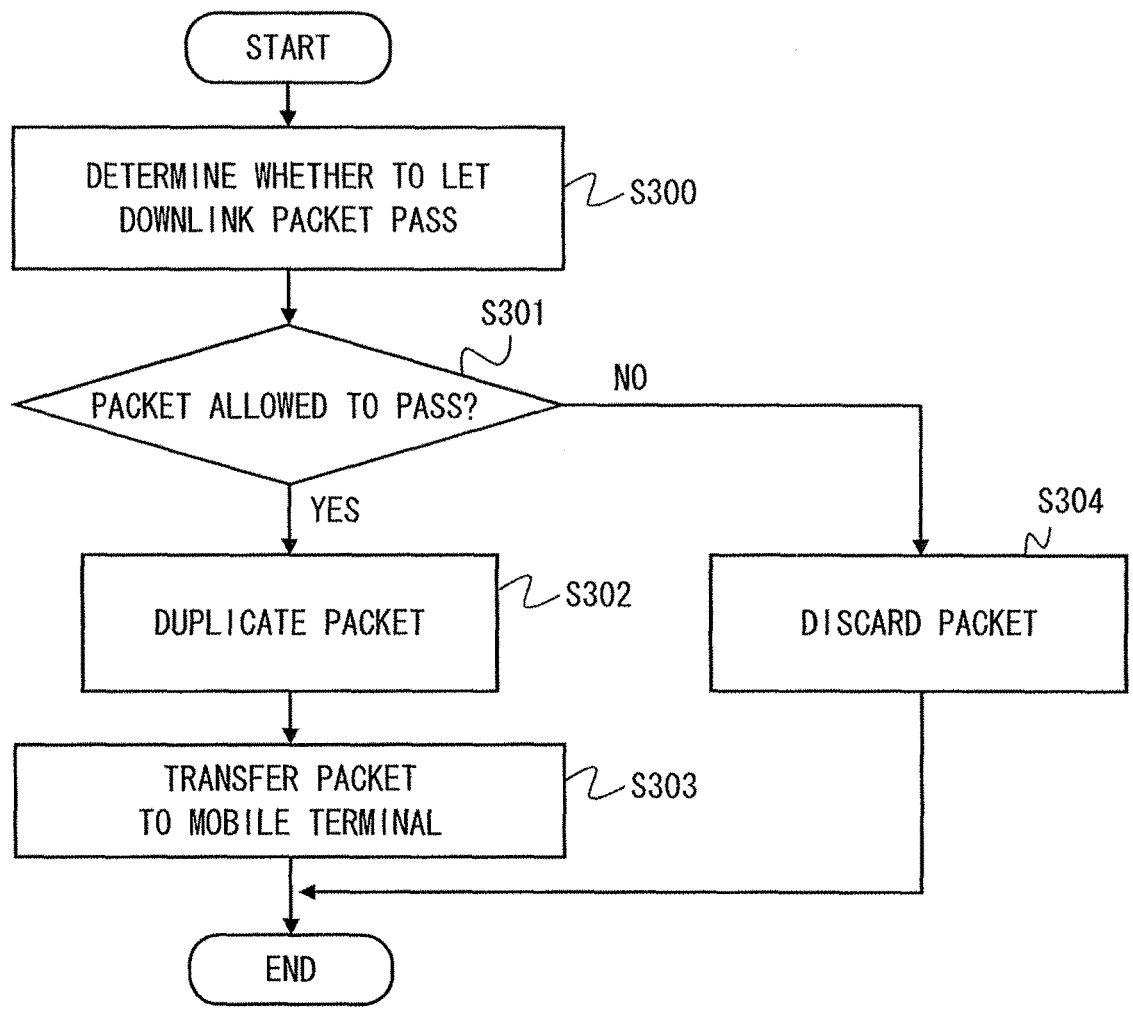
FIG. 8 is a flowchart showing an operation when the anchor GW in the first exemplary embodiment of the present invention receives a packet from a communication node in an external network.

Note that the downlink IP packet for which determination about passing is made in Step S300 of FIG. 8 is a multicast packet and a broadcast packet. The unicast IP packet in which the IP address of the mobile terminal 700 is set as the destination address is transferred to the mobile terminal 700 through an appropriate channel regardless of the procedure of FIG. 8, just like the anchor GW 100 according to background art.

As is obvious from the above description, according to this exemplary embodiment, a multicast packet such as SSDP or mDNS can be transferred to the mobile terminal 700 when the mobile terminal 700 needs it. Therefore, by running an application such as DLNA. UPnP or Bonjour on the mobile terminal 700, smooth coordination between equipment such as an information home appliance located in the external network 20 (home network etc.) and the mobile terminal 700 can be achieved.

Further, according to this exemplary embodiment, whether to transfer a multicast packet or a broadcast packet in the downlink direction to the mobile terminal 700 is determined based on the uplink packet that has been preliminarily received from the mobile terminal 700. Therefore, it is possible to selectively transfer a multicast packet or a broadcast packet in the downlink direction only when the mobile terminal 700 needs to receive those packets, and block transfer of those packets when the mobile terminal 700 does not need to receive them. In other words, unnecessary multicast packet and broadcast packet are not transferred to the mobile terminal 700. It is thus possible to suppress reduction of the utilization ratio of a radio resource between the mobile terminal 700 and the radio base station 600. Further, the mobile terminal 700 is not inhibited from entering the idle mode to suppress power consumption.

Further, consider specifically the case where the mobile terminal 700 connects to a home network as the external network 20, which is one of suitable applications of this exemplary embodiment. When DLNA, UPnP or Bonjour is running on the mobile terminal 700, the mobile terminal 700 transmits a multicast packet related to SSDP or mDNS to the uplink. The anchor GW 100A may transfer the SSDP packet or mDNS packet in the downlink direction from the external network 20 (home network) to the mobile terminal 700 in response to detecting the SSDP packet or mDNS packet in the uplink direction from the mobile terminal 700. Further, the anchor GW 100A may stop transfer of the SSDP packet in the downlink direction when the anchor GW 100A detects the SSDP packet that contains an ssdp:byebye message transmitted in the uplink direction from the mobile terminal 700. Furthermore, the anchor GW 100A may also stop transfer of the multicast packet in the downlink direction when the channel to the mobile terminal 700 is deleted because the mobile terminal 700 leaves the mobile communication system.

Second Exemplary Embodiment

Description of Configuration

Figure 9:
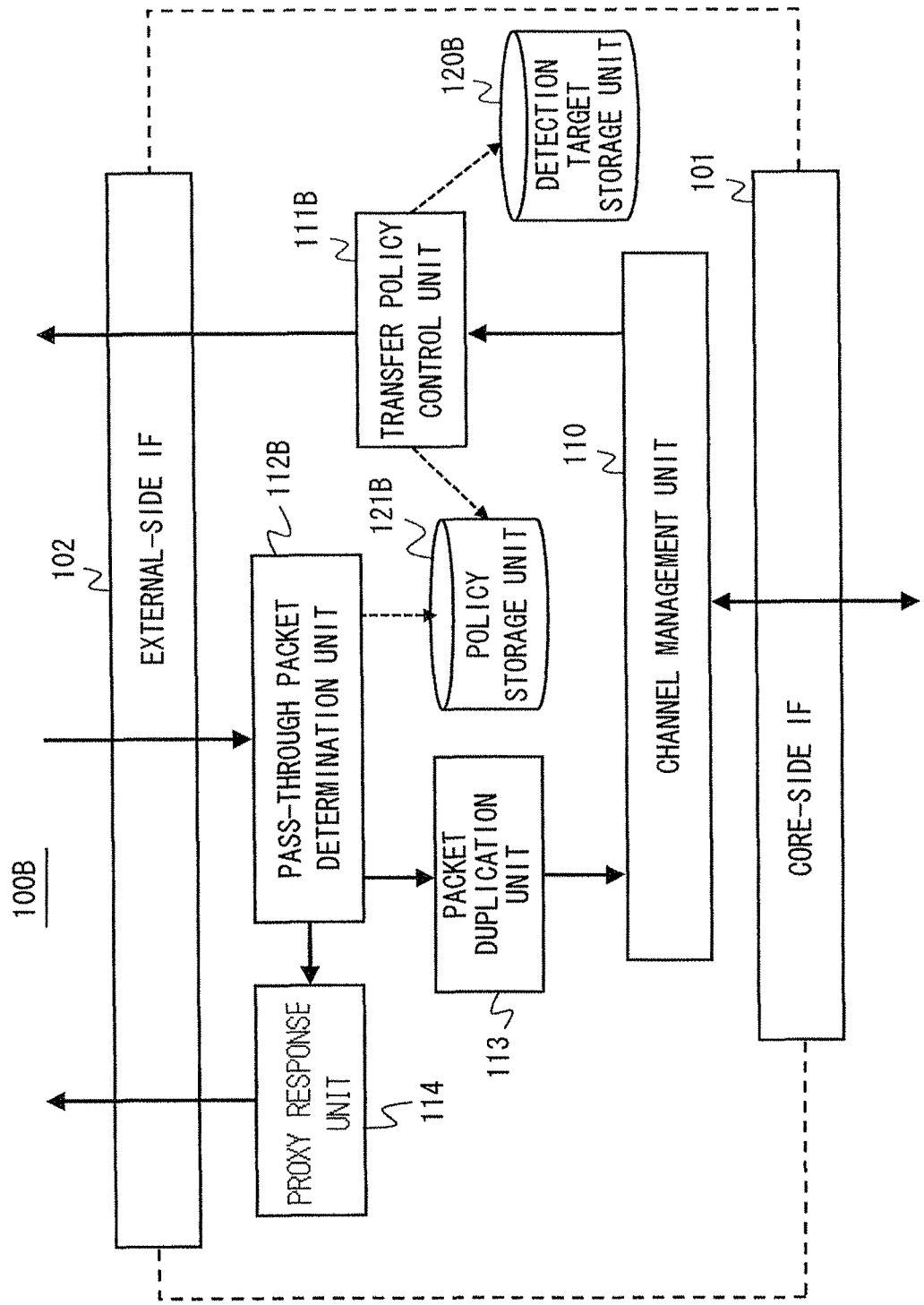
FIG. 9 is a diagram showing an anchor GW in a second exemplary embodiment of the present invention.

In this exemplary embodiment, improvements of the anchor GW 100A described in the first exemplary embodiment are described. An overall configuration of a mobile communication system according to this exemplary embodiment may be the same as the configuration shown in FIG. 1 or 3. FIG. 9 is a block diagram showing a configuration example of an anchor GW 100B according to this exemplary embodiment. The anchor GW 100B shown in FIG. 9 includes a proxy response unit 114 in addition to the elements of the anchor GW 100A shown in FIG. 4. Further, the processing performed by a transfer policy control unit 111B, a pass-through packet determination unit 112B and a policy storage unit 121B are partly different from those of the transfer policy control unit 111, the pass-through packet determination unit 112 and the policy storage unit 121 shown in FIG. 4. Differences between this exemplary embodiment and the first exemplary embodiment are primarily described below.

The transfer policy control unit 111B performs the following processing in addition to the processing performed by the transfer policy control unit 111 shown in FIG. 4. Specifically, when a detection target packet is detected from among the IP packet flow in the uplink direction received from the mobile terminal 700, the transfer policy control unit 111B stores the contents of the packet. At this time, the transfer policy control unit 111B may check out the contents of the detection target packets and store only the packet corresponding to a given type rather than storing all of the detection target packets. Further, the expiration time of the packet may be associated in addition. The packet may be stored into the pass-through packet policy table stored in the policy storage unit 121B or another storage unit different from the policy storage unit 121B. The stored packet is used for "proxy response" described later.

An operation example in the case where a packet related to SSDP or mDNS is received from the mobile terminal 700 is described by way of illustration. When the transfer policy control unit 111B detects the packet related to SSDP or mDNS from the packet flow in the uplink direction, it further checks out the contents. When the packet in the uplink direction contains a message for which proxy response is possible in the payload, the transfer policy control unit 111B stores the detected packet when adding an entry to the pass-through packet policy table in the policy storage unit 121B.

An example of the packet that contains the message for which proxy response is possible is a response packet to a request transmitted from the other end of communication for the purpose of finding a neighboring node or acquiring content information. Another example of the packet that contains the message for which proxy response is possible is a packet that is transmitted by the mobile terminal 700 to notify (broadcast) the presence of its own node and the contents held and the function supported. The packet (message) transmitted for notification or response is an ssdp:alive message and an ssdp:all message in the case of SSDP, and it is a DNS response message in the case of mDNS.

FIG. 10 is a diagram showing a specific example of the pass-through packet policy table stored in the policy storage unit 121B. In the example of FIG. 10, the contents of the uplink IP packet received from the mobile terminal 700 are stored in association with an entry for policy setting to the downlink IP packet. Specifically, a response information field is added as shown in FIG. 10.

Further, there is a possibility that the need to individually handle a response to a specific communication node 800 arises. Therefore, as shown in FIG. 10, the field of a remote IP address may be included. The remote IP address is an IP address on the communication node 800 side in the external network 20, and it corresponds to a destination IP address when sending out a packet to the external network 20 through the external-side interface 102 or a source IP address when receiving a packet from the external network 20. Note that "Any" in the remote IP address field indicates that a remote IP address is not specified. A specific remote IP address ("Node1_IP") is designated in the first entry of the pass-through packet policy table of FIG. 10, and a specific remote IP address is not designated ("Any") in the second entry. In this case, it is preferable that the pass-through packet determination unit 112B preferentially uses the entry in which a remote IP address is exactly designated at the time of finding an entry matching the downlink IP packet from among the pass-through packet policy table.

The example of FIG. 10 is given by way of illustration as a matter of course. The pass-through packet policy table in this exemplary embodiment may use information other than the field shown in FIG. 10 to make determination about passing with a consideration of the upper layer or determination about proxy response, for example. Further, as described earlier, a field to set the expiration time of the response packet may be prepared. On the other hand, only some of the fields shown in FIG. 10 may be used.

The first exemplary embodiment described above captures an uplink IP packet to trigger the start of transfer of a multicast packet or a broadcast packet in the downlink direction. Therefore, as a typical example, the transfer policy control unit 111 included in the anchor GW 100A according to the first exemplary embodiment may capture a service discovery multicast packet transmitted from the mobile terminal 700 as illustrated in the detection target table of FIG. 5.

On the other hand, in this exemplary embodiment, the transfer policy control unit 111B needs to capture a response packet transmitted to a unicast address. Therefore, the condition for the transfer policy control unit 111B to detect a detection target packet is "Any", that is, it is necessary to capture a packet with any destination address. In this case, to capture a response of SSDP and DNS response, the transfer policy control unit 111B may monitor the destination port number and the protocol type of the uplink IP packet. Note that the port number of DNS is 53, which is different from mDNS. Further, to identify an ssdp:alive message or an ssdp:all message, the transfer policy control unit 111B needs to check out information of the upper layer. Therefore, the condition for checking it out may be added to the detection target table in the detection target storage unit 120B. For example, when the destination port is 1900, a field to instruct to check whether a character string "ssdp:alive", "ssdp:all" is contained in the payload of the udp packet may be added to the detection target table.

Referring back to FIG. 9, the pass-through packet determination unit 112B operates in the same manner as the pass-through packet determination unit 112 in the first exemplary embodiment described above. Further, when, as a result of searching the pass-through packet policy table in the policy storage unit 121B, an entry matching a downlink IP packet is found and further response information is set in the response information field, the determination unit 112B outputs the response information to the proxy response unit 114. When the expiration time is set for the response information, the pass-through packet determination unit 112B may compare the current time with the expiration time and treat the expired response information as nonexistent. The pass-through packet determination unit 112B may output information added to the received downlink IP packet, such as a source IP address, together with the response information to the proxy response unit 114. This is because such information can be used to generate a proxy response packet.

When the response information is output to the proxy response unit 114, the pass-through packet determination unit 112B does not output the corresponding downlink IP packet to the packet duplication unit 113. In other words, the downlink IP packet is not transferred to the mobile terminal 700.

When the proxy response unit 114 receives the response information from the pass-through packet determination unit 112B, the proxy response unit 114 generates a response packet to the communication node 800 using the response information and transmits it. The proxy response unit 114 may rewrite the destination IP address of the response packet into the IP address of the communication node 800 acquired from the pass-through packet determination unit 112B according to need.

Thus, the proxy response unit 114 sends a response back on behalf of the mobile terminal 700 when the communication node 800 makes the same request to the mobile terminal 700 using information contained in the packet sent in the past by the mobile terminal 700 in response to a service discovery request using SSDP or mDNS transmitted by the communication node 800.

The core-side interface 101 and the external-side interface 102 shown in FIG. 9 can be implemented by NIC and software (driver) causing the NIC to operate, for example. Further, a device that can store information such as a semiconductor memory or a hard disk drive may be used as the detection target storage unit 120B and the policy storage unit 121B. Implementation with hardware such as ASIC or software is possible. Further, a part of the processing may be implemented by software and the rest may be implemented by hardware. In the implication by software, programs related to the processing of the functional blocks may be executed by a computer system that includes one or a plurality of CPUs, such as a microprocessor.

Description of Operation

Figure 11:
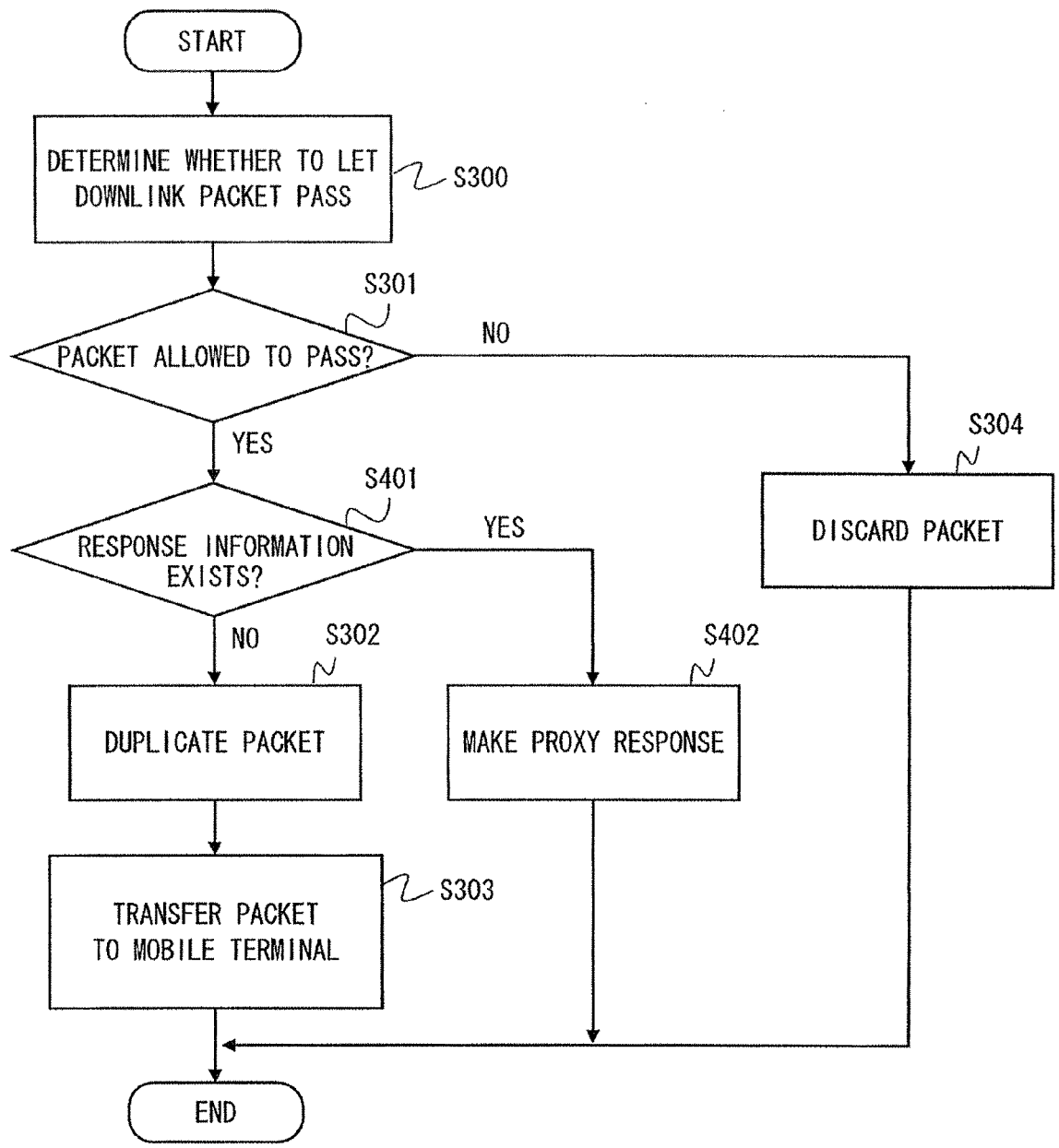
FIG. 11 is a flowchart showing an operation when the anchor GW in the second exemplary embodiment of the present invention receives a packet from a communication node in an external network.

Hereinafter, the operation of the anchor GW 100B is described using the flowchart of FIG. 11. FIG. 11 shows a process when the anchor GW 100B receives an IP packet from the external network 20 through the external-side interface 102. In FIG. 11, processing steps other than those related to proxy response are the same as those in the case of the first exemplary embodiment shown in FIG. 8. Therefore, the same Steps S300 to S304 are denoted by the same reference symbols as in FIG. 8 and the redundant explanation thereof is omitted.

In Step S401 of FIG. 11, it is checked whether valid response information is stored in the entry of the pass-through packet policy table which matches the downlink IP packet that is found in Steps S300 and S301. When the valid response information is stored (YES in Step S401), Step S402 is processed. On the other hand, when the valid response information is not stored (NO in Step S401), duplication of the packet and transfer to the mobile terminal 700 are performed in Steps S302 and S303.

In Step S402, the proxy response unit 114 generates a response packet to the received downlink IP packet using the response information described in the pass-through packet policy table. The proxy response unit 114 transmits the generated response packet to the external network 20 through the external-side interface 102. In this case, transfer of the downlink IP packet for which a proxy response has been made to the mobile terminal 700 is stopped.

As described above, according to this exemplary embodiment, when information already notified or responded in the past by the mobile terminal 700 is requested again by the communication node 800, the anchor GW 100B terminates the request and transmits a response packet on behalf of the mobile terminal 700. It is thus possible to suppress the number of multicast packets and broadcast packets transmitted to the mobile terminal 700 without interfering with smooth coordination between the communication node 800 and the mobile terminal 700. As a result, the mobile terminal 700 can enter the idle mode more easily than in the first exemplary embodiment and suppress power consumption.

Third Exemplary Embodiment

In the first and second exemplary embodiments described above, the example in which the anchor GWs 100A and 100B include the transfer policy control unit 111 and 111B, respectively, and autonomously update the policy setting for the IP packet flow in the downlink direction according to the content of the uplink IP packet received from the mobile terminal 700, and further autonomously switch whether or not to transfer a multicast packet or a broadcast packet in the downlink direction is described. On the other hand, in this exemplary embodiment, an anchor GW 100C is configured to receive a policy setting request from a mobile terminal 700C and update the transfer policy of the downlink IP packet in coordination with an external policy setting node 200C. Differences between this exemplary embodiment and the first and second exemplary embodiments are primarily described below.

Description of Configuration

Figure 12:
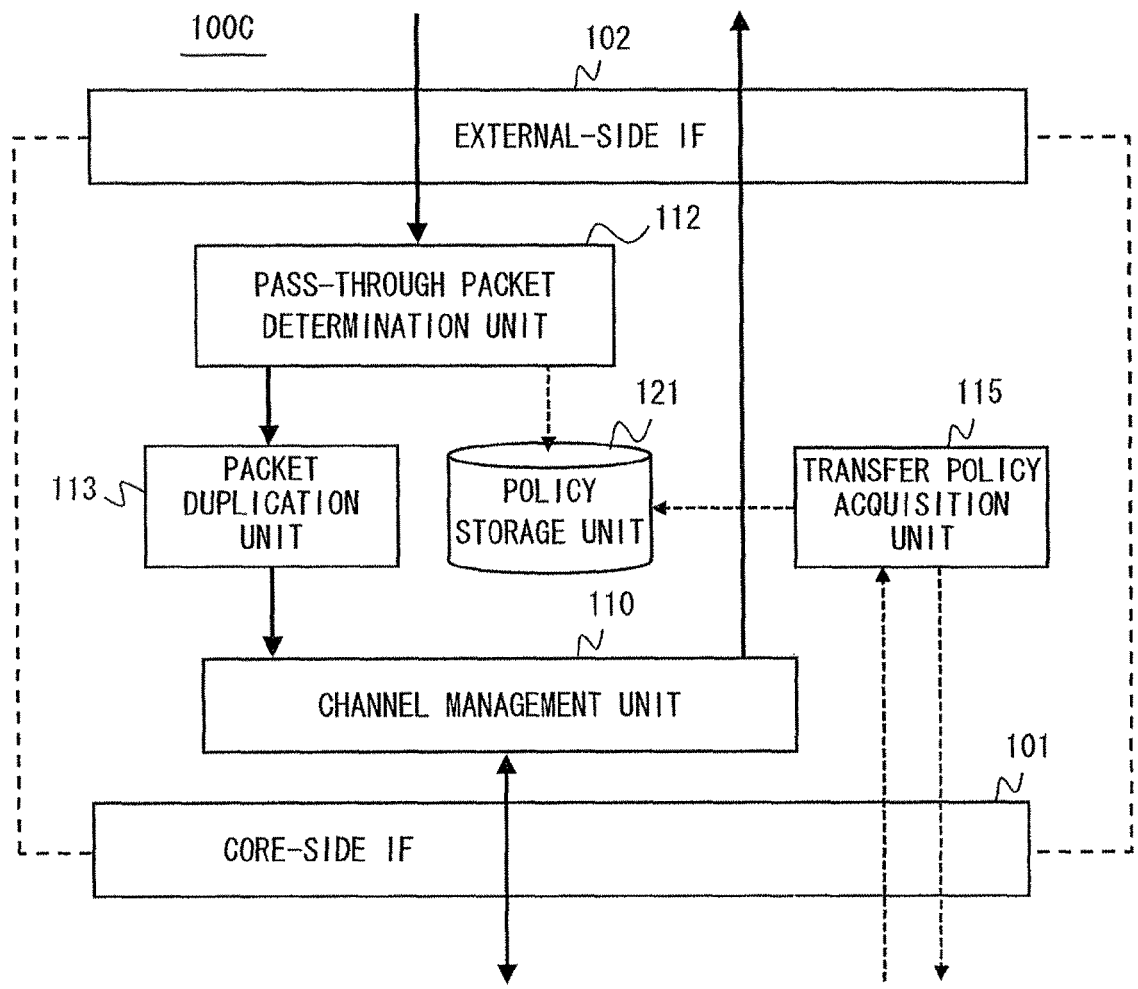
FIG. 12 is a diagram showing an anchor GW in a third exemplary embodiment of the present invention.

An overall configuration of a mobile communication system according to this exemplary embodiment may he the same as the configuration shown in FIG. 1 or 3. FIG. 12 is a block diagram showing a configuration example of the anchor GW 100C according to this exemplary embodiment. A difference between the configuration of FIG. 12 and the configuration shown in FIG. 4 is that the anchor GW 100C of FIG. 12 does not include the transfer policy control unit 111 and the detection target storage unit 120 and includes a transfer policy acquisition unit 115 in place of them. The other elements of FIG. 12 have the same configurations and functions as those in the first exemplary embodiment, and the redundant explanation thereof is omitted.

When the transfer policy acquisition unit 115 receives a transfer policy setting request from the mobile terminal 700C, it transfers the request to the policy setting node 200C and receives a response (transfer policy setting response) from the policy setting node 200. The response contains designation of changes in policy setting in accordance with the transfer policy setting request, that is, to be more specific, information for specifying a multicast packet or a broadcast packet for which transfer in the downlink direction should be allowed. The information is referred to hereinafter as "transfer policy information"

The transfer policy acquisition unit 115 adds an entry to the pass-through packet policy table of the policy storage unit 121 by reference to the transfer policy information received from the policy setting node 200C. After that, the transfer policy acquisition unit 115 transfers a transfer policy setting response to the mobile terminal 700.

Further, when information indicating deletion of an entry is set to the transfer policy information received from the policy setting node 200C, the transfer policy acquisition unit 115 deletes the corresponding entry from the pass-through packet policy table.

Note that, when designation of a transfer policy is contained in the transfer policy setting request transmitted from the mobile terminal, the transfer policy acquisition unit 115 may perform addition, update or deletion of an entry according to the request from the mobile terminal 700 in the pass-through packet policy table without transferring the transfer policy setting request to the policy setting node 200C. However, even when the designation of the transfer policy is contained in the transfer policy setting request transmitted from the mobile terminal, the transfer policy setting request may be transferred to the policy setting node 200C on that the policy setting node 200C makes approval of policy setting.

Figures 13, 14:
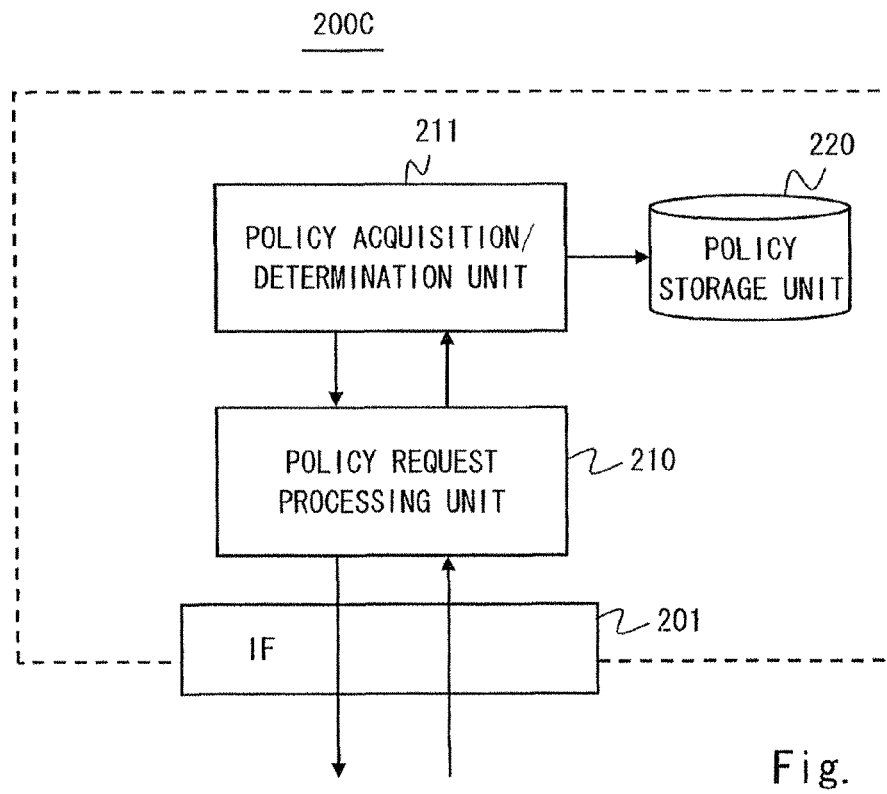
FIG. 13 is a diagram showing a policy setting node in the third exemplary embodiment of the present invention.
FIG. 14 is a diagram showing an example of a transfer decision table in the third exemplary embodiment of the present invention.

As shown in FIG. 13, the policy setting node 200C in this exemplary embodiment includes an interface 201, a policy request processing unit 210, a policy acquisition/determination unit 211, and a policy storage unit 220. The interface 201 is an interface for transmitting and receiving packets, and it can be implemented by NIC such as a LAN card and software (driver) causing the NIC to operate, for example.

When the policy request processing unit 210 receives a transfer policy setting request from the anchor GW 100C, it supplies information contained in the transfer policy setting request to the policy acquisition/determination unit 211 to ask for determination as to whether or not to allow transfer of a multicast packet or a broadcast packet in the downlink direction. As a result, the policy request processing unit 210 receives a decision about transfer and, when update of policy setting is needed, transfer policy information from the policy acquisition/determination unit 211. The policy request processing unit 210 sends out a transfer policy setting response that contains information indicating whether transfer can be made or not and, when update of policy setting is needed, the transfer policy information to the anchor GW 100C.

Using the information received from the policy request processing unit 210, the policy acquisition/determination unit 211 refers to a transfer decision table stored in the policy storage unit 220 and acquires whether transfer of a multicast packet or a broadcast packet is possible and, when it is possible, the condition for the IP packet to be transferred. The policy storage unit 220 stores the above-described transfer decision table, and the information is referred to by the policy acquisition/determination unit 211. As the contents stored in the transfer decision table, it is not necessary to explicitly contain information as to whether transfer can be made or not. In this case, the policy acquisition/determination unit 211 may determine that transfer is possible based on that the condition for the IP packet to be transferred is stored in the policy storage unit 220 and determine that transfer is not possible based on that the condition for the IP packet to be transferred is not stored in the policy storage unit 220.

FIG. 14 shows a specific example of the transfer decision table stored in the policy storage unit 220. In the example of FIG. 14, the transfer decision table contains a terminal identifier, an anchor GW identifier, a radio base station identifier, transfer decision information, and transfer target packet information. However, other information may be further contained, or only some of those may be used. MN-NAI (Mobile Node-Network Access Identifier), APN (Access Point Name) and CSGID (Closed Subscriber Group Identity) may be used respectively as the terminal identifier, the anchor GW identifier and the radio base station identifier in the case of the 3GPP, though other information may be used. For the information that is not necessary to be a specific value, "Any" can be set as described in the "terminal identifier" of the second entry of FIG. 14.

The transfer target packet information contains information such as the destination IP address, the destination port and the protocol type of a packet to be transferred, for example. The transfer target packet information may contain information of the upper layer to apply a more detailed policy. For example, in the case of SSDP, policy setting information indicating transfer of only a ssdp:discover message may be contained. In this case, there is a case where information contained in the policy setting request matches a plurality of entries contained in the transfer decision table. Thus, the policy acquisition/determination unit 211 may preferentially use the entry in which specific values are set in more fields (that is, less "Any" settings are made).

Note that, as described earlier, one of circumstances where the anchor GW 100C accepts transfer of a multicast packet or a broadcast packet in the downlink direction is the case where the external network 20 to which the anchor GW 100C connects is a home network. Thus, when information indicating a connection to a home network as the external network is contained in the transfer policy setting request from the mobile terminal 700C, the policy setting node 200C may determine that transfer of a multicast packet or a broadcast packet in the downlink direction is possible. The information indicating a connection to a home network may be contained in the transfer policy setting request as single information, or the information may be encoded in APN or CSGID. Further, a connection of the mobile terminal 700C to a home network may be determined by preparing a correspondence table and checking APN or CSGID against the correspondence table. In other words, an anchor GW connected to the home base station may be identified by APN, and a home base station may be identified by CSGID.

Figure 15:
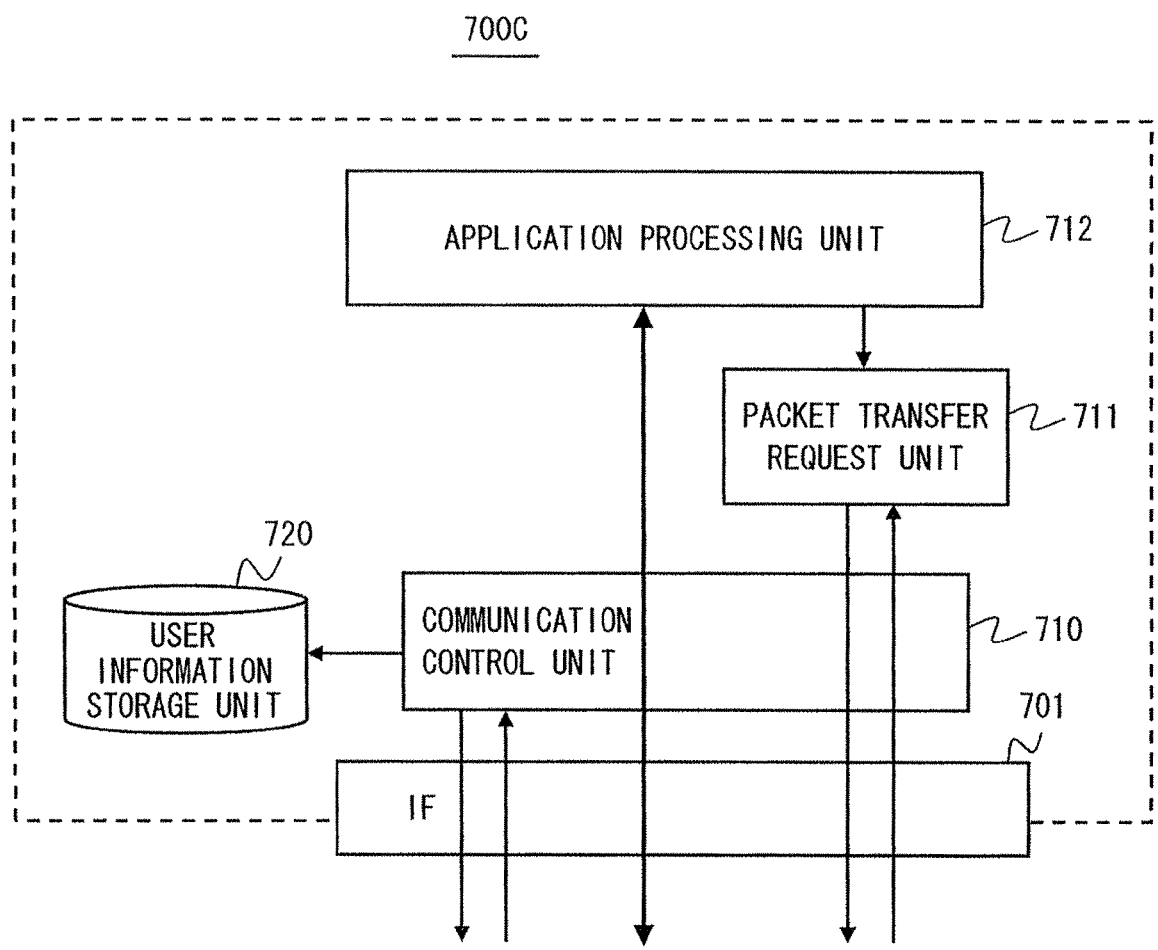
FIG. 15 is a diagram showing a mobile terminal in the third exemplary embodiment of the present invention.

Next, the mobile terminal 700C according to this exemplary embodiment is described. FIG. 15 is a block diagram showing a configuration example of the mobile terminal 700C. In the example of FIG. 15, the mobile terminal 700C includes an interface 701, a communication control unit 710, a packet transfer request unit 711, an application processing unit 712, and a user information storage unit 720. The elements other than the packet transfer request unit 711 may be the same as the elements included in the mobile terminal 700 described in background art.

The interface 701 is a communication interface that is used when communicating with each node of the core network 10 and the external network 20, and has a function of connecting to the radio base station 600 by radio technology.

Figure 2:
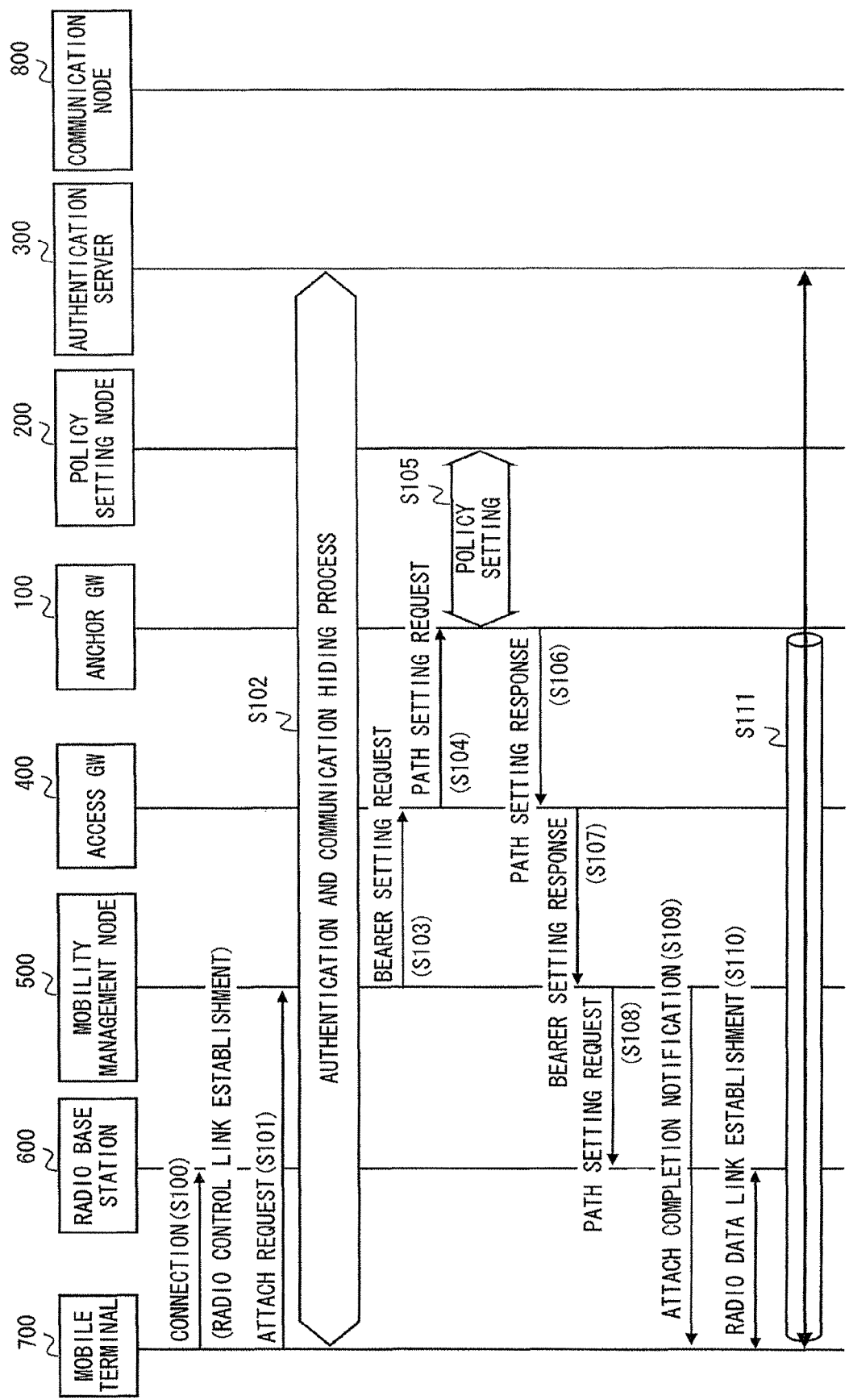
FIG. 2 is a sequence chart showing a process when a mobile terminal connects to a network in the mobile communication system of FIG. 1.

The communication control unit 710 exchanges signals with the node in the core network 10 according to the operation procedure when the mobile terminal 700 connects to the network, which is described using FIG. 2. A channel through which an IP packet can be transmitted and received is thereby established. During this procedure, the communication control unit 710 executes authentication using user information stored in the user information storage unit 720. The communication control unit 710 further performs signaling for connecting to the radio base station 600, transition of the mobile terminal 700C to the idle mode, and return from the idle mode.

The packet transfer request unit 711 transmits a transfer policy setting request to the anchor GW 100 upon occurrence of an event specified in advance. The specified event may be receiving a request from the application processing unit 712, setting a channel according to the procedure of FIG. 2 by the mobile terminal 700, completing channel setting, returning from the idle mode and the like.

The transfer policy setting request generated by the packet transfer request unit 711 may contain specific information (for example, a destination IP address, a destination port number, a protocol type and the like) of a multicast packet or a broadcast packet that is requested to be transferred or contain only information indicating the intention to make a transfer request. In the latter case, specific information about an IP packet that is allowed to be transferred may depend on the determination on the network side.

Further, the packet transfer request unit 711 does not necessarily explicitly request transfer of a multicast packet or a broadcast packet in the downlink direction. In other words, the packet transfer request unit 711 may indirectly request transfer of a multicast packet or a broadcast packet by sending at least one of the identifier of the anchor GW connecting to the home network and the identifier of the radio base station 600 located in the home network.

The application processing unit 712 has a function of executing an application program. The application processing unit 712 may request the packet transfer request unit 711 to transfer a multicast packet or a broadcast packet in the downlink direction upon execution of an application program to make coordination between equipments in the home network (for example, an application compatible with DLNA, UPnP, Bonjour).

The user information storage unit 720 stores subscriber information of a user. The subscriber information includes a user identifier, secret information for performing authentication and the like. As described above, the user information storage unit 720 is the same as the element included in the mobile terminal 700 according to background art. For example, an IC card (UICC:Universal Integrated Circuit Card) that stores an USIM (Universal Subscriber Identity Module) application corresponds to the user information storage unit 720.

The core-side interface 101, the external-side interface 102, the interface 201 and the interface 701 described using FIGS. 12, 13 and 15 can be implemented by NIC and software (driver) causing the NIC to operate, for example. Further, a device that can store information such as a semiconductor memory or a hard disk drive may be used as the policy storage unit 121, the policy storage unit 220 and the user information storage unit 720. The other functional blocks can be implemented by hardware such as ASIC or software. Further, a part of the processing may be implemented by software and the rest may be implemented by hardware. In the implication by software, programs related to the processing of the functional blocks may be executed by a computer system that includes one or a plurality of CPUs, such as a microprocessor.

Description of Operation

Figure 16:
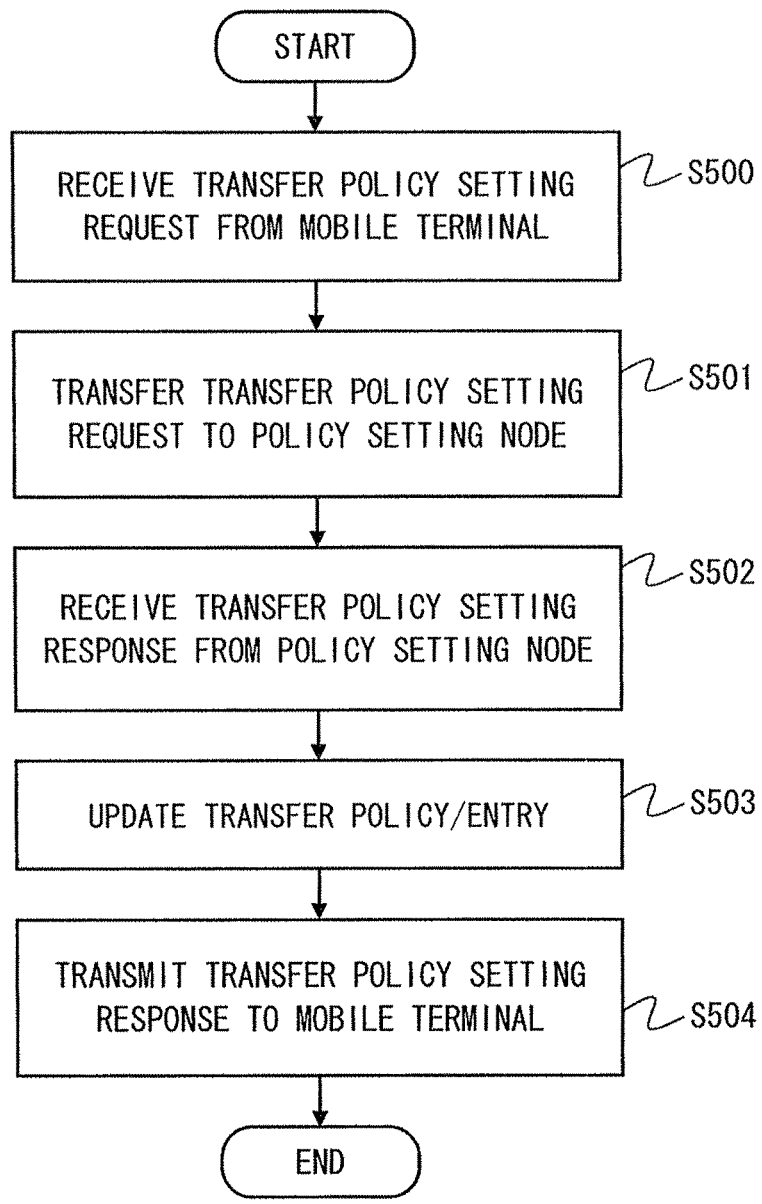
FIG. 16 is a flowchart showing an operation when the anchor GW in the third exemplary embodiment of the present invention receives a transfer policy setting request.

Hereinafter, the operations of the anchor GW 100C, the policy setting node 200C and the mobile terminal 700C are described using the flowcharts of FIGS. 16 to 18. FIG. 16 shows an operation when the anchor GW 100C receives a transfer policy setting request through the core-side interface 101.

First, in Step S500, the transfer policy acquisition unit 115 receives a transfer policy setting request from the mobile terminal 700C. In Step S501, the transfer policy acquisition unit 115 transfers the received transfer policy setting request to the policy setting node 200C. It is assumed that the anchor GW 100C acquires the address of the policy setting node 200C to which the transfer policy setting request is transferred by any method. For example, information of the policy setting node to which inquiry is made may be preliminarily set to the anchor GW 100C.

In Step S502, the transfer policy acquisition unit 115 receives a transfer policy setting response from the policy setting node 200C. In Step S503, the transfer policy acquisition unit 115 acquires transfer policy information contained in the received transfer policy setting response and updates the entry of the pass-through packet policy table of the policy storage unit using the information. Finally, in Step S504, the transfer policy acquisition unit 115 transmits the transfer policy setting response to the mobile terminal 700.

Figure 17:
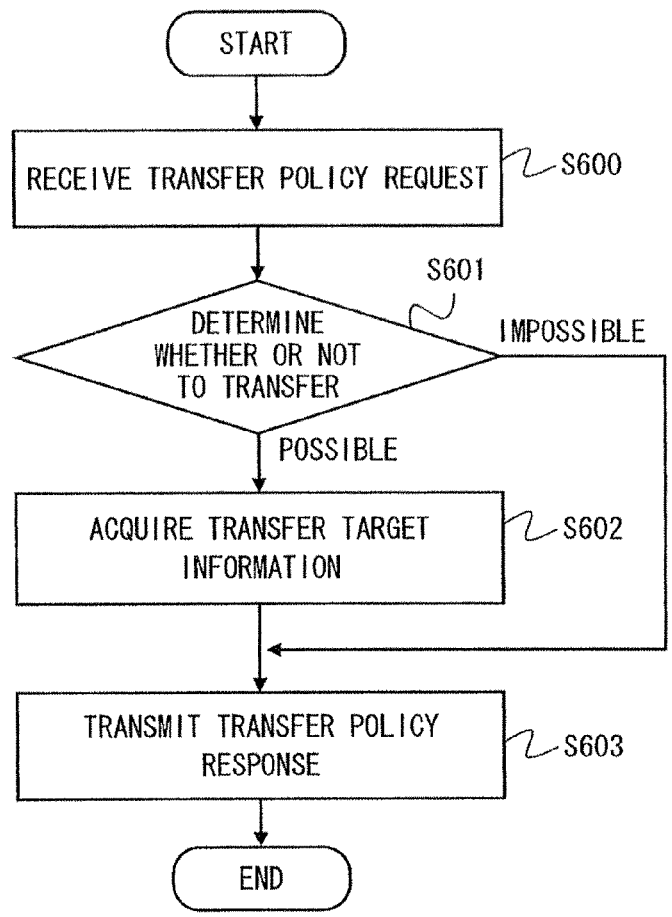
FIG. 17 is a flowchart showing an operation when the policy setting node in the third exemplary embodiment of the present invention receives a transfer policy setting request.

FIG. 17 is described hereinbelow. FIG. 17 is a flowchart showing the operation of the policy setting node 200C when receiving a transfer policy setting request from the anchor GW 100C. In Step S600, the policy request processing unit 210 receives a transfer policy setting request from the anchor GW 100C. Then, the policy request processing unit 210 outputs information contained in the transfer policy setting request to the policy acquisition/determination unit 211.

In Step S601, the policy acquisition/determination unit 211 checks the information received from the policy request processing unit 210 with the transfer decision table of the policy storage unit 220 and determines whether or not to allow the requested transfer of a multicast packet or a broadcast packet in the downlink direction. As a result of determination in Step S601, when transfer is possible, Step S602 is performed. On the other hand, when transfer is not possible, Step S602 is skipped and Step S603 is performed. In this case, information indicating that transfer is not possible is supplied from the policy acquisition/determination unit 211 to the policy request processing unit 210.

In Step S602, the policy acquisition/determination unit 211 acquires the condition for the IP packet to be transferred (transfer policy information) from the transfer decision table and outputs it, together with information indicating that transfer is possible, to the policy request processing unit 210.

Finally, in Step S603, the policy request processing unit 210 adds the transfer decision information and the transfer policy information received from the policy acquisition/determination unit 211 to a transfer policy setting message and transmits it to the anchor GW 100C.

Figure 18:
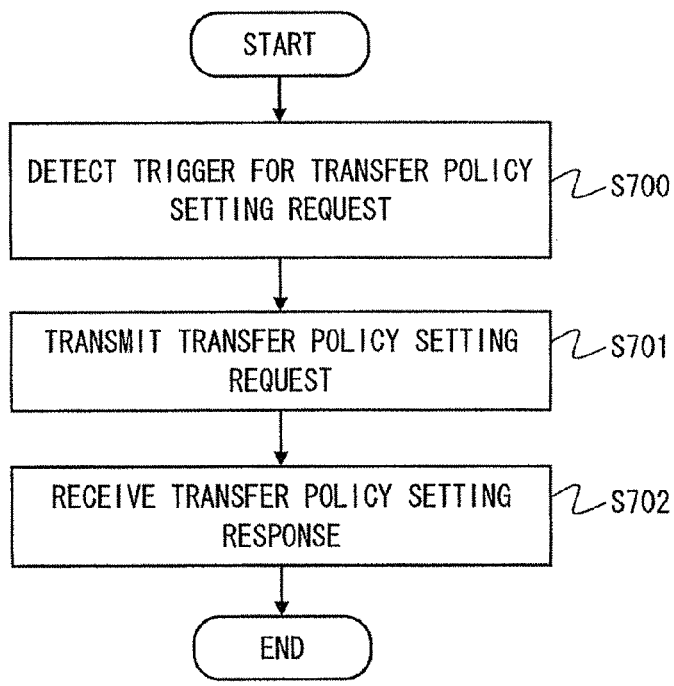
FIG. 18 is a flowchart showing an operation when a trigger to transmit a transfer policy setting request occurs in the mobile terminal in the third exemplary embodiment of the present invention.

FIG. 18 is described hereinbelow. FIG. 18 is a flowchart showing an operation when the mobile terminal 700C transmits a transfer policy setting request to the anchor GW 100C. In Step S700, the packet transfer request unit 711 detects a trigger to transmit a transfer policy setting request. The trigger for transmission is when a request from the application processing unit 712 is received, for example. In Step S701, the packet transfer request unit 711 transmits the transfer policy setting request to the anchor GW 100C. Finally, in Step S702, the packet transfer request unit 711 receives a transfer policy setting response, which is a response to the transfer policy setting request. When the transfer policy setting response indicates that transfer is allowed, the anchor GW 100C starts transfer of a multicast packet or a broadcast packet corresponding to the request to the mobile terminal 700C.

Figure 19:
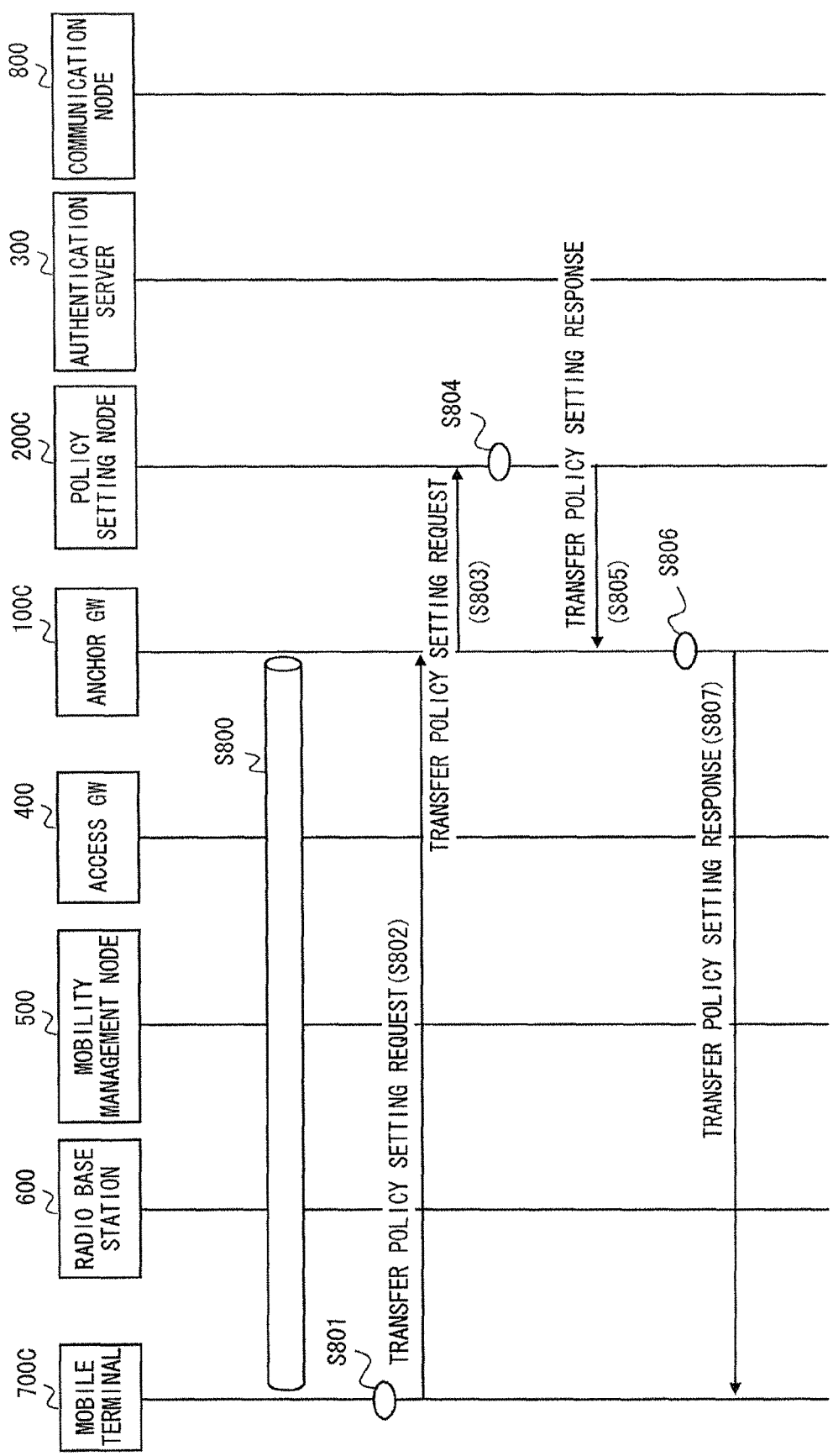
FIG. 19 is a sequence chart showing a flow of a process in the third exemplary embodiment of the present invention (in the case of making transfer policy setting through a policy setting node 200C)

FIG. 19 is a sequence chart to explain signaling related to transfer of a multicast packet or a broadcast packet. First, in Step S800, a channel for transferring IP packets is established between the mobile terminal 700C and the anchor GW 100C. The procedure to establish the channel is the same as the procedure described using FIG. 2.

In Step S801, the mobile terminal 700C detects the occurrence of an event that is specified as a trigger to transmit a transfer policy setting request. In Step S802, the mobile terminal 700C transmits a transfer policy setting request to the anchor GW 100C. The anchor GW 100C receives the transfer policy setting request and transfers it to the policy setting node 200C (Step S803).

The policy setting node 200C receives the transfer policy setting request from the anchor GW 100C and then performs the process according to the flowchart shown in FIG. 17 (Step S804). When the policy setting node 200C determines that transfer of a multicast packet or a broadcast packet corresponding to the request is possible (allowable), the policy setting node 200C sends a transfer policy setting response that contains transfer decision information and transfer policy information to the anchor GW 1000 (Step S805). The case where transfer is possible is assumed in this example.

In Step S806, the anchor GW 100C receives the transfer policy setting response and executes Step S502 and the subsequent steps in the process of the anchor GW 100C shown in FIG. 16. Consequently, the anchor GW 100C becomes ready to transfer a multicast packet or a broadcast packet in the downlink direction corresponding to the request. Finally, in Step S807, the anchor GW 1000 transmits a transfer policy setting response to the mobile terminal 700C.

Figure 20:
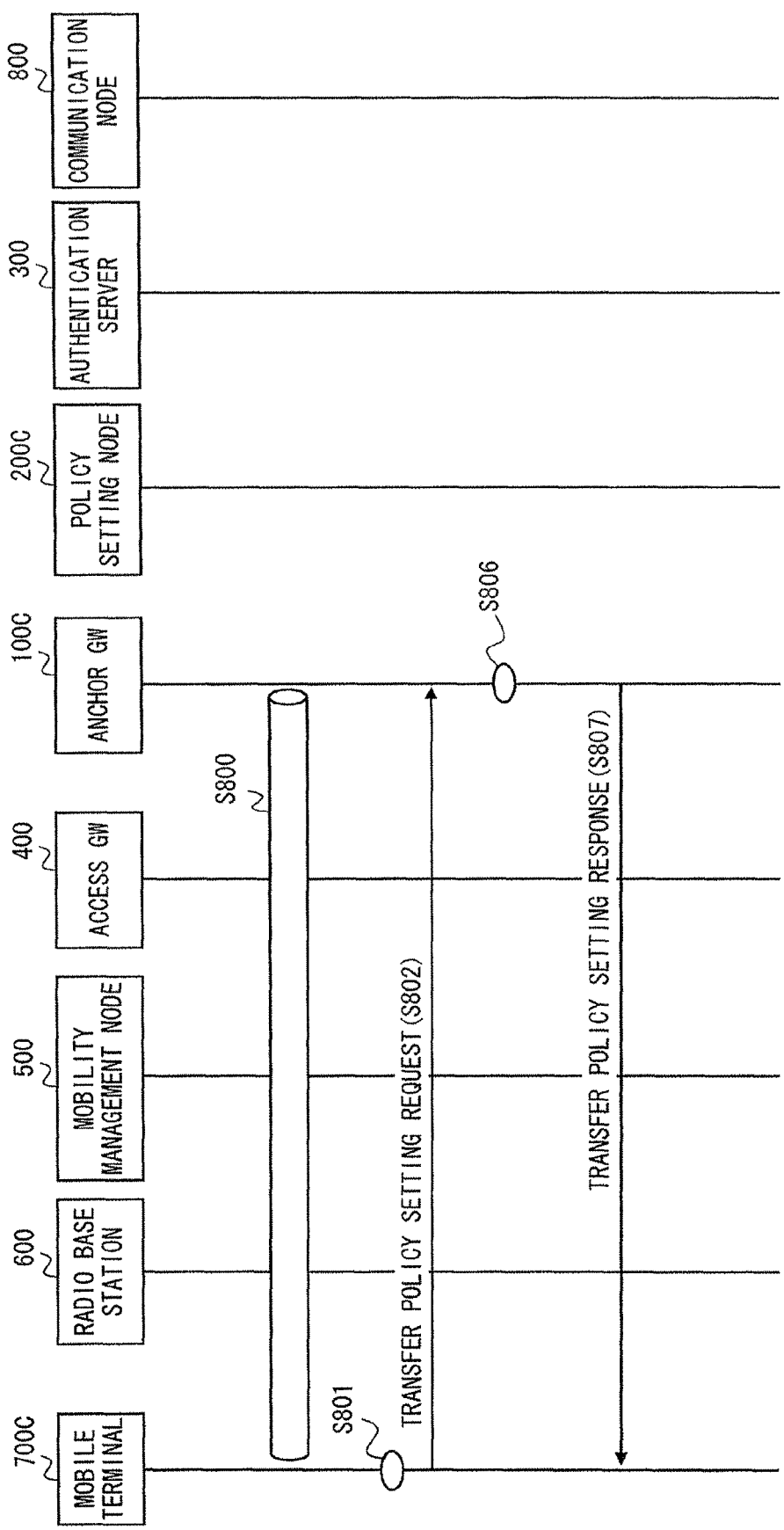
FIG. 20 is a sequence chart showing a flow of a process in the third exemplary embodiment of the present invention (in the case of making transfer policy setting without through a policy setting node 200C)

In FIG. 19, the example in which whether or not to transfer a multicast packet or a broadcast packet is determined by the policy setting node 200C is shown. On the other hand, as described above, the transfer policy acquisition unit 115 of the anchor GW 100C may perform addition, update or deletion of an entry according to a request from the mobile terminal 700 in the pass-through packet policy table without transferring the transfer policy setting request to the policy setting node 200C. FIG. 20 is a sequence chart when the anchor GW 100C makes policy setting related to transfer of a multicast packet or a broadcast packet in the downlink direction in response to a request from the mobile terminal 700C without through the policy setting node 200C. In the example of FIG. 20, the anchor GW 100C receives a transfer policy setting request from the mobile terminal 700C (Step S802) and reflects transfer policy information contained in the request into the pass-through packet policy table (Step S806).

In the examples of FIGS. 19 and 20 described above, the mobile terminal 700C transmits a transfer policy setting request independently of another message. However, the same information as the transfer policy setting request may be added to the attach request (Step S101) in the connection (attach) procedure of the mobile terminal 700 described in FIG. 2, for example. In this case, information for the transfer policy setting request is sent to the anchor GW 100C by the hearer setting request (Step S103) and the path setting request (Step S104). Therefore, the anchor GW 100C can start the policy setting request process in the same manner as the case where the mobile terminal 700C transmits a transfer policy setting request message independently.

According to this exemplary embodiment, whether or not to transfer a multicast packet or a broadcast packet in the downlink direction by the anchor GW 100C, the protocol type for which transfer is allowed and the like can be controlled by the mobile terminal 700C or the policy setting node 200C. Further, this provides flexible compatibility with the case where the number of protocols for which transfer is allowed increases in the future.

Other Exemplary Embodiments and Specific Examples

The second and third exemplary embodiments described above may be combined. In this case, switching between enable and disable of proxy response by the anchor GW 100C may be performed in response a request from the mobile terminal 700C. For example, the mobile terminal 700C (the packet transfer request unit 711) may transmit a transfer policy control signal that contains information for designating enable or disable of proxy response by the anchor GW 100C to the anchor GW 100C. According to the transfer policy control signal, the anchor GW 100C may enable proxy response that is the same as described in the second exemplary embodiment.

Correspondences between the nodes in the first to third exemplary embodiments of the present invention described above and the nodes defined in 3GPP, 3GPP2 and WiMAX Forum are described below.

In the case where each of the exemplary embodiments of the present invention is applied to the mobile communication system in the 3GPP, the anchor GWs 100A to 100C correspond to PDN-GW or GGSN (Gateway GPRS (General Packet Radio Service) Support Node). Further, the policy setting node 200, 200C corresponds to PCRF. Further, the mobile terminal 700, 700C corresponds to UE.

In the case of the 3GPP2, the anchor GWs 100A to 100C correspond to HA (Home Agent) or LMA (Local Mobility Anchor). The policy setting node 200, 200C corresponds to AAA (Authentication Authorization Accounting) server. Further, the mobile terminal 700, 700C corresponds to MS (Mobile Station) or AT (Access Terminal).

In the case of the WiMAX Forum, the anchor GWs 100A to 100C correspond to HA or LMA. The policy setting node 200, 200C corresponds to AAA server. Further, the mobile terminal 700, 700C corresponds to MS.

Hereinafter, specific examples of information contained in the transfer policy setting request and response described in the third exemplary embodiment and specific examples of a message to transmit the transfer policy setting request are described. First, specific examples of information contained in the transfer policy setting request are described. As described above, two patterns are possible: a pattern in which the anchor GW 100C autonomously sets a transfer policy based on the transfer policy setting request received from the mobile terminal 700C without through the policy setting node 200C (which is called Pattern A for convenience sake) and a pattern in which the anchor GW 100C sets a transfer policy through the policy setting node 200C (which is called Pattern B).

Pattern A

In the case of Pattern A, the transfer policy setting request that is transmitted from the mobile terminal 700C to the anchor GW 100C contains "transfer policy information", "transfer destination information" and "control information".

The "transfer policy information" contains a local IP address and a local port number that corresponds to the destination of a downlink packet. The transfer policy information may further contain a protocol number, a remote IP address, a remote port number and the like according to need.

The "transfer destination information" contains the identifier (IP address etc.) of the mobile terminal 700C and the identifier (TEID. GRE key, EPS Bearer Identity etc.) of the channel that can reach the mobile terminal 700C.

The "control information" indicates which of operations such as new setting, update and deletion of a transfer policy is requested. Note that, when the "control information" is omitted, it can be interpreted as indicating setting or update.

Further, in the case of Pattern A, the transfer policy setting response that is transmitted from the anchor GW 100C to the mobile terminal 700C contains information indicating the success or failure of transfer policy setting. Note that the transfer policy setting response may contain transfer policy information that has been successfully set.

Pattern B-1

Pattern B is divided into the case where the mobile terminal 700C explicitly designates the details of setting of a specific transfer policy (which is called Pattern B-1) and the case where the policy setting node 200C decides a specific transfer policy (which is called Pattern B-2).

In the case of Pattern B-1, the transfer policy setting request that is transmitted from the mobile terminal 700C to the anchor GW 100C and the policy setting request that is transferred from the anchor GW 100C to the policy setting node 200C contain "transfer policy information". "transfer destination information" and "control information" just like the case of Pattern A. In addition, in the case of Pattern B-1, the transfer policy setting request contains at least one of the identifier of the mobile terminal 700C, the identifier of the anchor GW 100C and the identifier of the radio base station 600 as information used for determination as to whether or not to transfer a multicast packet and a broadcast packet. The identifier of the mobile terminal 700C is MN_NAI, IMSI or the like, for example. The identifier of the anchor GW 100C is APN, for example. The identifier of the radio base station 600 is CSGID, for example.

Further, in the case of Pattern B-1, the transfer policy setting response that is transmitted from the policy setting node 200C to the anchor GW 100C contains information indicating the success or failure of transfer policy setting. The transfer policy setting response may contain transfer policy information that has been successfully set.

Further, in the case of Pattern B-1, the transfer policy setting response that is transmitted from the anchor GW 100C to the mobile terminal 700C contains information indicating the success or failure of transfer policy setting and transfer policy information that has been successfully set.

Pattern B-2

In the case of Pattern B-2, the transfer policy setting request that is transmitted from the mobile terminal 700C to the anchor GW 100C and the transfer policy setting request that is transferred from the anchor GW 100C to the policy setting node 200C contain "transfer destination information". Further, the transfer policy setting request of Pattern B-2 contains at least one of the identifier of the mobile terminal 700C, the identifier of the anchor GW 1000 and the identifier of the radio base station 600 as information used for determination as to whether or not to transfer a multicast packet and a broadcast packet.

Further, in the case of Pattern B-2, the transfer policy setting response that is transmitted from the policy setting node 200C to the anchor GW 100C may contain information indicating the success or failure of transfer policy setting and transfer policy information that has been allowed.

Further, in the case of Pattern B-2, the transfer policy setting response that is transmitted from the anchor GW 100C to the mobile terminal 700C contains transfer policy information that has been successfully set.

Hereinafter, specific examples of a message to transmit the transfer policy setting request are described with reference to FIGS. 21 to 39. The sequence charts in FIGS. 21 to 39 show the typical transmission sequences of the transfer policy setting request shown in FIGS. 19 and 20 more specifically about 3GPP EPS, 3GPP UMTS and WiMAX. They are sequentially described below.

Figure 21:
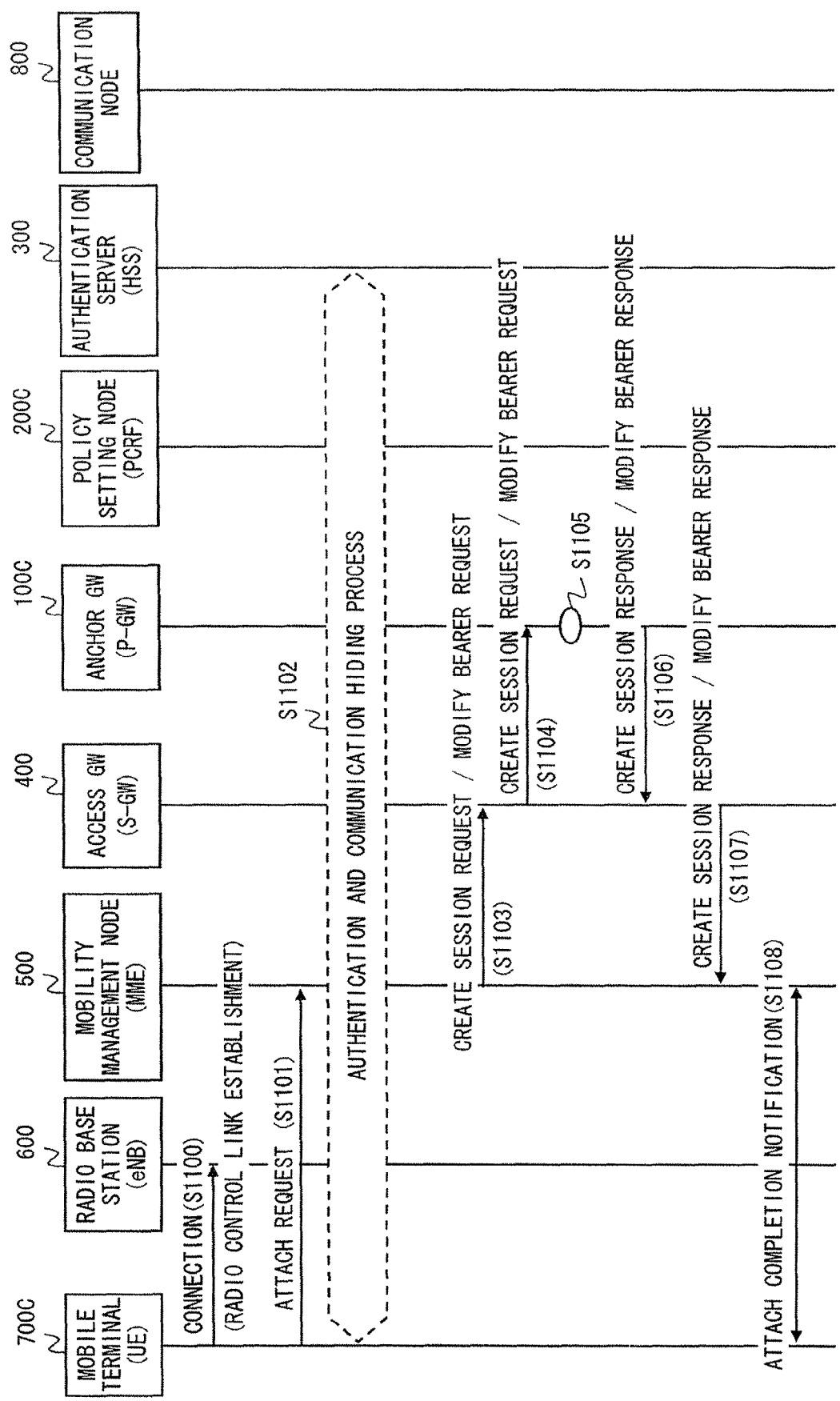
FIG. 21 is a sequence chart showing a first specific example of transfer policy setting related to 3GPP EPS.

FIGS. 21 to 30 relate to 3GPP EPS. FIG. 21 shows the above-described sequence of FIG. 20 more specifically about the 3GPP EPS. The conditions for the sequence of FIG. 21 are as in the following (a) to (c).

Set a transfer policy in the bearer generation/update procedure included in the initial connection procedure of the mobile terminal 700C.

(b) Use GTP (GPRS Tunneling Protocol) between the access GW 400 (S-GW) and the anchor GW 100C (P-GW).

(c) Directly set a policy to the anchor GW 100C (P-GW) without through the policy setting node 200C (PCRF) (Pattern A).

In Step S1100 of FIG. 21, the mobile terminal 700C establishes a radio link for transmitting and receiving a control signal with the radio base station 600. After that, the mobile terminal 700C transmits an attach request to the mobility management node 500 (Step S1101). The attach request contains a transfer policy setting request in addition to identification information of the mobile terminal 700. In Step S1102, authentication of the mobile terminal 700C and communication hiding are performed.

In Steps S1103 and S1104 of FIG. 21, "CREATE SESSION REQUEST" or "MODIFY BEARER REQUEST" is transmitted to set or update an IP communication path (GTP tunnel) between the access GW 400 and the anchor GW 100C. Using those messages, the transfer policy setting request is transferred from the mobility management node 500 to the anchor GW 100C. In Step S1105, the anchor GW 100C sets a transfer policy for transferring a multicast packet or a broadcast packet in the downlink direction to the mobile terminal 700C according to the transfer policy information contained in the transfer policy setting request.

A transfer policy setting response is contained in a message transmitted in Steps S1106 and S1107, specifically "CREATE SESSION RESPONSE" or "MODIFY BEARER RESPONSE", and transmitted from the anchor GW 100C to the mobility management node 500. The mobility management node 500 transmits the transfer policy setting response to the mobile terminal 700C during an attach completion notification process with the mobile terminal 700C.

Figure 22:
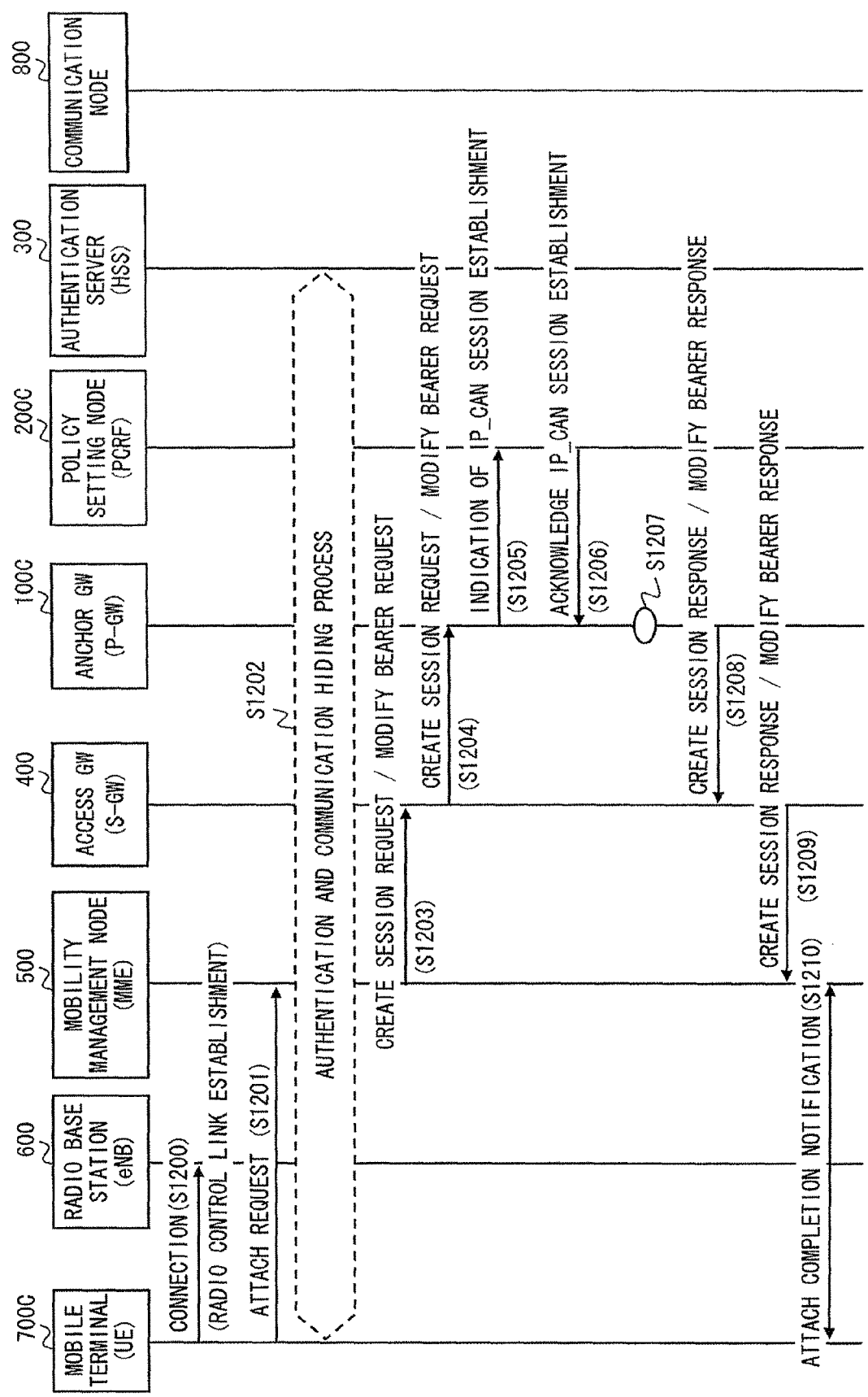
FIG. 22 is a sequence chart showing a second specific example of transfer policy setting related to 3GPP EPS.

FIG. 22 shows the above-described sequence of FIG. 19 more specifically about the 3GPP EPS. The conditions for the sequence of FIG. 22 are as in the following (a) to (c).

(a) Set a transfer policy in the bearer generation/update procedure included in the initial connection procedure of the mobile terminal 700C.

(b) Use GTP (GPRS Tunneling Protocol) between the access GW 400 (S-GW) and the anchor GW 100C (P-GW).

(c) Set a policy to the anchor GW 100C (P-GW) through the policy setting node 200C (PCRF) (Pattern B).

Steps S1200 to S1204 of FIG. 22 are the same as Steps S1100 to S1104 of FIG. 21. In Step S1205 of FIG. 22, a message (INDICATION OF IP_CAN SESSION ESTABLISHMENT) that requests establishment of IP-CAN (IP-Connectivity Access Network) session is transmitted from the anchor GW 100C to the policy setting node 200C. Further, in Step S1206, establishment of the IP-CAN session is performed at the initiative of the policy setting node 200C (PCRF), and a response message (ACKNOWLEDGE IP_CAN SESSION ESTABLISHMENT) is transmitted from the policy setting node 200C to the anchor GW 100C. Using those messages about establishment of the IP-CAN session, transfer policy setting request and response are transferred between the anchor GW 100C and the policy setting node 200C.

In Step S1207 of FIG. 22, the anchor GW 100C sets a transfer policy of the downlink packet based on the policy setting response received from the policy setting node 200C. Steps S1208 to S1210 of FIG. 22 are the same as Steps S1106 to S1108 of FIG.

Figure 23:
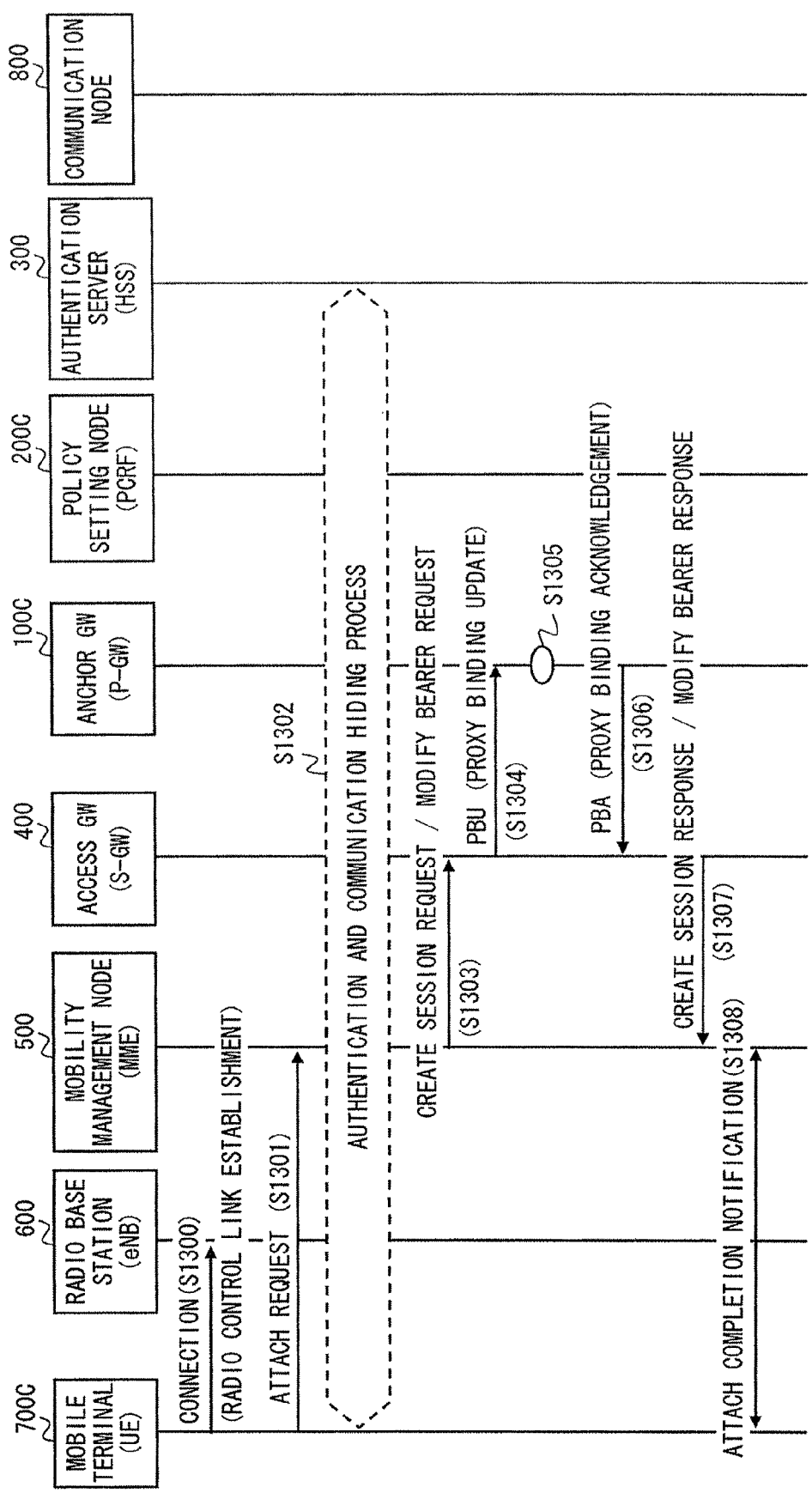
FIG. 23 is a sequence chart showing a third specific example of transfer policy setting related to 3GPP EPS.

FIG. 23 shows the above-described sequence of FIG. 20 more specifically about the 3GPP EPS. The conditions for the sequence of FIG. 23 are as in the following (a) to (c).

(a) Set a transfer policy in the bearer generation/update procedure included in the initial connection procedure of the mobile terminal 700C.

(b) Use PMIP (Proxy Mobile IP) between the access GW 400 (S-GW) and the anchor GW 100C (P-GW).

(c) Directly set a policy to the anchor GW 100C (P-GW) without through the policy setting node 200C (PCRF) (Pattern A).

Steps S1300 to S1308 of FIG. 23 are the same as Steps S1100 to S1108 of FIG. 21. However, the messages transmitted in Steps S1304 and S1306 to set or update an IP communication path (GRE (Generic Routing Encapsulation) tunnel) between the access GW 400 and the anchor GW 100C are different from those of FIG. 21. In the example of FIG. 23, transfer policy setting request and response are contained in "PBU (PROXY BINDING UPDATE)" in Step S1304 and "PBA (PROXY BINDING ACKNOWLEDGEMENT)" in Step S1307 and transmitted.

Figure 24:
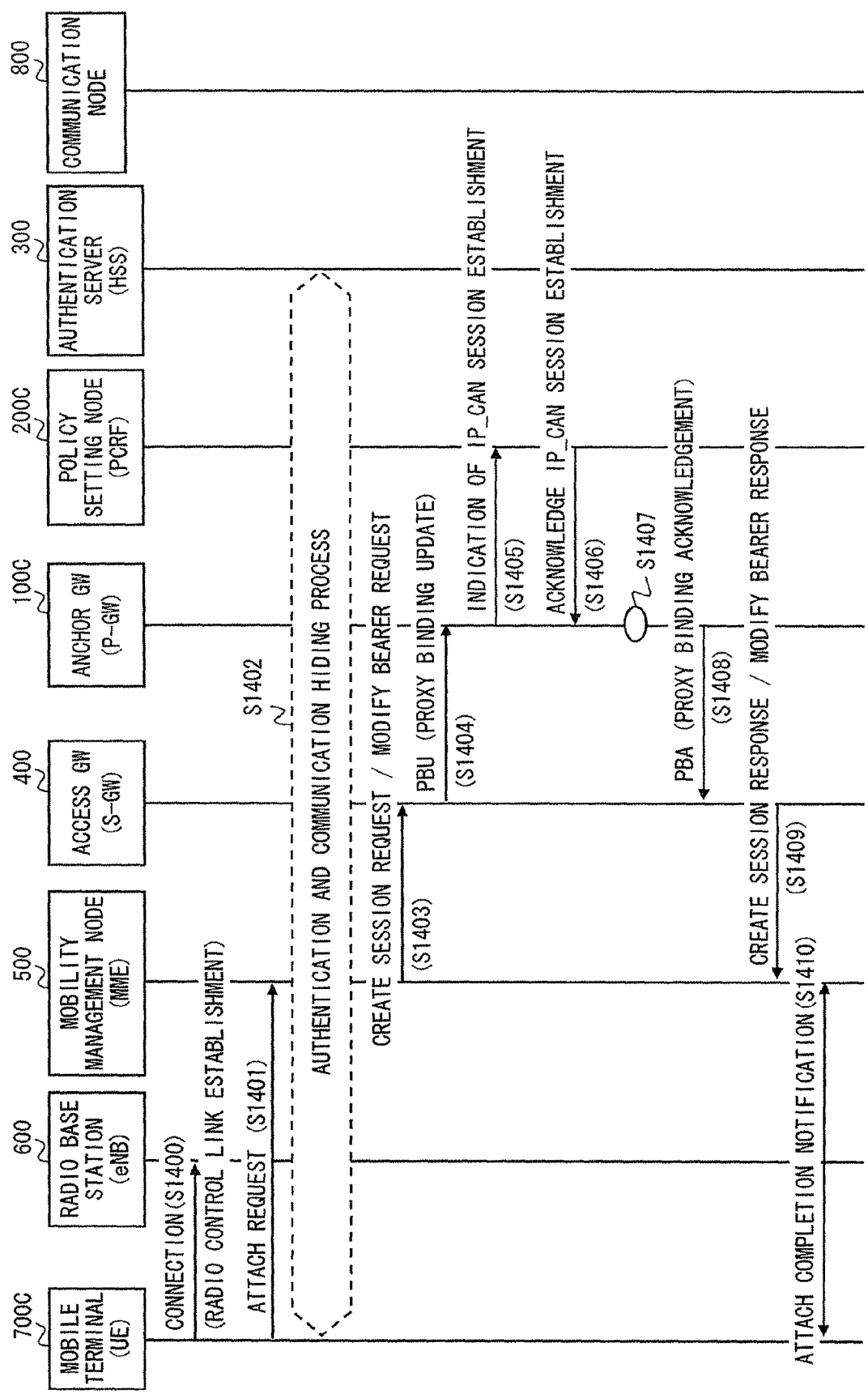
FIG. 24 is a sequence chart showing a fourth specific example of transfer policy setting related to 3GPP EPS.

FIG. 24 shows the above-described sequence of FIG. 19 more specifically about the 3GPP EPS. The conditions for the sequence of FIG. 24 are as in the following (a) to (c).

(a) Set a transfer policy in the bearer generation/update procedure included in the initial connection procedure of the mobile terminal 700C.

(b) Use PMIP (Proxy Mobile IP) between the access GW 400 (S-GW) and the anchor GW 100C (P-GW).

(c) Set a policy to the anchor GW 100C (P-GW) through the policy setting node 200C (PCRF) (Pattern B).

Steps S1400 to S1410 of FIG. 24 are substantially the same as Steps S1200 to S1208 of FIG. 22. However, the messages transmitted in Steps S1404 and S1408 to set or update an IP communication path (GRE (Generic Routing Encapsulation) tunnel) between the access GW 400 and the anchor GW 100C are different from those of FIG. 22. In the example of FIG. 24, "PBD (PROXY BINDING UPDATE)" and PBA (PROXY BINDING ACKNOWLEDGEMENT)" are used. Using those messages, transfer policy setting request and response are transmitted.

Figure 25:
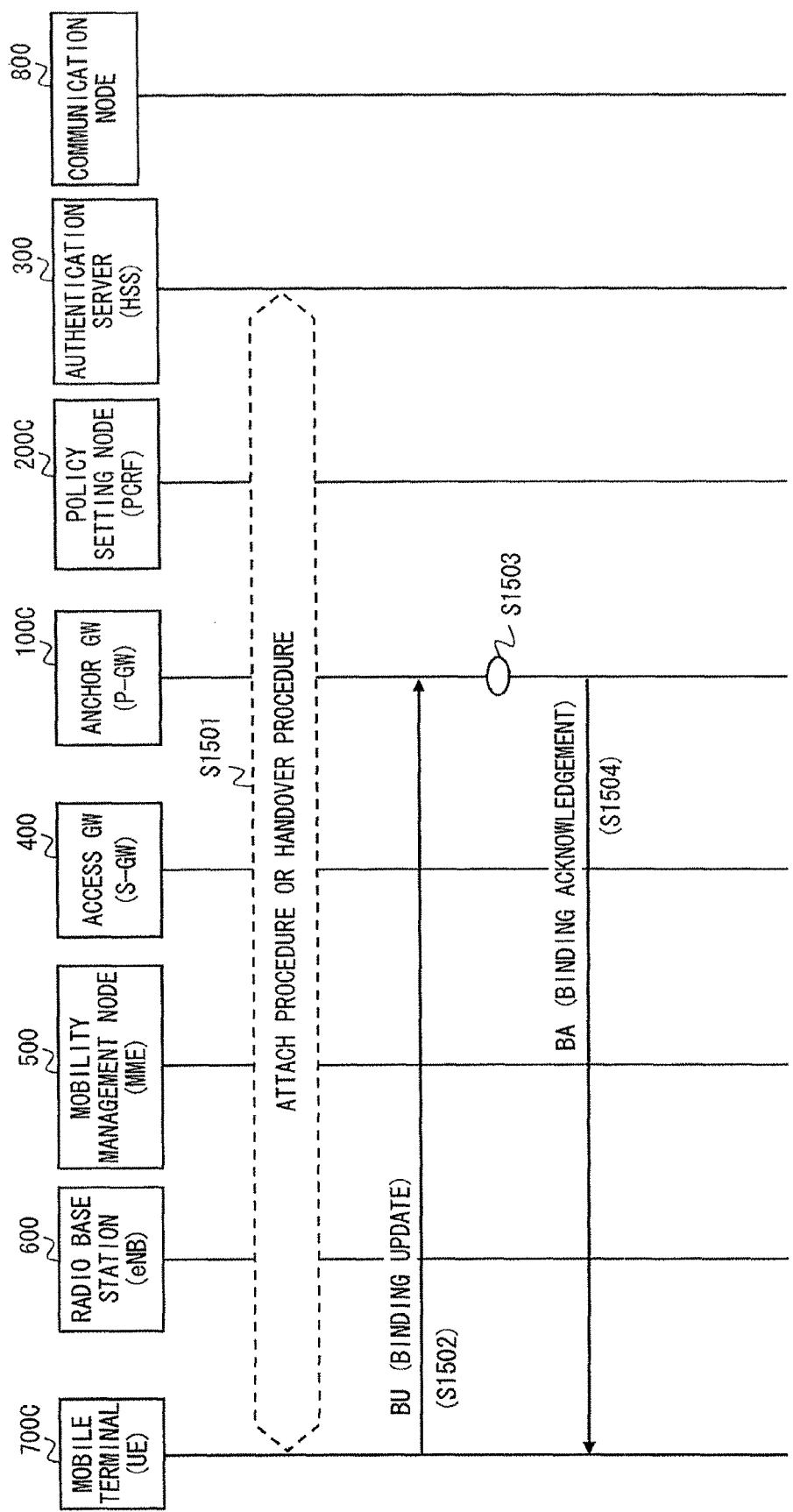
FIG. 25 is a sequence chart showing a fifth specific example of transfer policy setting related to 3GPP EPS.

FIG. 25 shows the above-described sequence of FIG. 20 more specifically about the 3GPP EPS. The conditions for the sequence of FIG. 25 are as in the following (a) and (b).

(a) Use Mobile IP by the mobile terminal 700C.

(b) Directly set a policy to the anchor GW 100C (P-GW) without through the policy setting node 200C (PCRF) (Pattern A).

In Step S1501 of FIG. 25, an attach procedure or a handover procedure of the mobile terminal 700C are performed. In Step S1502, Binding Update is transmitted from the mobile terminal 700C to the anchor GW 100C. Binding Update contains a transfer policy setting request. In Step S1503, a transfer policy for transferring a multicast packet or a broadcast packet in the downlink direction to the mobile terminal 700C is set according to transfer policy information contained in the transfer policy setting request. In Step S1504, the anchor GW 100C transmits a transfer policy setting response, contained in "Binding Acknowledgement", to the mobile terminal 700C.

Figure 26:
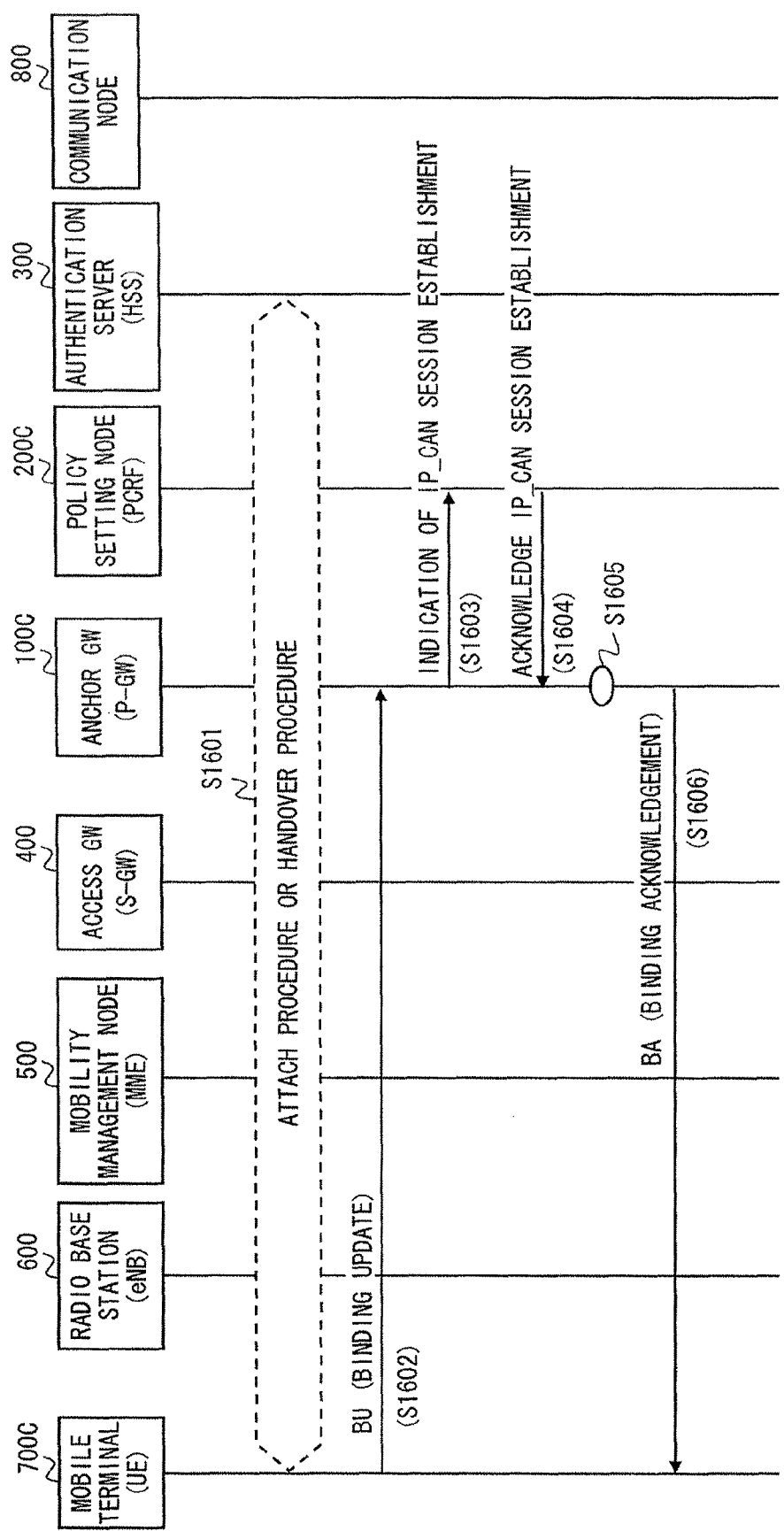
FIG. 26 is a sequence chart showing a sixth specific example of transfer policy setting related to 3GPP EPS.

FIG. 26 shows the above-described sequence of FIG. 19 more specifically about the 3GPP EPS. The conditions for the sequence of FIG. 26 are as in the following (a) and (b).

(a) Use Mobile IP by the mobile terminal 700C.

(h) Set a policy to the anchor GW 100C (P-GW) through the policy setting node 200C (PCRF) (Pattern B).

In Step S1601 of FIG. 26, an attach procedure or a handover procedure of the mobile terminal 700C are performed. The messages transmitted in Steps S1602 to S1604 and S1606 are already mentioned above in the description of FIGS. 21 to 25 and the explanation thereof is omitted here. In Steps S1605, the anchor GW 100C makes transfer policy setting of the downlink packet based on the policy setting response received from the policy setting node 200C.

Figure 27:
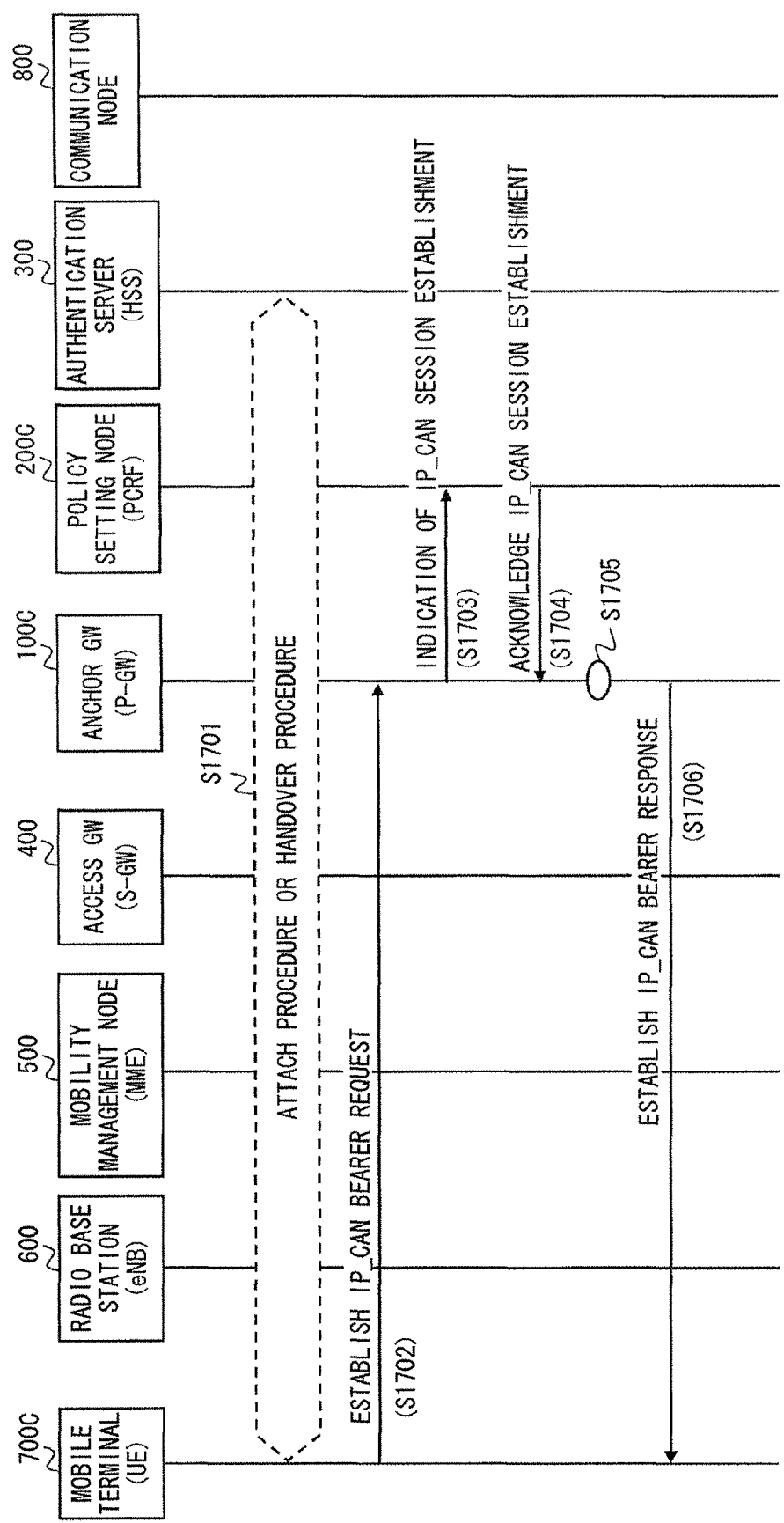
FIG. 27 is a sequence chart showing a seventh specific example of transfer policy setting related to 3GPP EPS.

FIG. 27 shows the above-described sequence of FIG. 19 more specifically about the 3GPP EPS. The conditions for the sequence of FIG. 27 are as in the following (a) and (b).

(a) Set a policy in PCC (Policy and Charging Control) architecture after a bearer is established.

(b) Set a policy to the anchor GW 100C (P-GW) through the policy setting node 200C In Step S1701 of FIG. 27, an attach procedure or a handover procedure of the mobile terminal 700C are performed. In Step S1702, "ESTABLISH IP_CAN BEARER REQUEST" is transmitted from the mobile terminal 700C to the anchor GW 100C to establish IP-CAN session. Using this message, a transfer policy setting request is transmitted from the mobile terminal 700C to the anchor GW 100C. The messages transmitted in Steps S1703 and S1704 are as already mentioned in FIG. 22 and the like. In Step S1705, the anchor GW 100C makes transfer policy setting of the downlink packet based on the policy setting response received from the policy setting node 200C. In Step S1706, "ESTABLISH IP_CAN BEARER RESPONSE" is transmitted from the anchor GW 100C to the mobile terminal 700C. Using this message, a transfer policy setting response is transmitted from the anchor GW 100C to the mobile terminal 700C.

Figure 28:
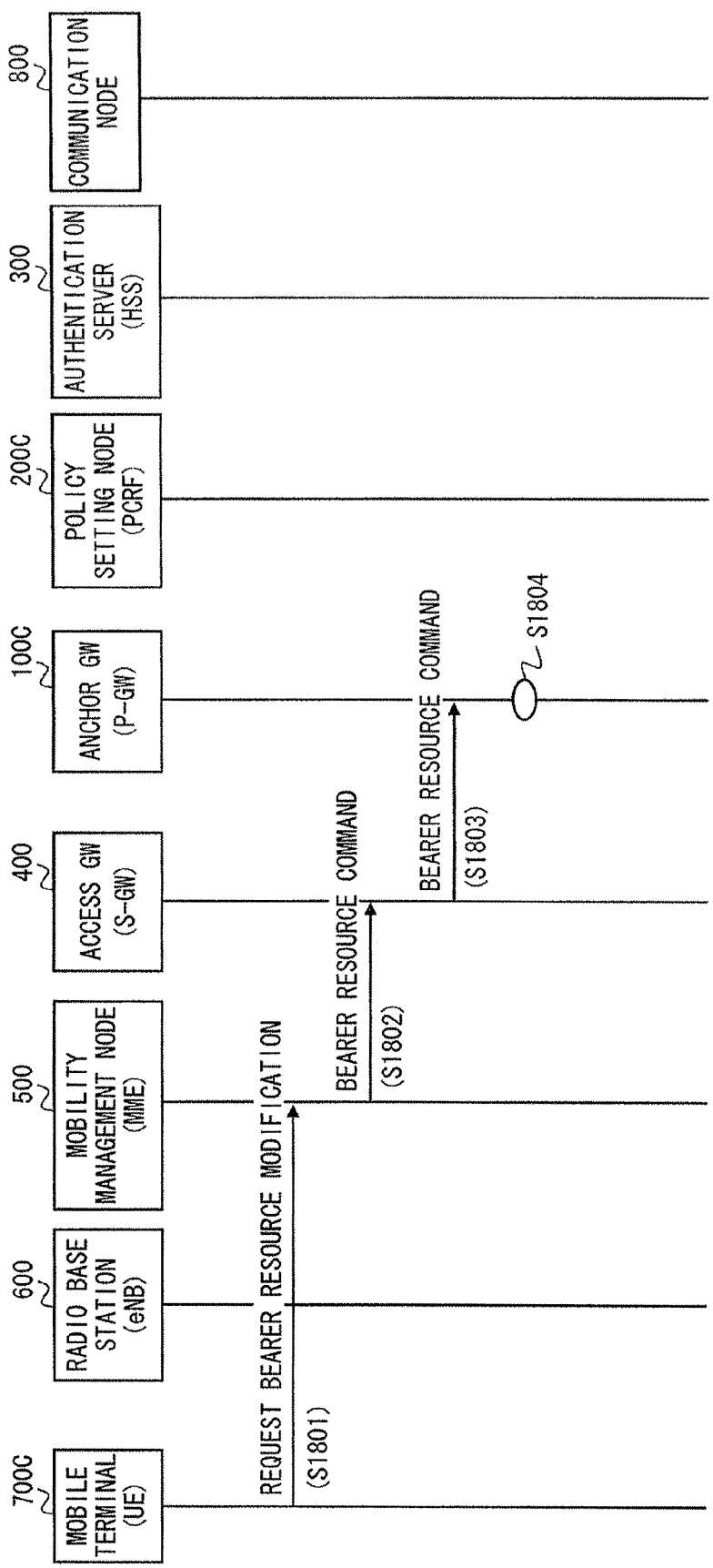
FIG. 28 is a sequence chart showing an eighth specific example of transfer policy setting related to 3GPP EPS.

FIG. 28 shows the above-described sequence of FIG. 20 more specifically about the 3GPP EPS. The conditions for the sequence of FIG. 28 are as in the following (a) to (c).

(a) Set a transfer policy in the bearer update procedure.

(b) Use GTP (GPRS Tunneling Protocol) between the access GW 400 (S-GW) and the anchor GW 100C (P-GW).

(c) Directly set a policy to the anchor GW 100C (P-GW) without through the policy setting node 200C (PCRF) (Pattern A).

In Step S1801, the mobile terminal 700C transmits "REQUEST BEARER RESOURCE MODIFICATION" to the mobility management node 500 in order to request update of a bearer. In Step S1802, "BEARER RESOURCE COMMAND" is transmitted from the mobility management node 500 to the access GW 400. In Step S1803, "BEARER RESOURCE COMMAND" is transmitted from the access GW 400 to the anchor GW 100C. By the messages in Steps S1801 to S1803, a transfer policy setting request from the mobile terminal 700C reaches the anchor GW 100C. In Step S1804, the anchor GW 100C sets a transfer policy for transferring a multicast packet or a broadcast packet in the downlink direction to the mobile terminal 700C according to the transfer policy information contained in the transfer policy setting request.

Figure 29:
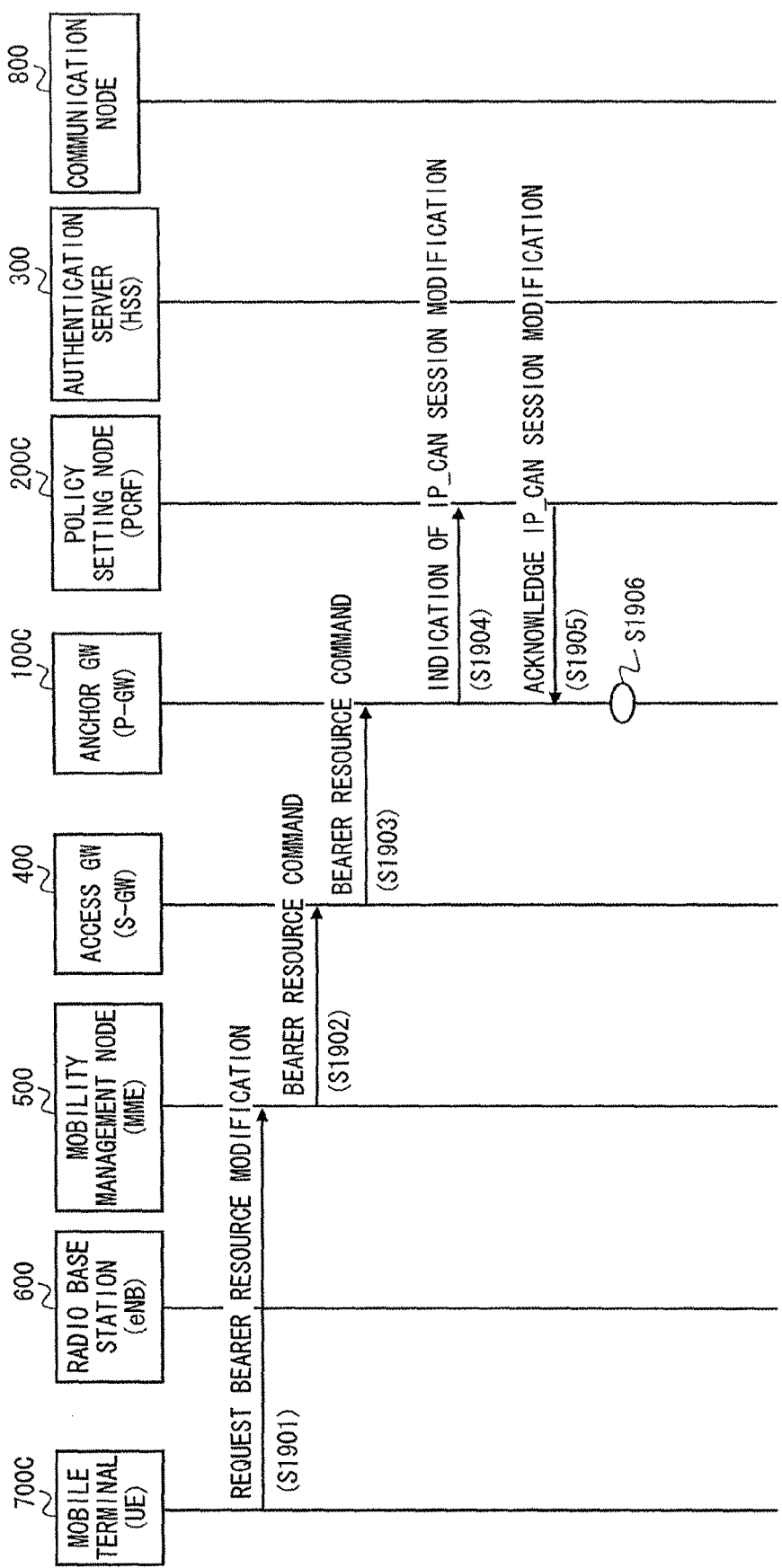
FIG. 29 is a sequence chart showing a ninth specific example of transfer policy setting related to 3GPP EPS.

FIG. 29 shows the above-described sequence of FIG. 19 more specifically about the 3GPP EPS. The conditions for the sequence of FIG. 29 are as in the following (a) to (c).

(a) Set a transfer policy in the bearer update procedure.

(b) Use GTP (GPRS Tunneling Protocol) between the access GW 400 (S-GW) and the anchor GW 100C (P-GW).

(c) Set a policy to the anchor GW 100C (P-GW) through the policy setting node 200C (PCRF) (Pattern B).

The messages shown in Steps S1901 to S1905 of FIG. 29 are as already mentioned above. By the messages in Steps S1901 to S1904, a transfer policy setting request from the mobile terminal 700C reaches the policy setting node 200C. Further, by the message in Step S1905, a transfer policy setting response reaches the anchor GW 100C. In Step S1906, the anchor GW 100C makes transfer policy setting of the downlink packet based on the policy setting response received from the policy setting node 200C.

Figure 30:
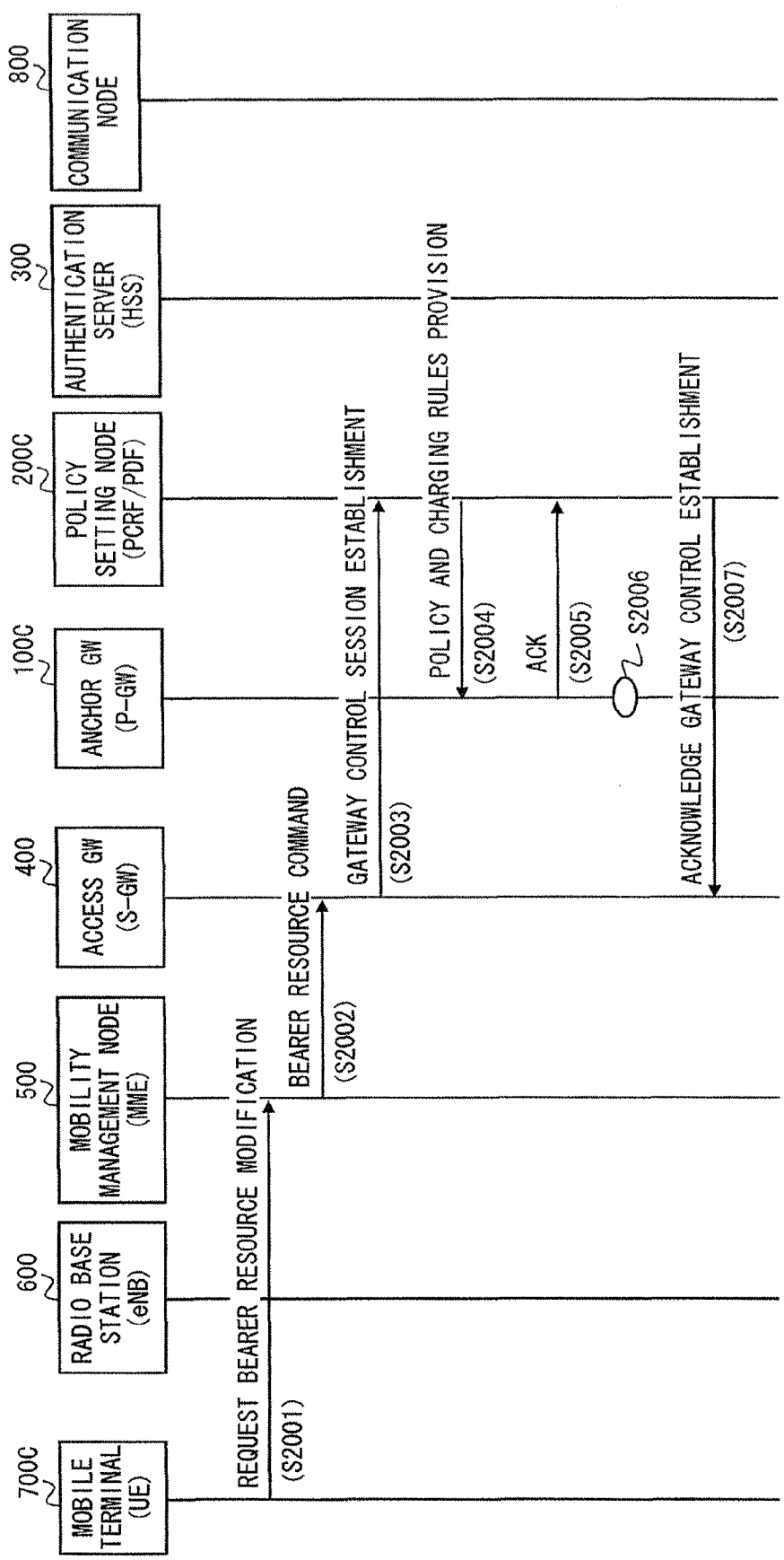
FIG. 30 is a sequence chart showing a tenth specific example of transfer policy setting related to 3GPP EPS.

FIG. 30 shows the above-described sequence of FIG. 19 more specifically about the 3GPP EPS. The conditions for the sequence of FIG. 30 are as in the following (a) to (c).

(a) Set a transfer policy in the bearer update procedure.

(b) Use PMIP (Proxy Mobile IP) between the access GW 400 (S-GW) and the anchor GW 100C (P-GW).

(c) Send a message from the access GW 400 (S-GW) to the policy setting node 200C (PCRF), and set a transfer policy to the anchor GW 100C (P-GW) by the policy setting node 200C (Pattern B).

In Step S2001, the mobile terminal 700C transmits "REQUEST BEARER RESOURCE MODIFICATION" to the mobility management node 500 in order to request update of a bearer. In Step S2002, "BEARER RESOURCE COMMAND" is transmitted from the mobility management node 500 to the access GW 400. In Step S2003, "GATEWAY CONTROL SESSION ESTABLISHMENT" is transmitted from the access GW 400 to the policy setting node 200C. By the messages in Steps S2001 to S2003, a transfer policy setting request from the mobile terminal 700C reaches the policy setting node 200C.

In Step S2004, the policy setting node 200C transmits "POLICY AND CHARGING RULES PROVISION" that contains transfer policy information for the downlink packet decided in response to the transfer policy setting request to the anchor GW 100C, The anchor GW 100C sends ACK hack to the policy setting node 200C (Step S2005) and makes transfer policy setting of the downlink packet (Step S2006). In Step S2007, the policy setting node 200C transmits "ACKNOWLEDGE CONTROL SESSION ESTABLISHMENT" to the access GW 400.

Figure 31:
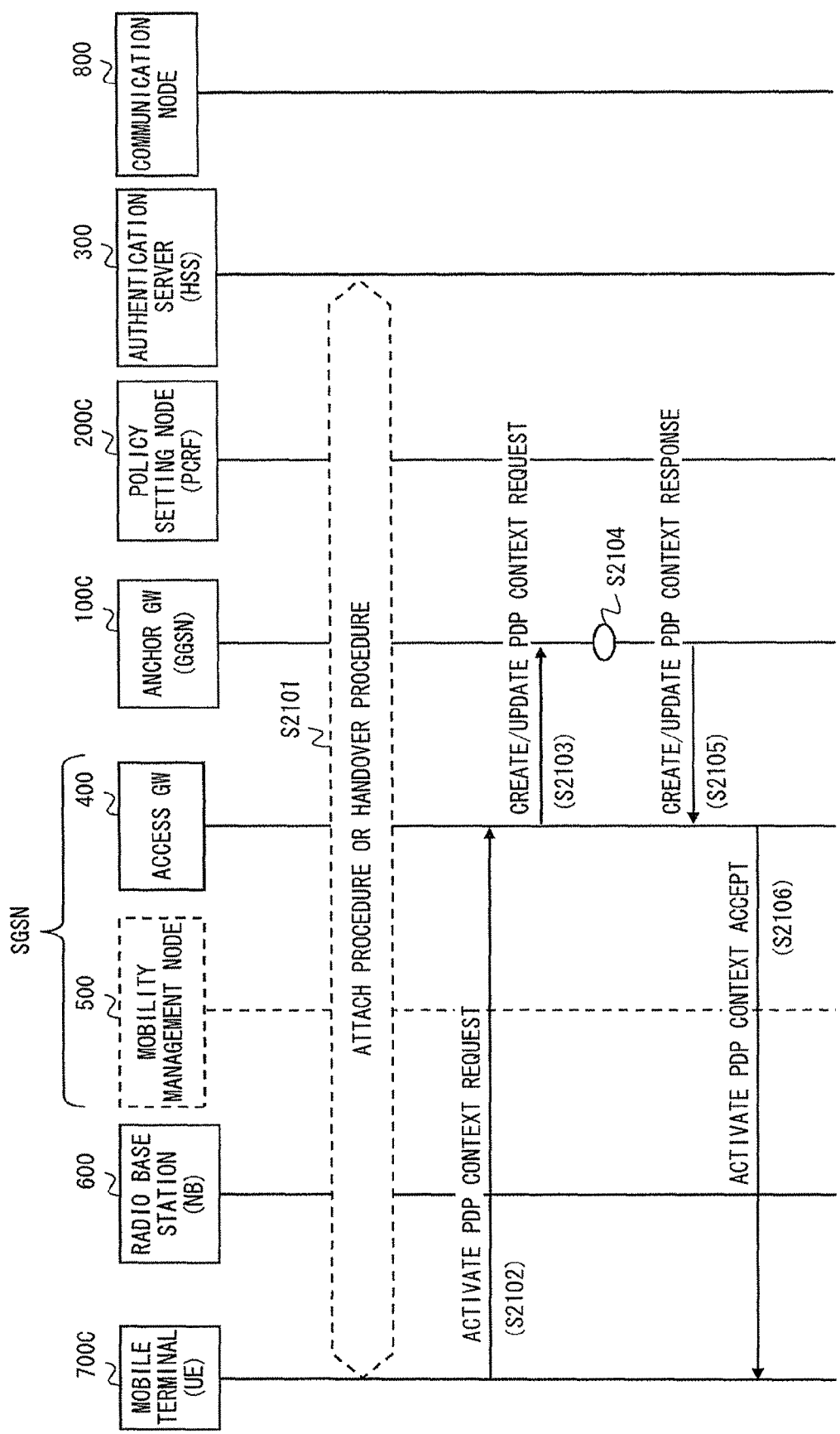
FIG. 31 is a sequence chart showing a first specific example of transfer policy setting related to 3GPP UMTS.

Next, specific examples of the 3GPP UMTS are described below. FIG. 31 shows the above-described sequence of FIG. 20 more specifically about the 3GPP UMTS. The conditions for the sequence of FIG. 31 are as in the following (a) and (b).

(a) Set a transfer policy in the procedure to set a bearer (PDP Context)

(b) Directly set a policy to the anchor GW 100C (GGSN) without through the policy setting node 200C (PCRF or PDF (Policy Decision Function)) (Pattern A).

In Step S2001 of FIG. 31, an attach procedure or a handover procedure of the mobile terminal 700C are performed. In Step S2102, "ACTIVATE PDP CONTEXT REQUEST" is transmitted from the mobile terminal 700C to the access GW 400 for setting of a UMTS bearer (PDP Context). In Step S2103, "CREATE/UPDATE PDP CONTEXT REQUEST" is transmitted from the access GW 400 to the anchor GW 100C. By the messages in Steps S2102 to S2103, a transfer policy setting request from the mobile terminal 700C reaches the anchor GW 100C. In Step S2104, the anchor GW 100C makes transfer policy setting of the downlink packet according to policy information contained in the transfer policy setting request from the mobile terminal 700C.

In Step S2105, "CREATE/UPDATE PDP CONTEXT RESPONSE" is transmitted from the anchor GW 100C to the access GW 400. In Step S2106, "ACTIVATE PDP CONTEXT ACCEPT" is transmitted from the access GW 400 to the mobile terminal 700C. By the messages in Steps S2105 and S2106, a transfer policy setting response from the anchor GW 100 reaches the mobile terminal 700C.

Figure 32:
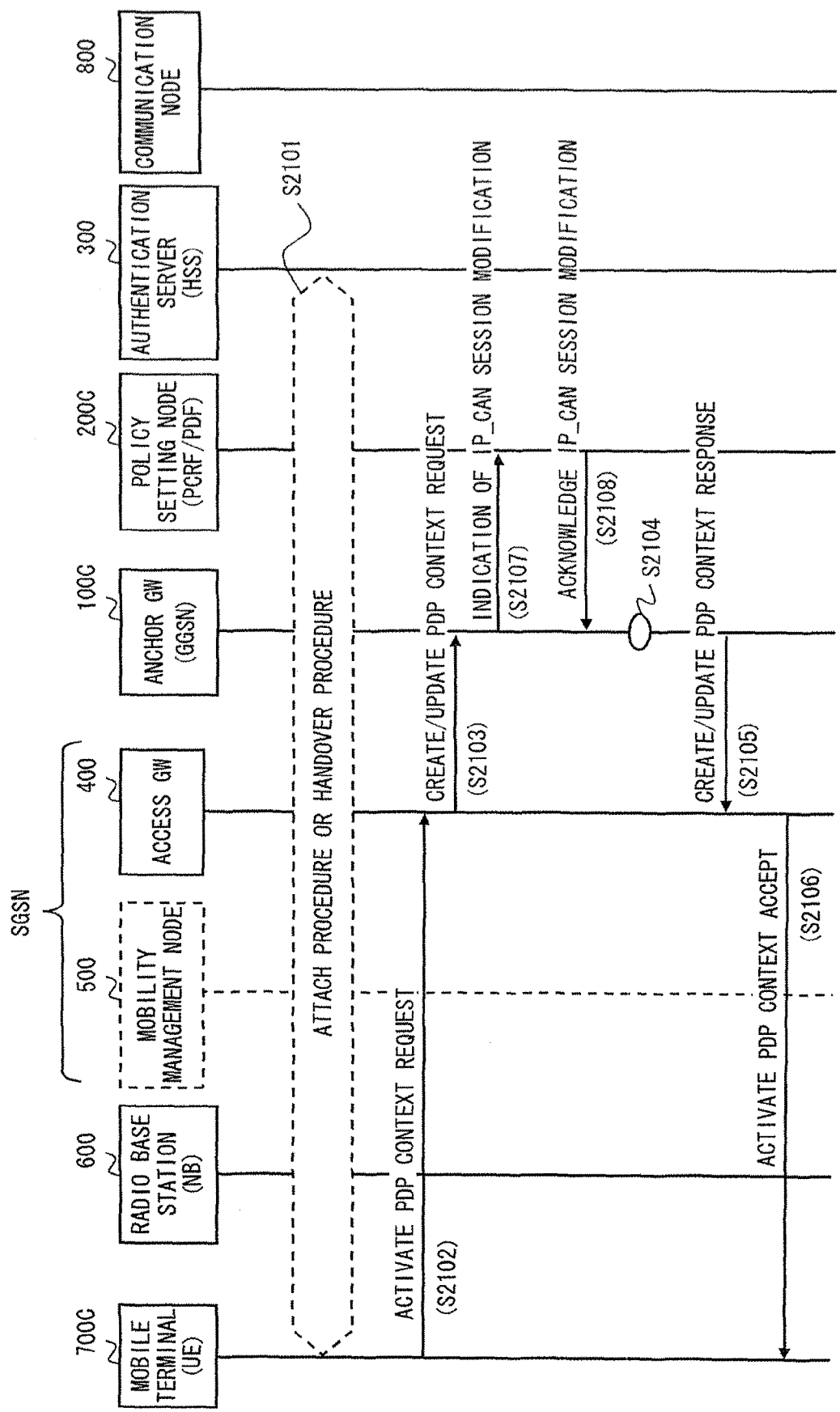
FIG. 32 is a sequence chart showing a second specific example of transfer policy setting related to 3GPP UMTS.
Figure 33:
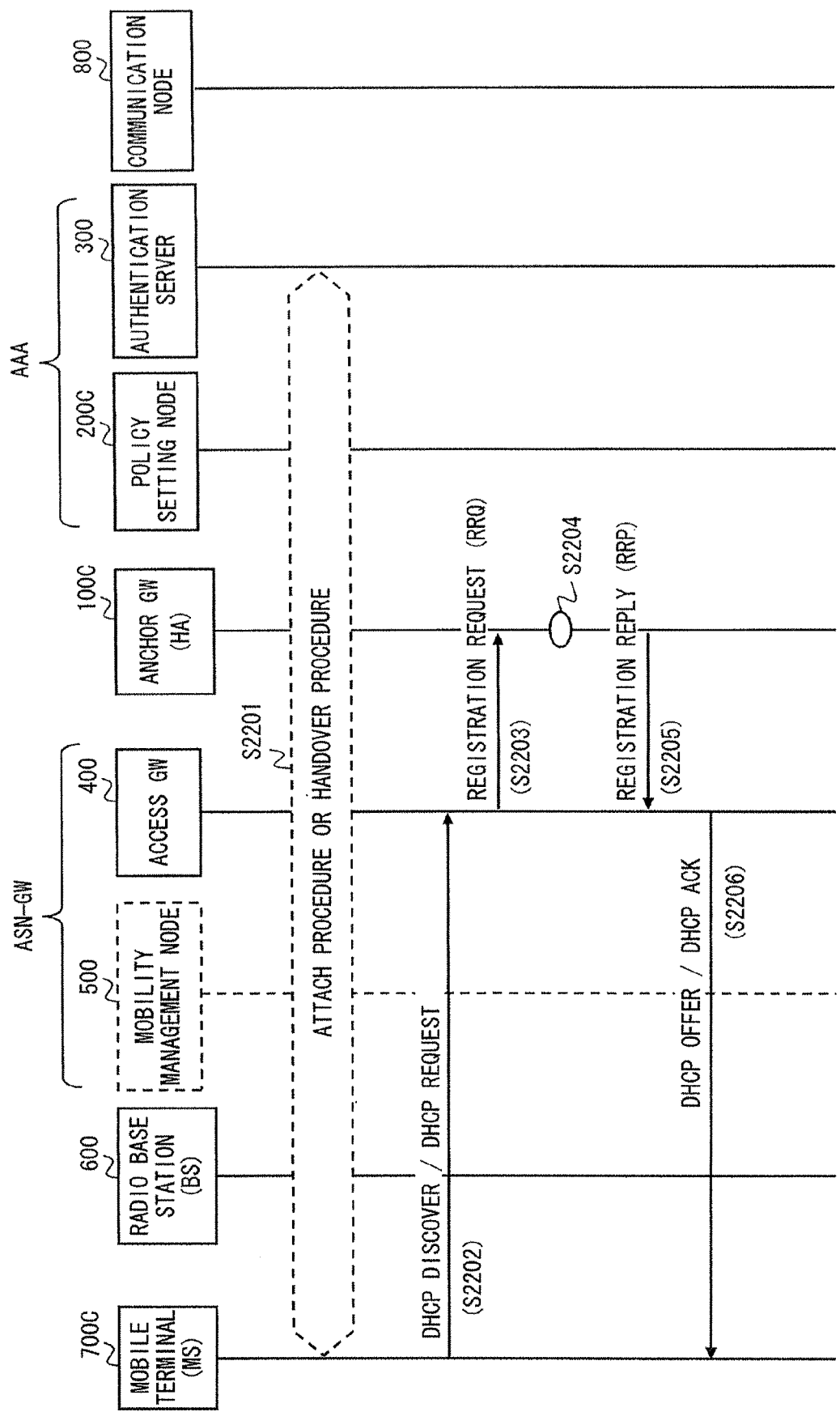
FIG. 33 is a sequence chart showing a first specific example of transfer policy setting related to WiMAX.
Figure 34:
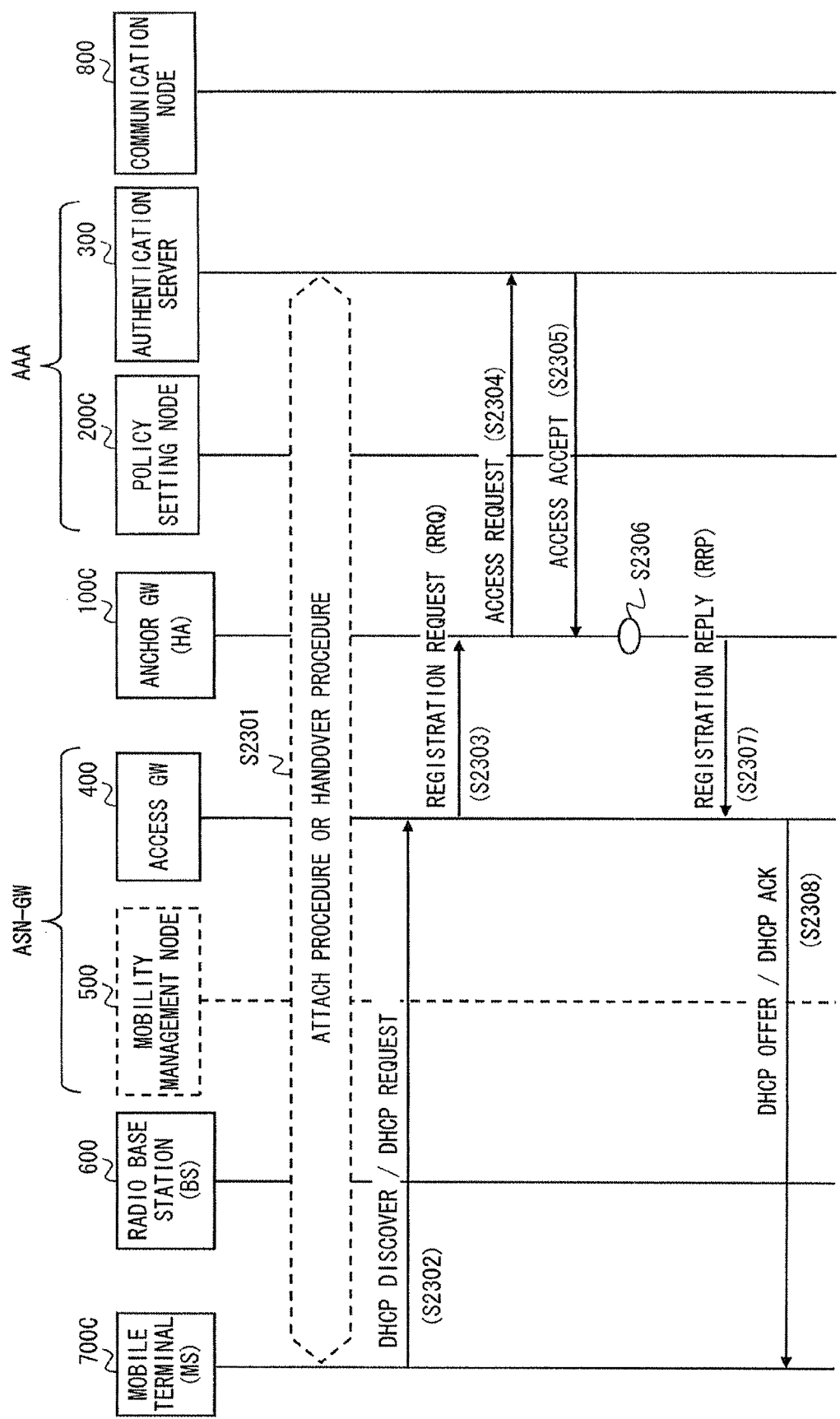
FIG. 34 is a sequence chart showing a second specific example of transfer policy setting related to WiMAX.
Figure 35:
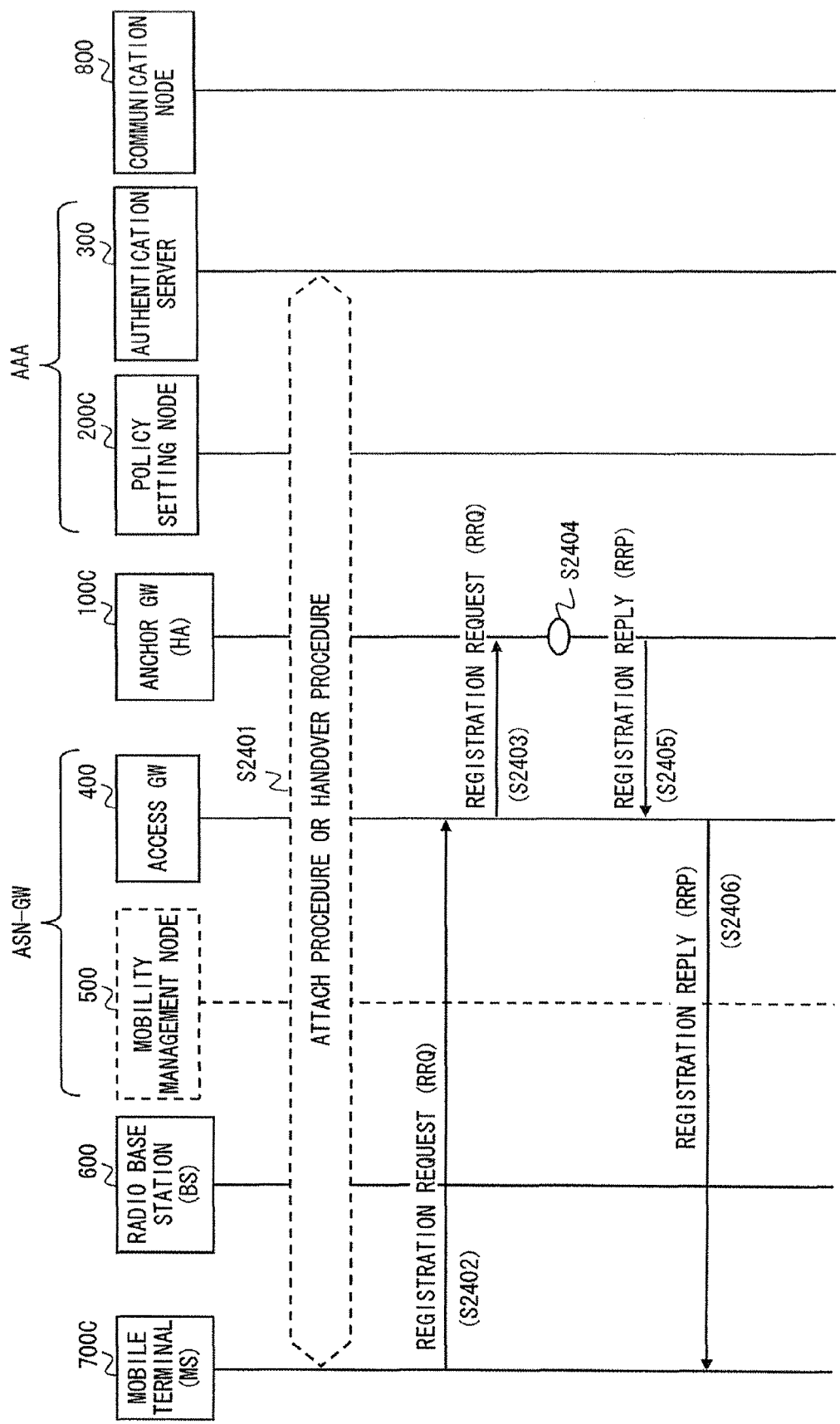
FIG. 35 is a sequence chart showing a third specific example of transfer policy setting related to WiMAX.
Figure 36:
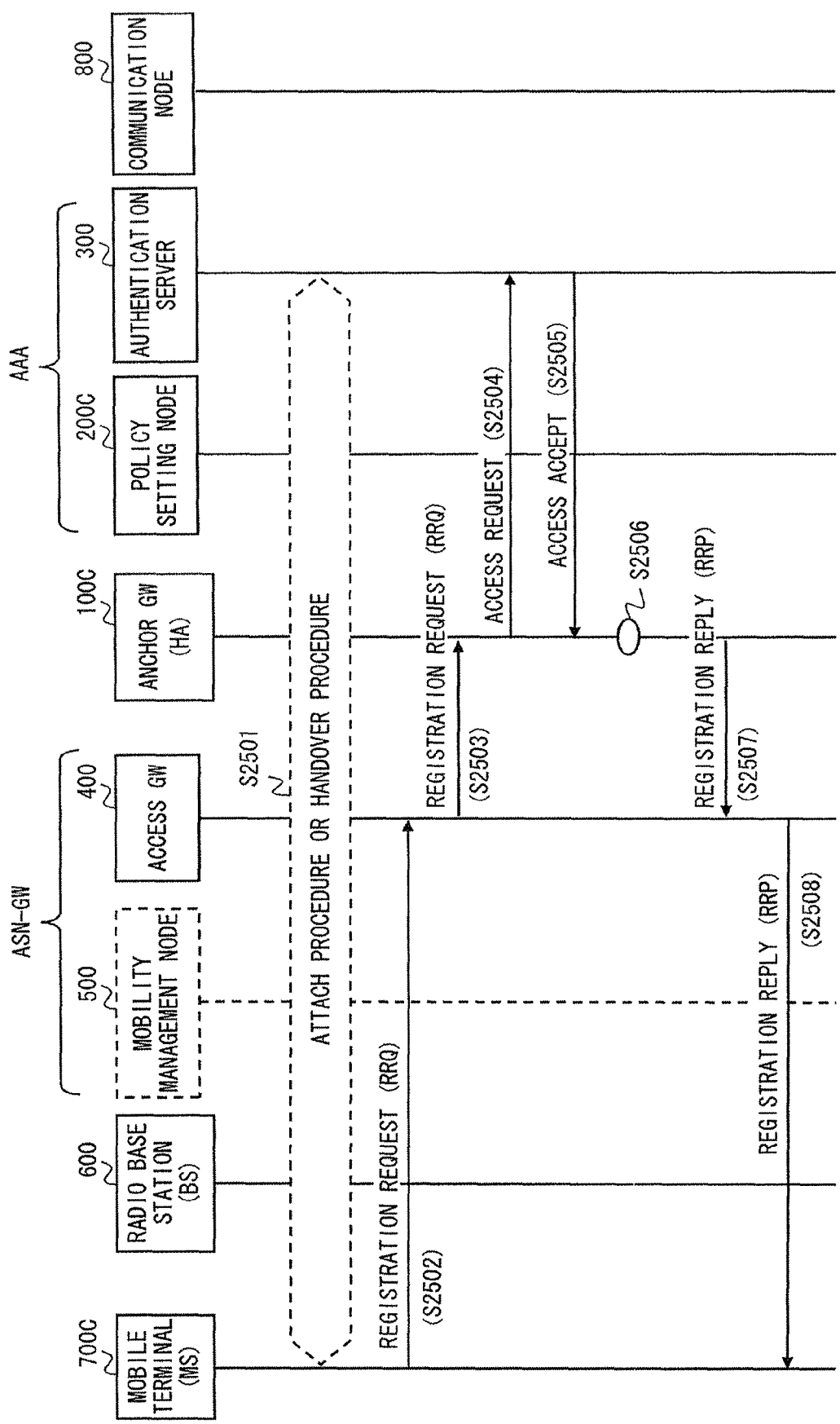
FIG. 36 is a sequence chart showing a fourth specific example of transfer policy setting related to WiMAX.
Figure 37:
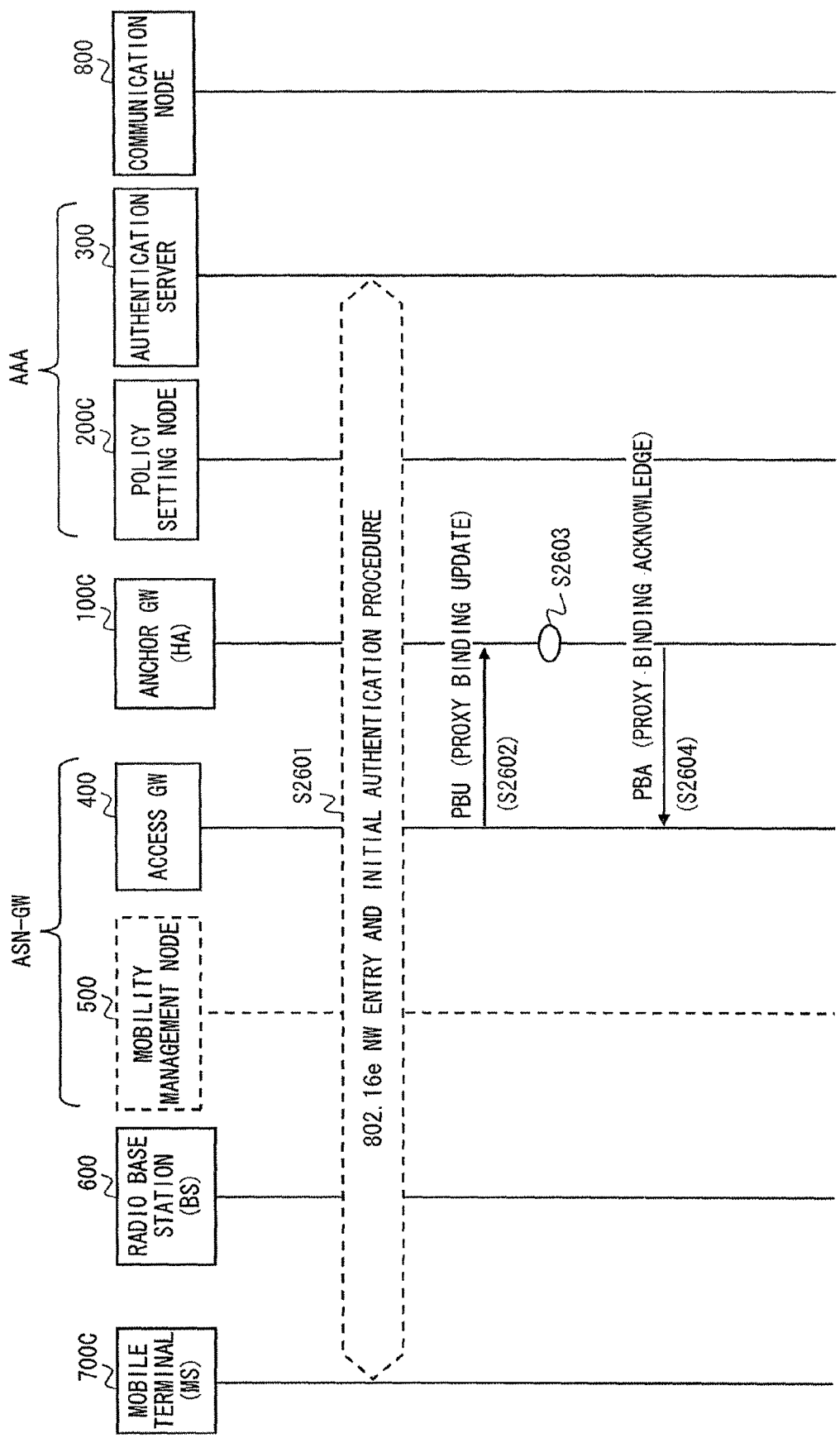
FIG. 37 is a sequence chart showing a fifth specific example of transfer policy setting related to WiMAX.
Figure 38:
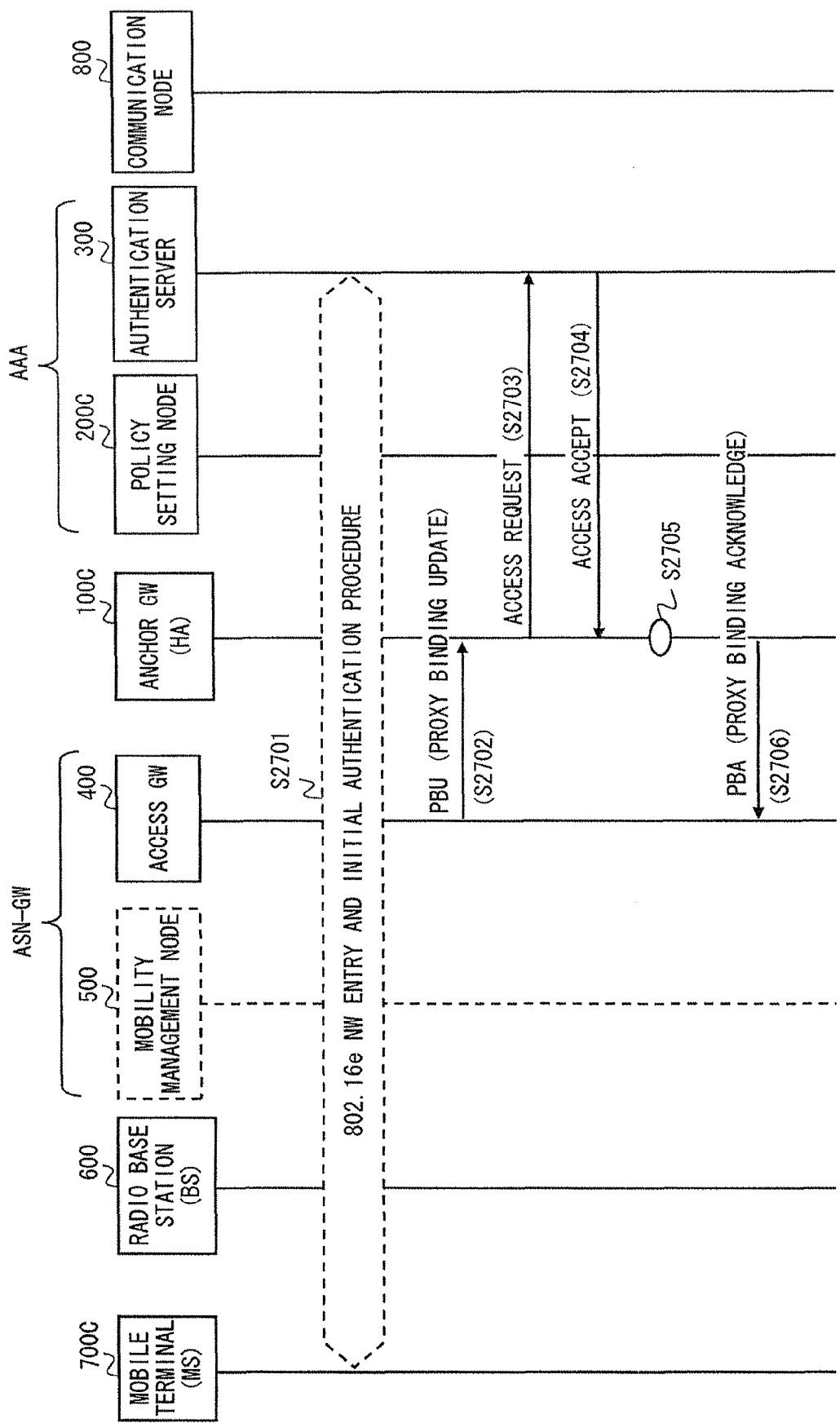
FIG. 38 is a sequence chart showing a sixth specific example of transfer policy setting related to WiMAX.
Figure 39:
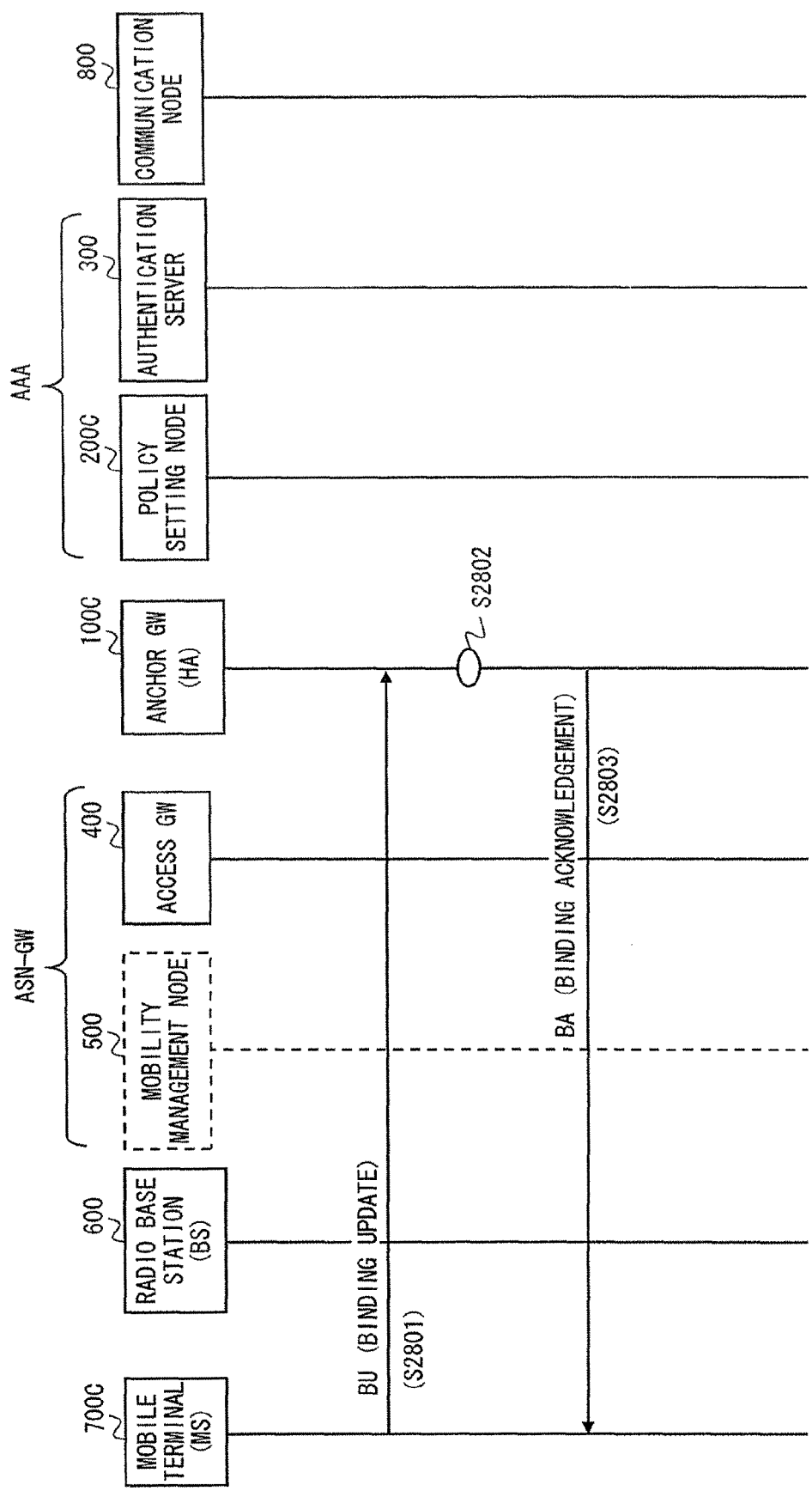
FIG. 39 is a sequence chart showing a seventh specific example of transfer policy setting related to WiMAX.
Figure 40:
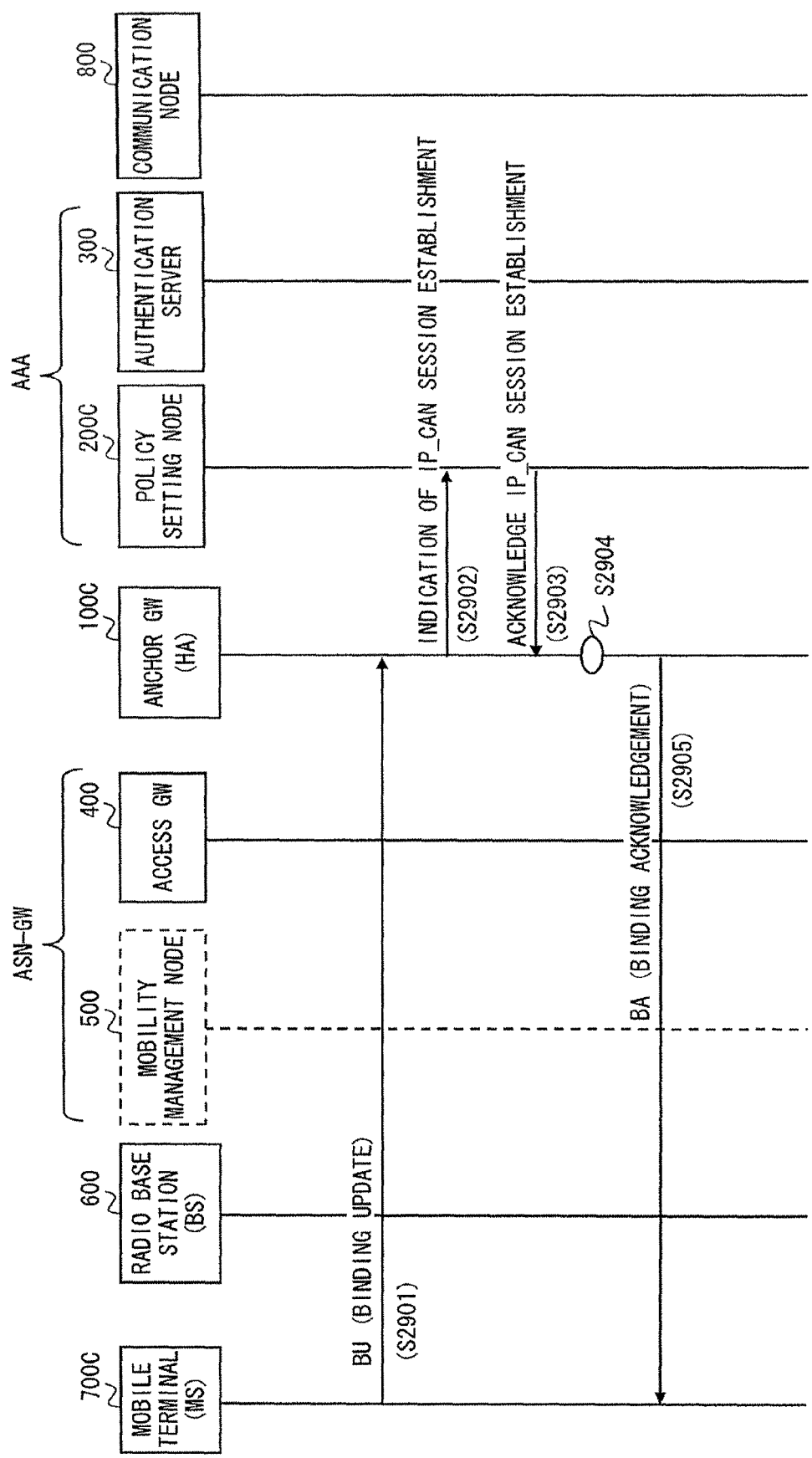
FIG. 40 is a sequence chart showing an eighth specific example of transfer policy setting related to WiMAX.

FIG. 32 shows the above-described sequence of FIG. 19 more specifically about the 3GPP UMTS. The conditions for the sequence of FIG. 32 are as in the following (a) and (b).

(a) Set a transfer policy in the procedure to set a bearer (PDP Context)

(h) Send a message from the anchor GW 100C (GGSN) to the policy setting node 200C (PCRF/PDF), and set a transfer policy to the anchor GW 100C (GGSN) by the policy setting node 200C (PCRF/PDF) (Pattern B).

The processing in Steps S2101 to S2103 and S2104 to S2106 of FIG. 32 is the same as that of Steps of the same reference numerals shown in FIG. 31. In FIG. 32, a message transfer step (S2107 and S2108) between the anchor GW 100C and the policy setting node 200C is added between Steps S2103 and S2104. In Step S2107, a message (INDICATION OF IP_CAN SESSION ESTABLISHMENT) that requests establishment of IP-CAN session is transmitted from the anchor GW 100C to the policy setting node 200C. Further, in Step S2108, establishment of the IP-CAN session is performed at the initiative of the policy setting node 200C, and a response message (ACKNOWLEDGE IP_CAN SESSION ESTABLISHMENT) is transmitted from the policy setting node 200C to the anchor GW 100C. Using those messages about establishment of the IP-CAN session, transfer policy setting request and response are transferred between the anchor GW 100C and the policy setting node 200C.

FIGS. 33 to 40 relate to WiMAX. The conditions for the sequences of FIGS. 33 to 40 are as follows.

FIG. 33

(a) Use PMIPv4 (Proxy Mobile IP version 4).

(b) Directly set a policy to the anchor GW 100C (HA: Home Agent) without through the policy setting node 200C (AAA: Authentication Authorization Accounting) (Pattern A).

FIG. 34

(a) Use PMIPv4 (Proxy Mobile IP version 4).

(b) Set a policy to the anchor GW 100C (HA: Home Agent) through the policy setting node 200C (AAA: Authentication Authorization Accounting) (Pattern B).

FIG. 35

(a) Use MIPv4 (Mobile IP version 4).

(b) Directly set a policy to the anchor GW 100C (HA: Home Agent) without through the policy setting node 200C (AAA: Authentication Authorization Accounting) (Pattern A).

FIG. 36

(a) Use MIPv4 (Mobile IP version 4).

(b) Set a policy to the anchor GW 100C (HA: Home Agent) through the policy setting node 200C (AAA: Authentication Authorization Accounting) (Pattern B).

FIG. 37

(a) Use PMIPv6 (Proxy Mobile IP version 6).

(b) Directly set a policy to the anchor GW 100C (HA: Home Agent) without through the policy setting node 200C (AAA: Authentication Authorization Accounting) (Pattern A).

FIG. 38

(a) Use PMIPv6 (Proxy Mobile IP version 6).

(b) Set a policy to the anchor GW 100C (HA: Home Agent) through the policy setting node 200C (AAA: Authentication Authorization Accounting) (Pattern B).

FIG. 39

(a) Use MIPv6 (Mobile IP version 6)

(b) Directly set a policy to the anchor GW 100C (HA: Home Agent) without through the policy setting node 200C (AAA: Authentication Authorization Accounting) (Pattern A).

FIG. 40

(a) Use MIPv6 (Mobile IP version 6)

(b) Set a policy to the anchor GW 100C (HA: Home Agent) through the policy setting node 200C (AAA: Authentication Authorization Accounting) (Pattern B).

In WiMAX also, for transfer of transfer policy setting request and response among the mobile terminal 700C, the anchor GW 100C and the policy setting node 200C, existing messages may be extended and used. For example, the following messages can be used as shown in FIGS. 33 to 40.

DHCP DISCOVER or DHCP REQUEST (S2202, S2302)
DHCP OFFER or DHCP ACK (S2206, S2308)
REGISTRATION REQUEST (S2203, S2303, S2402, S2403, S2502, S2503)
REGISTRATION REPLY (S2205, S2307, S2405, S2406, S2507, S2508)
ACCESS REQUEST (S2304, S2504, S2703)
ACCESS ACCEPT (S2305, S2505, S2704)
PROXY BINDIG UPDATE (S2602, S2702)
PROXY BINDIG ACKNOWLEDGE (S2604, S2706)
BINDIG UPDATE (S2801, S2901)
BINDIG ACKNOWLEDGE (S2803, S2905)
INDICATION OF IP_CAN SESSION ESTABLISHMENT (S2902)
ACKNOWLEDGE IP_CAN SESSION ESTABLISHMENT (S2903)

Further, the present invention is not limited to the exemplary embodiments described above, and various changes and modifications may be made without departing from the scope of the invention as a matter of course. For example, although a process to transfer an IP packet is described in each of the exemplary embodiments described above, the present invention is applicable also to a mobile communication system that transfers of a Layer3 packet based on Layer 3 protocol other than IP.

This application is based upon and claims the benefit of priority from Japanese patent application No. 2009-236227, filed on Oct. 13, 2009, the disclosures of which are incorporated herein in its entirety by reference.

REFERENCE SIGNS LIST

10 CORE NETWORK
20 EXTERNAL NETWORK
30 ACCESS NETWORK
60 RADIO ACCESS NETWORK
100, 100A, 100B, 100C ANCHOR GW
101 CORE-SIDE INTERFACE
102 EXTERNAL-SIDE INTERFACE
110 CHANNEL MANAGEMENT UNIT
111, 111B TRANSFER POLICY CONTROL UNIT
112, 112B PASS-THROUGH PACKET DETERMINATION UNIT
113 PACKET DUPLICATION UNIT
114 PROXY RESPONSE UNIT
115 TRANSFER POLICY ACQUISITION UNIT
120, 120B DETECTION TARGET STORAGE UNIT
121, 121B POLICY STORAGE UNIT
200, 200C POLICY SETTING NODE
201 INTERFACE
210 POLICY REQUEST PROCESSING UNIT
211 POLICY ACQUISITION/DETERMINATION UNIT
220 POLICY STORAGE UNIT
300 AUTHENTICATION SERVER
400 ACCESS GW
500 MOBILITY MANAGEMENT NODE
600 RADIO BASE STATION
700, 700C MOBILE TERMINAL
701 INTERFACE
710 COMMUNICATION CONTROL UNIT
711 PACKET TRANSFER REQUEST UNIT
712 APPLICATION PROCESSING UNIT
720 USER INFORMATION STORAGE UNIT
800 COMMUNICATION NODE
900 BROADBAND ROUTER
1000 SECURITY GW
1100 HOME BASE STATION (H(e)NB)

The invention claimed is:

1. A gateway device located at a boundary between a radio access network to conduct wireless communication with a mobile terminal or a core network connected to the radio access network and an external network, the gateway device comprising:
a channel management unit implemented by a processor, that terminates an established logical downlink channel for transmitting a packet to the mobile terminal and a logical uplink channel for receiving a packet from the mobile terminal, wherein the channel management unit is configured to set a downlink channel and the uplink channel individually with a plurality of mobile terminals;
a pass-through packet determination unit implemented by the processor, that controls whether to transfer a packet arriving from the external network to the downlink channel based on a transfer policy; and
a transfer policy control unit implemented by the processor, that changes the transfer policy to enable transfer of a multicast packet or a broadcast packet to the mobile terminal by the downlink channel in response to detecting a service discovery multicast packet which is transmitted from the mobile terminal to the external network through the logical uplink channel and designates a multicast address as a destination,
wherein the transfer policy control unit changes the transfer policy to enable selective transfer of the multicast packet or the broadcast packet to the mobile terminal from which the service discovery multicast packet is transmitted.

2. The gateway device according to claim 1, further comprising:
a packet duplication unit implemented by the processor, that duplicates a multicast packet or a broadcast packet allowed to be transferred by the pass-through packet determination unit to create packets of the same number as the number of transfer destination mobile terminals,
wherein the channel management unit transmits each of the packets duplicated by the packet duplication unit to each of downlink channels associated with the transfer destination mobile terminals.

3. The gateway device according to claim 1, wherein the transfer policy control unit detects the service discovery multicast packet by monitoring at least one of a destination address, a destination port number and protocol type information assigned to a Layer 3 packet in an uplink direction transmitted from the mobile terminal to the external network through the uplink channel.

4. The gateway device according to claim 1, wherein the service discovery multicast packet contains an IP (Internet Protocol) multicast packet related to SSDP (Simple Service Discovery Protocol) or mDNS (multicast Domain Name System).

5. The gateway device according to claim 1, wherein the transfer policy control unit changes the transfer policy to stop transfer of the multicast packet or the broadcast packet to the mobile terminal by the downlink channel in the response to detecting that transfer of the multicast packet or the broadcast packet to the mobile terminal is not needed.

6. The gateway device according to claim 5, wherein the transfer policy control unit detects that transfer of the multicast packet or the broadcast packet to the mobile terminal is not needed by detecting a predetermined packet from among a packet flow in an uplink direction transmitted from the mobile terminal to the external network.

7. The gateway device according to claim 5, wherein the transfer policy control unit detects that transfer of the multicast packet or the broadcast packet to the mobile terminal is not needed based on deletion of the downlink channel and the uplink channel.

8. The gateway device according to claim 1, further comprising:
a proxy response unit implemented by the processor, configured to generate a response packet to be transmitted to the external network on behalf of the mobile terminal when a multicast packet or a broadcast packet, which triggers the mobile station to send a response, is detected from among a packet flow arriving from the external network.

9. The gateway device according to claim 8, wherein the transfer policy control unit is configured to capture and store a response packet generated by the mobile terminal to respond to the multicast packet or the broadcast packet for request from among the packet flow arriving from the mobile terminal by the uplink channel, and
wherein the proxy response unit generates the response packet for proxy response using the response packet stored by the transfer policy control unit.

10. A mobile communication system, comprising:
a radio access network to conduct wireless communication with a mobile terminal;
a core network connected to the radio access network; and
a gateway device located at a boundary between the radio access network or the core network and an external network and including an interface connectable to the external network,
wherein the gateway device includes:
a channel management unit implemented by a processor, that terminates an established logical downlink channel for transmitting a packet to the mobile terminal and a logical uplink channel for receiving a packet from the mobile terminal, wherein the channel management unit is configured to set a downlink channel and the uplink channel individually with a plurality of mobile terminals;
a pass-through packet determination unit implemented by the processor, that controls whether to transfer a packet arriving from the external network to the downlink channel based on a transfer policy; and
a transfer policy control unit implemented by the processor, that changes the transfer policy,
wherein the transfer policy control unit changes the transfer policy to enable transfer of a multicast packet or a broadcast packet to the mobile terminal by the downlink channel in response to detecting a service discovery multicast packet which is transmitted from the mobile terminal to the external network through the logical uplink channel and designates a multicast address as a destination, and
wherein the transfer policy control unit changes the transfer policy to enable selective transfer of the multicast packet or the broadcast packet to the mobile terminal from which the service discovery multicast packet is transmitted.

11. The mobile communication system according to claim 10, further comprising:
a packet duplication unit implemented by the processor, that duplicates a multicast packet or a broadcast packet allowed to be transferred by the pass-through packet determination unit to create packets of the same number as the number of transfer destination mobile terminals,
wherein the channel management unit transmits each of the packets duplicated by the packet duplication unit to each of downlink channels associated with the transfer destination mobile terminals.

12. The mobile communication system according to claim 10, wherein the transfer policy control unit detects the service discovery multicast packet by monitoring at least one of a destination address, a destination port number and protocol type information assigned to a Layer 3 packet in an uplink direction transmitted from the mobile terminal to the external network through the uplink channel.

13. The mobile communication system according to claim 10, wherein the service discovery multicast packet contains an IP (Internet Protocol) multicast packet related to SSDP (Simple Service Discovery Protocol) or mDNS (multicast Domain Name System).

14. The mobile communication system according to claim 10, wherein the transfer policy control unit changes the transfer policy to stop the transfer of the multicast packet or the broadcast packet to the mobile terminal by the downlink channel in response to detecting that transfer of the multicast packet or the broadcast packet to the mobile terminal is not needed.

15. The mobile communication system according to claim 14, wherein the transfer policy control unit detects that transfer of the multicast packet or the broadcast packet to the mobile terminal is not needed by detecting that a predetermined packet from among a packet flow in an uplink direction transmitted from the mobile terminal to the external network.

16. The mobile communication system according to claim 14, wherein the transfer policy control unit detects that transfer of the multicast packet or the broadcast packet to the mobile terminal is not needed based on deletion of the downlink channel and the uplink channel.

17. The mobile communication system according to claim 10, further comprising:
a proxy response unit implemented by the processor, configured to generate a response packet to be transmitted to the external network on behalf of the mobile terminal when a multicast packet or a broadcast packet for request, which triggers the mobile station to send a response, is detected from among a packet flow arriving from the external network.

18. The mobile communication system according to claim 17, wherein the transfer policy control unit is configured to capture and store a response packet generated by the mobile terminal to respond to the multicast packet or the broadcast packet for request from among the packet flow arriving from the mobile terminal by the uplink channel, and
wherein the proxy response unit generates the response packet for proxy response using the response packet stored by the transfer policy control unit.

19. A packet transfer control method at a boundary between a radio access network to conduct wireless communication with a mobile terminal or a core network connected to the radio access network and an external network, the packet transfer control method comprising:
terminating an established logical downlink channel for transmitting a packet to the mobile terminal and a logical uplink channel for receiving a packet from the mobile terminal by setting a downlink channel and the logical uplink channel individually with a plurality of mobile terminals;
detecting a service discovery multicast packet which is transmitted from the mobile terminal to the external network through the logical uplink channel and designates a multicast address as a destination; and
changing a packet transfer policy from the external network to the downlink channel to enable transfer of a multicast packet or a broadcast packet arriving from the external network to the mobile terminal in response to detecting the service discovery multicast packet,
wherein the changing of the packet transfer policy includes changing the transfer policy to enable selective transfer of the multicast packet or the broadcast packet to the mobile terminal from which the service discovery multicast packet is transmitted.

20. The packet transfer control method according to claim 19, further comprising:
duplicating a multicast packet or a broadcast packet allowed to be transferred to the mobile terminal to create packets of the same number as the number of transfer destination mobile terminals; and
transmitting each of the duplicated packets to each of downlink channels associated with the transfer destination mobile terminals.

21. The packet transfer control method according to claim 19, wherein the detecting includes monitoring at least one of a destination address, a destination port number, and protocol type information assigned to a Layer 3 packet in an uplink direction transmitted from the mobile terminal to the external network through the uplink channel.

22. The packet transfer control method according to claim 19, wherein the service discovery multicast packet contains an IP (Internet Protocol) multicast packet related to SSDP (Simple Service Discovery Protocol) or mDNS (multicast Domain Name System).

23. The packet transfer control method according to claim 19, further comprising:
changing the transfer policy to stop the transfer of the multicast packet or the broadcast packet to the mobile terminal by the downlink channel in response to detecting that transfer of the multicast packet or the broadcast packet to the mobile terminal is not needed.

24. The packet transfer control method according to claim 23, wherein the detection that the transfer of the multicast packet or the broadcast packet to the mobile terminal is not needed is done by detecting a predetermined packet from among a packet flow in an uplink direction transmitted from the mobile terminal to the external network.

25. The packet transfer control method according to claim 23, wherein the detection that transfer of the multicast packet or the broadcast packet to the mobile terminal is not needed is done based on deletion of the downlink channel and the uplink channel.

26. The packet transfer control method according to claim 19, further comprising:
generating a response packet to be transmitted to the external network on behalf of the mobile terminal and transmitting the response packet to the external network when a multicast packet or a broadcast packet for request, which triggers the mobile station to send a response, is detected from among a packet flow arriving from the external network.

27. The packet transfer control method according to claim 26, further comprising:
capturing a response packet generated by the mobile terminal to respond to the multicast packet or the broadcast packet for request from among the packet flow arriving from the mobile terminal by the uplink channel and storing the captured packet as a sample,
wherein the response packet generated by proxy is generated based on the sample.

28. A non-transitory computer readable medium storing a program causing a computer to execute a packet transfer control at a boundary between a radio access network to conduct wireless communication with a mobile terminal or a core network connected to the radio access network and an external network, the transfer control comprising:
terminating an established logical downlink channel for transmitting a packet to the mobile terminal and a logical uplink channel for receiving a packet from the mobile terminal by setting a downlink channel and the logical uplink channel individually with a plurality of mobile terminals;
detecting a service discovery multicast packet which is transmitted from the mobile terminal to the external network through the logical uplink channel and designates a multicast address as a destination; and
changing a packet transfer policy from the external network to the downlink channel to enable transfer of a multicast packet or a broadcast packet arriving from the external network to the mobile terminal in response to detecting the service discovery multicast packet,
wherein the changing of the packet transfer policy includes changing the transfer policy to enable selective transfer of the multicast packet or the broadcast packet to the mobile terminal from which the service discovery multicast packet is transmitted.

29. The non-transitory computer readable medium according to claim 28, further comprising:
generating a response packet to be transmitted to the external network on behalf of the mobile terminal and transmitting the response packet to the external network when a multicast packet or a broadcast packet for request, which triggers the mobile station to send a response, is detected among a packet flow arriving from the external network.

30. The non-transitory computer readable medium according to claim 29, further comprising:
capturing a response packet generated by the mobile terminal to respond to the multicast packet or the broadcast packet for request from among the packet flow arriving from the mobile terminal by the uplink channel and storing the captured packet as a sample.

31. The non-transitory computer readable medium according to claim 30, wherein the response packet generated by proxy is generated based on the sample.

32. The gateway device according to claim 1, wherein the transfer policy control unit applies a result of a monitoring of an uplink traffic as a trigger to change the transfer policy applied to the multicast packet or the broadcast packet transferred to the mobile terminal via the downlink channel.

33. The packet transfer control method according to claim 19, wherein said changing the packet transfer policy comprises applying a result of a monitoring of an uplink traffic as a trigger to change the packet transfer policy applied to the multicast packet or the broadcast packet transferred to the mobile terminal via the downlink channel.

34. The gateway device according to claim 1, wherein the transfer policy control unit captures an uplink IP packet to trigger a start of the transfer of the multicast packet or the broadcast packet in a downlink direction to the mobile terminal.

35. The gateway device according to claim 1, wherein the transfer policy control unit captures the service discovery multicast packet transmitted from the mobile terminal to the external network.

36. The gateway device according to claim 1, wherein the transfer policy control unit determines the transfer of the multicast packet or the broadcast packet in a downlink direction to the mobile terminal based on a uplink packet that is received from the mobile terminal.

* * * * *